(12) United States Patent
Fujiwara

(10) Patent No.: US 8,418,305 B2
(45) Date of Patent: *Apr. 16, 2013

(54) OPTICAL CONNECTOR CLEANING TOOL

(75) Inventor: Kunihiko Fujiwara, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/302,841

(22) Filed: Nov. 22, 2011

(65) Prior Publication Data

US 2012/0066849 A1 Mar. 22, 2012

Related U.S. Application Data

(62) Division of application No. 12/528,991, filed on Aug. 27, 2009, now Pat. No. 8,087,118.

(30) Foreign Application Priority Data

| Feb. 28, 2007 | (JP) | 2007-049028 |
| Mar. 23, 2007 | (JP) | 2007-077954 |
| Jul. 23, 2007 | (JP) | 2007-191087 |
| Dec. 7, 2007 | (JP) | 2007-317696 |
| Dec. 7, 2007 | (JP) | 2007-317697 |

(51) Int. Cl.
*B08B 11/00* (2006.01)

(52) U.S. Cl.
USPC .......................... 15/97.1; 15/210.1

(58) Field of Classification Search ............. 15/97.1, 15/210.1
See application file for complete search history.

(56) References Cited

U.S. PATENT DOCUMENTS

| 5,836,031 A | 11/1998 | Cox |
| 6,905,251 B2 | 6/2005 | Fujiwara et al. |
| 7,243,390 B2 | 7/2007 | Fujiwara et al. |
| 2002/0131748 A1 | 9/2002 | Sato |
| 2006/0191091 A1 | 8/2006 | Kida |
| 2007/0023067 A1 | 2/2007 | Kida et al. |

FOREIGN PATENT DOCUMENTS

| JP | 09-285766 | 11/1997 |
| JP | 2002090576 | 3/2002 |
| JP | 2002-277681 A | 9/2002 |
| JP | 2005-181971 A | 7/2005 |
| WO | WO 2004/073896 A2 | 9/2004 |

OTHER PUBLICATIONS

European Search Report dated Oct. 24, 2011, corresponding to European Patent Application No. 08721 01.0.
Japanese Office Action dated Mar. 2, 2010, corresponding to Japanese Patent Application No. 2009-502549.

*Primary Examiner* — Randall Chin
(74) *Attorney, Agent, or Firm* — Sughrue Mion, PLLC

(57) ABSTRACT

An optical connector cleaning tool which wipes to clean a joining end face of an optical connector by a feeding movement of a cleaning body. It includes a tool body which incorporates a feeding mechanism that supplies and takes up the cleaning body, and an insertion part which inserts into a connector housing hole of a positioning housing for connectors. The insertion part has a head member on which is formed a pressing face that presses the cleaning body against the joining end face within the connector housing hole, and is capable of moving in a direction of extension or contraction relative to the tool body. Movement of the tool body in an insertion direction relative to the insertion part in a state where the cleaning body is in contact with the joining end face causes the head member to axially rotate while the state of contact is maintained.

23 Claims, 72 Drawing Sheets

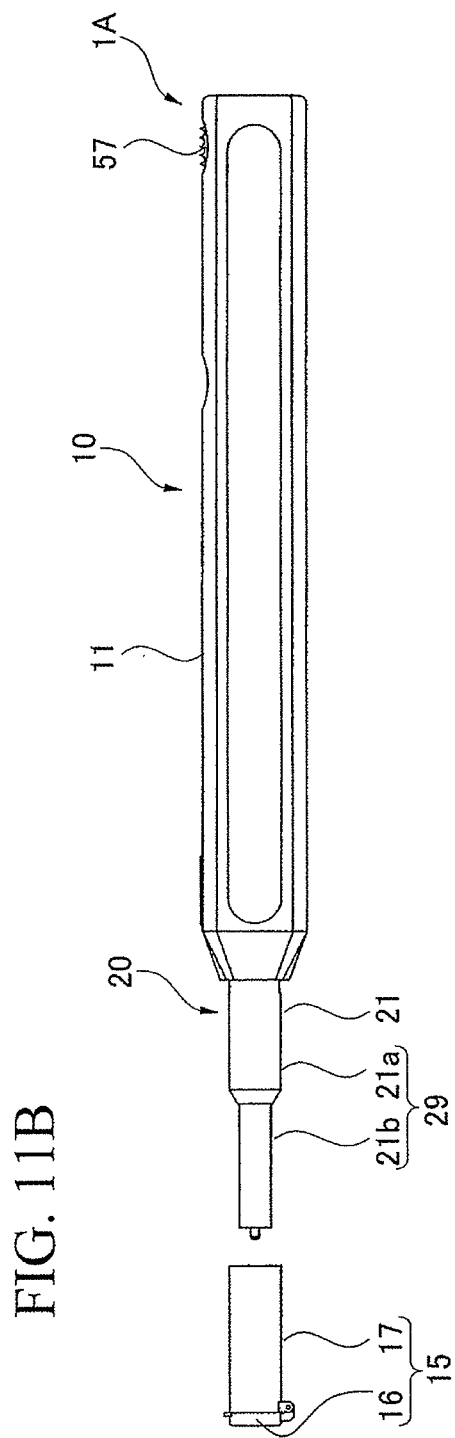

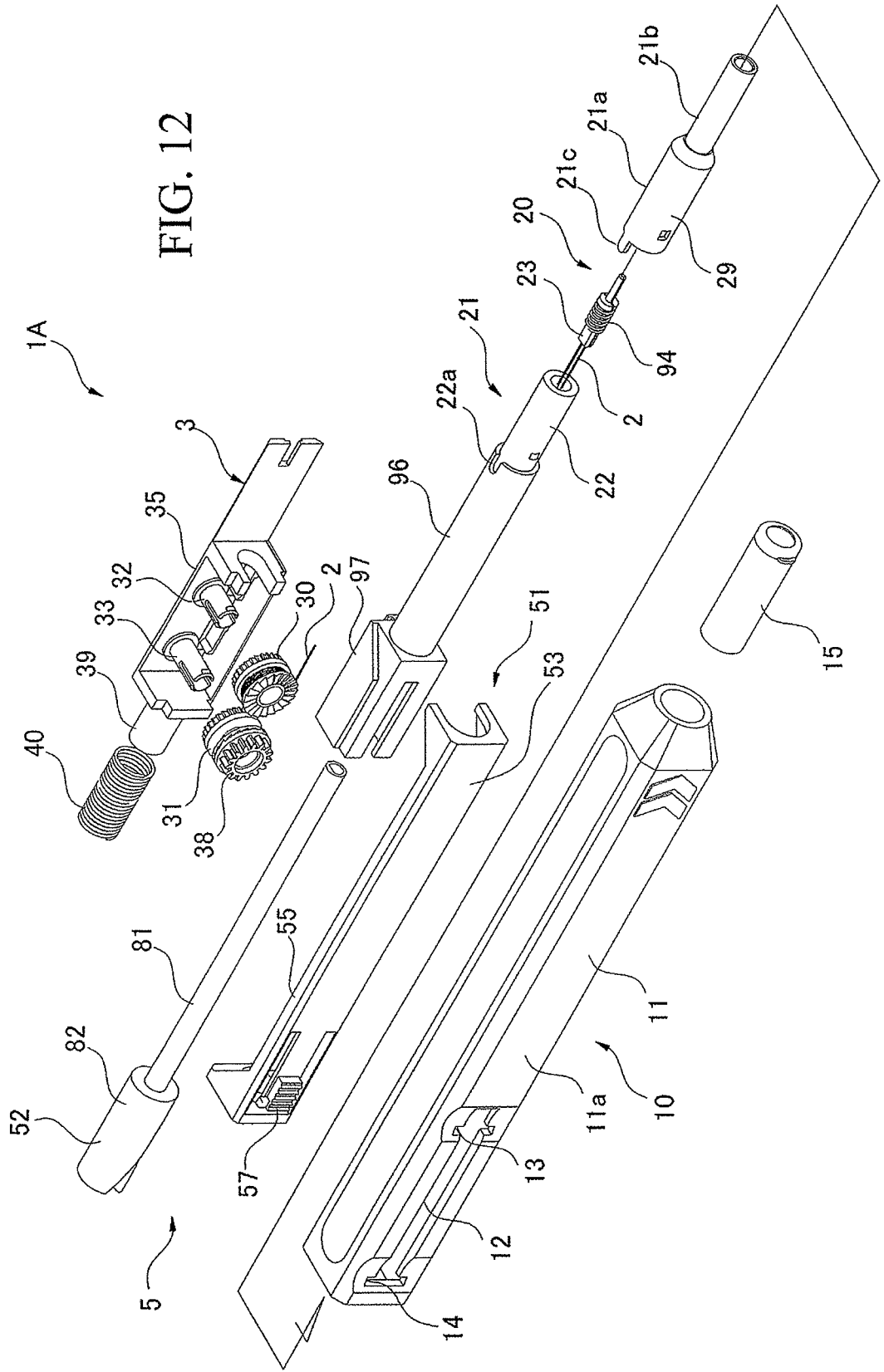

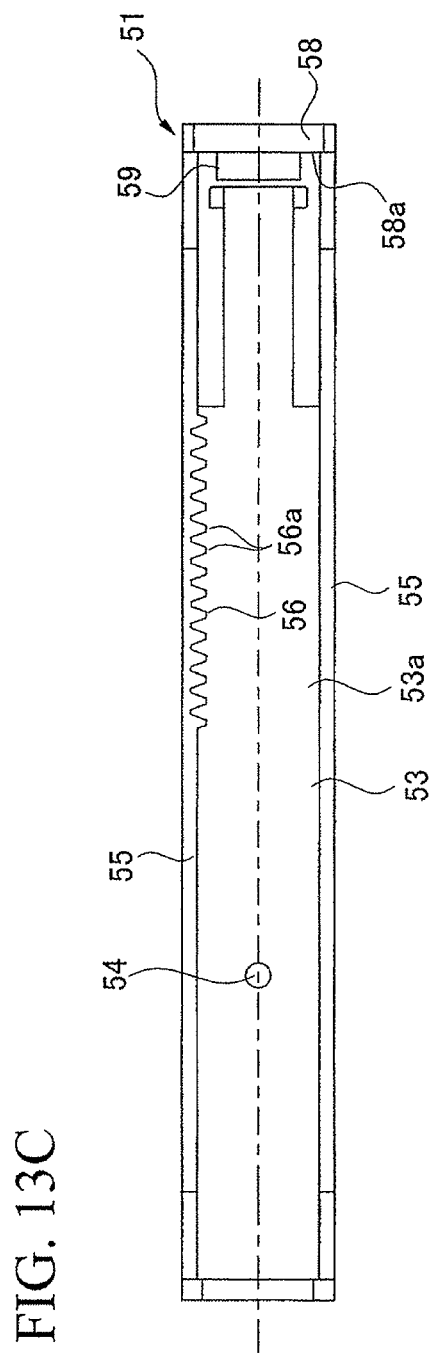

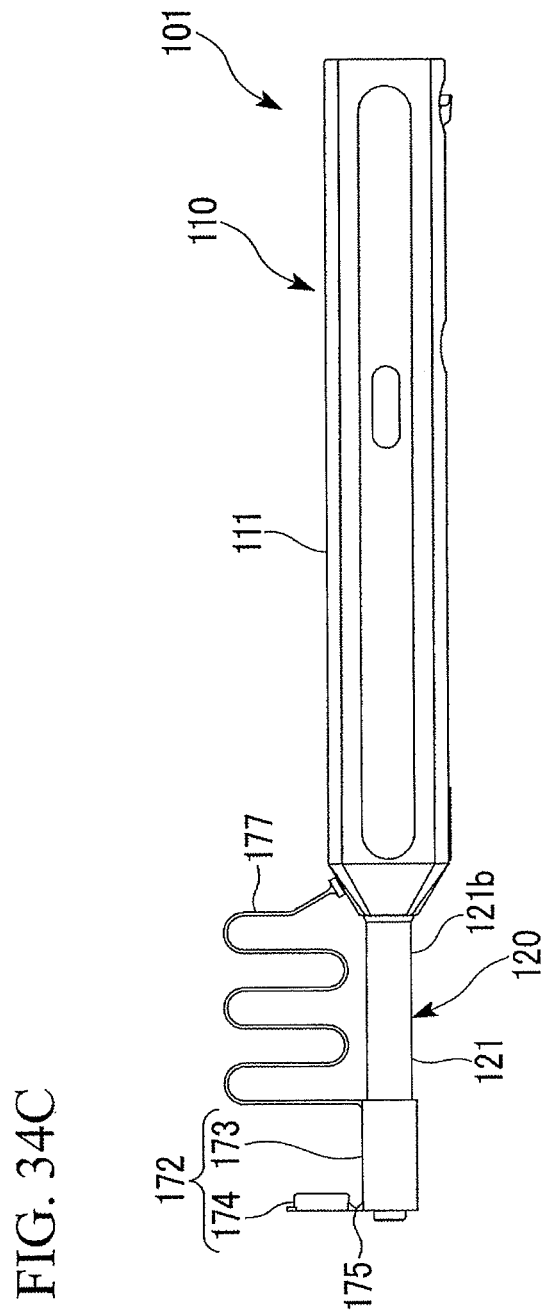

OPTICAL CONNECTOR CLEANING TOOL

This application is a Divisional application of U.S. application Ser. No. 12/528,991, filed Aug. 27, 2009, now U.S. Pat. No. 8,087,118, which claims priority under 35 U.S.C. §119 to Japanese Patent Application No. 2007-49028, filed Feb. 28, 2007, Japanese Patent Application No. 2007-77954, filed Mar. 23, 2007, Japanese Patent Application No. 2007-191087, filed Jul. 23, 2007, Japanese Patent Application No. 2007-317696, filed Dec. 7, 2007, and Japanese Patent Application No. 2007-317697, filed Dec. 7, 2007, the contents of which are incorporated herein by reference.

TECHNICAL FIELD

The present invention relates to an optical connector cleaning tool, which cleans a joining end face of an optical connector within a positioning housing for connectors by a feeding movement of a cleaning body.

BACKGROUND ART

As is well known, the connection of optical connectors inside a positioning housing for connectors such as an adapter or receptacle is achieved by aligning and joining the end faces of optical fibers that oppose the joining end face of the respective optical connector.

When optical connectors are inserted into a positioning housing for connectors, and are aligned and connected, if there is any adhesion of contamination such as dirt, dust or oil to the joining end faces of the optical connectors, it causes damage during connection and disconnection, increased transmission loss, etc. It is therefore necessary to clean the joining end faces prior to alignment and connection.

As an optical connector cleaning tool for use in this type of application, there is a tool that cleans the joining end face of an optical connector by contacting a cleaning body (see, e.g., Patent Document 1).

The cleaner recorded in Patent Document 1 is provided with a case, and a pin that projects from this case. This pin is rotated by a rotary means constituted by a motor, battery, or the like.

With respect to this cleaner, the distal end of the pin is brought into contact with a joining end face of an optical connector, and the rotary means is driven, thereby causing feeding movement of a cleaning body while the pin is rotated, and enabling cleaning of the joining end face.

Patent Document 1: Japanese Unexamined Patent Application, First Publication No. 2002-90576

DISCLOSURE OF INVENTION

Problem that the Invention is to Solve

With respect to the cleaner recorded in Patent Document 1, as it is necessary to align the distal end of the pin with the connector, and activate the rotary means, it cannot be said that operation is easy.

Moreover, as the rotary means that rotates the pin is bulky, and results in a large overall size, there is demand for downsizing.

In addition, with respect to an optical connector cleaning tool, there is demand for reliable cleaning of the end faces of optical connectors by a cleaning body.

As the present invention was made in light of the foregoing circumstances, it has the following purposes.

(1) To offer an optical connector cleaning tool which is easy to operate, and which also enables downsizing.
(2) To offer an optical connector cleaning tool which enables reliable cleaning of the joining end face of an optical connector.

Means for Solving the Problem

The optical connector cleaning tool of the present invention is an optical connector cleaning tool which wipes to clean a joining end face of an optical connector by a feeding movement of a cleaning body, and is provided with: a tool body which incorporates a feeding mechanism that supplies and takes up the aforementioned cleaning body; and an insertion part which is provided so as to protrude from this tool body, and which inserts into a connector housing hole of a positioning housing for connectors, wherein: the aforementioned insertion part has a head member on which is formed a pressing face that presses the aforementioned cleaning body against the aforementioned joining end face within the aforementioned connector housing hole, and is capable of moving in a direction of extension or contraction relative to the aforementioned tool body; and movement of the aforementioned tool body in an insertion direction relative to the aforementioned insertion part in a state where the aforementioned cleaning body is in contact with the aforementioned joining end face causes the aforementioned head member to axially rotate while the aforementioned state of contact is maintained.

The optical connector cleaning tool of the present invention may be configured such that the aforementioned tool body is provided with a rotary mechanism which causes axial rotation of the aforementioned head member; this rotary mechanism is provided with a supporting member, and a rotary shaft to which the aforementioned head member is attached; and the aforementioned rotary shaft has a rotary tube part in which is formed a cam groove into which an insertion protuberance that is formed on the aforementioned supporting member inserts, and is axially rotated by movement of the aforementioned rotary tube part along the aforementioned cam groove in accordance with movement of the aforementioned insertion part in the direction of extension or contraction.

In the optical connector cleaning tool of the present invention, it is preferable that the aforementioned cleaning body undergo a feeding movement of supply and take-up in the aforementioned feeding mechanism by movement of the aforementioned tool body in an insertion direction relative to the aforementioned insertion part.

The optical connector cleaning tool of the present invention may be configured so that the aforementioned feeding mechanism is provided with a supply reel on which cleaning body is wound, a take-up reel which takes up the cleaning body, and a gear which is attached to this take-up reel, wherein the aforementioned gear is capable of engaging with a gear receiving part that is formed in the aforementioned supporting member, and is rotated by the aforementioned gear receiving part by movement of the aforementioned feeding mechanism in accordance with movement of the aforementioned insertion part the direction of extension or contraction, causing rotation of the aforementioned take-up reel, and take up of the cleaning body.

In the optical connector cleaning tool of the present invention, it is preferable that the aforementioned insertion part be provided with an insertion tube through which the aforementioned head member passes, and that this insertion tube be capable of insertion into the aforementioned connector housing hole in a positioned state.

In the optical connector cleaning tool of the present invention, it is preferable that the aforementioned insertion tube be provided with a tube base part, and a tube extremity part that is removable from this tube base part.

In the optical connector cleaning tool of the present invention, it is preferable that the aforementioned cleaning body be filiform.

In the optical connector cleaning tool of the present invention, it is preferable that a guide groove which prevents skewing of the aforementioned cleaning body in the widthwise direction be formed on a pressing face of the aforementioned head member.

The optical connector cleaning tool of the present invention is an optical connector cleaning tool which wipes to clean a joining end face of an optical connector by a feeding movement of a cleaning body, and is provided with: a tool body which incorporates a feeding mechanism that supplies and takes up the aforementioned cleaning body, and a supporting member; and an insertion part which is provided so as to protrude from this tool body, and which inserts into a connector housing hole of a positioning housing for connectors, wherein: the aforementioned insertion part has a head member which has a pressing face that presses the aforementioned cleaning body against the aforementioned joining end face within the aforementioned connector housing hole, and an insertion tube through which the aforementioned head member passes, and is capable of moving in a direction of extension or contraction relative to the aforementioned tool body; movement of the aforementioned tool body in an insertion direction relative to the aforementioned insertion part in a state where the aforementioned cleaning body is in contact with the aforementioned joining end face causes the aforementioned head member to axially rotate while the aforementioned state of contact is maintained; and guide openings which guide the cleaning body from the aforementioned feeding mechanism on the aforementioned pressing face are formed in the aforementioned pressing face.

The optical connector cleaning tool of the present invention may be such that the aforementioned guide openings are formed in a pair, of which one guides the cleaning body from the aforementioned feeding mechanism on the aforementioned pressing face, and the other guides the cleaning body that has transited the aforementioned pressing face to the aforementioned feeding mechanism.

In the optical connector cleaning tool of the present invention, it is preferable that: a rotary mechanism which causes axial rotation of the aforementioned head member be incorporated into the aforementioned tool body; this rotary mechanism be provided with a rotary shaft that is attached to the aforementioned head member; and the aforementioned rotary shaft have a rotary tube part in which is formed a cam groove into which an insertion protuberance that is formed on the aforementioned supporting member inserts, and is axially rotated by movement of the aforementioned rotary tube part along the aforementioned cam groove in accordance with movement of the aforementioned insertion part in the direction of extension or contraction.

In the optical connector cleaning tool of the present invention, it is preferable that the aforementioned cleaning body undergo a feeding movement of supply and take up in the aforementioned feeding mechanism by movement of the aforementioned tool body in an insertion direction relative to the aforementioned insertion part.

The optical connector cleaning tool of the present invention may be configured so that the aforementioned feeding mechanism is provided with a supply reel on which cleaning body is wound, a take-up reel which takes up the cleaning body, and a gear which is attached to this take-up reel, wherein the aforementioned gear is capable of engaging with a gear receiving part that is formed in the aforementioned supporting member, and is rotated by movement of the aforementioned gear receiving part in conjunction with movement of the aforementioned tool body, causing rotation of the aforementioned take-up reel, and take up of the cleaning body.

It is preferable that the optical connector cleaning tool of the present invention be configured such that: a projecting piece which is capable of elastic bending deformation is formed in the aforementioned feeding mechanism so as to project toward the aforementioned supporting member; a contact protuberance which is capable of contacting the aforementioned projecting piece is formed in the aforementioned supporting member; and the aforementioned projecting piece undergoes bending deformation by engaging with the aforementioned contact protuberance in the process of movement of the supporting member in conjunction with movement of the aforementioned tool body, subsequently disengages from the aforementioned contact protuberance, impacts the aforementioned supporting member by elastic force, and emits an impact sound.

In the optical connector cleaning tool of the present invention, it is preferable that the aforementioned insertion tube be provided with a tube base part, and a tube extremity part which is provided at the distal end of the tube base part, and that the aforementioned tube extremity part have a fitting tube part which is capable of fitting into a through-hole at the distal end of the aforementioned tube base part in a freely removable manner, and a distal tube part which extends in a distal direction from the aforementioned fitting tube part, and which inserts into the aforementioned connector housing hole.

In the optical connector cleaning tool of the present invention, it is preferable that: the aforementioned tool body be provided with a case which incorporates the aforementioned feeding mechanism and the aforementioned supporting member; a positioning aperture, which has a fitting recess into which a positioning protuberance that is formed in the aforementioned supporting member removably fits, be formed in the aforementioned case; the aforementioned supporting member be capable of moving in the direction of removal from the aforementioned case by disengagement of the aforementioned positioning protuberance from the aforementioned fitting recess; and an engagement protuberance, which engages with the aforementioned positioning aperture at an intermediate position in the process of removal of the aforementioned supporting member, be formed in the aforementioned supporting member.

The optical connector cleaning tool of the present invention is an optical connector cleaning tool which wipes to clean a joining end face of an optical connector by a feeding movement of a cleaning body, and is provided with: a tool body which incorporates a feeding mechanism that supplies and takes up the aforementioned cleaning body; an insertion part which protrudes from the aforementioned tool body; and a connector cleaning attachment which causes opposition and contact of the cleaning body and the aforementioned joining end face of an optical connector at the distal end of the aforementioned insertion part, wherein: the aforementioned insertion part has a head member which has a pressing face that presses the aforementioned cleaning body against the aforementioned joining end face, and an insertion tube through which the aforementioned head member passes; the aforementioned connector cleaning attachment is provided with a main body which is attached to the distal end of the aforementioned insertion part, and a covering part which is hinged to this main body; the aforementioned main body has a base plate which has a through-hole through which a ferrule of the aforementioned optical connector and/or the aforementioned head member pass, and a tool-side guide tube part which extends from the aforementioned base plate in a direction opposite to the protrusion direction of the aforementioned insertion part; and the aforementioned tool-side guide tube part is formed so that the aforementioned head member is positioned by insertion.

In the optical connector cleaning tool of the present invention, it is preferable that: a connector-side guide tube part into which the aforementioned ferrule is insertable be formed on the aforementioned base plate so as to extend in the aforementioned protrusion direction; the aforementioned covering part be provided with an apical plate, and a covering tube which extends from the periphery of the apical plate, and which is joined to the aforementioned main body by a hinge; the aforementioned covering tube be formed so as to encompass the aforementioned connector-side guide tube part in a closed state; a notch be formed on the inner face of the aforementioned covering tube; and this notch be formed so that its interior is transited by a portion of the aforementioned connector-side guide tube part when opening and closing operation of the aforementioned covering part is conducted on the aforementioned hinge.

In the optical connector cleaning tool of the present invention, it is preferable that the aforementioned main body have an outer tube part which extends from the aforementioned base plate, and into which the aforementioned insertion tube is insertable.

Effects of the Invention

The optical connector cleaning tool of the present invention enables cleaning of a joining end face merely by inserting the insertion part into a connector housing hole, and moving the tool body in the insertion direction. As insertion of the insertion part into the connector housing hole and rotation of the head member can be conducted in successive actions, operation is easy.

Moreover, as the head member is axially rotated by relative movement of the insertion part with respect to the tool body, the configuration of the mechanism that rotates the head member is simplified in comparison to the type wherein a head member is rotated using a motor.

Accordingly, the size of the tool body can be reduced, and the entirety can be downsized.

As the optical connector cleaning tool of the present invention forms guide openings in the pressing face of the head member which guide the cleaning body on the pressing face, it is possible to prevent the cleaning body from falling off the pressing face. Accordingly, the joining end face of an optical connector can be reliably cleaned.

Moreover, the joining end face can be cleaned merely by inserting the insertion part into a connector housing hole, and moving the tool body in the insertion direction. As insertion of the insertion part into the connector housing hole and rotation of the head member can be conducted in successive actions, operation is easy.

In addition, as the configuration of the mechanism that rotates the head member is simplified, the size of the tool body can be reduced, and the entirety can be downsized.

According to the present invention, a tool-side guide tube part that enables insertion and positioning of the head member is formed in the main body of a connector cleaning attachment, thereby enabling highly accurate opposition and contact of the cleaning body and the joining end face of an optical connector. Consequently, it is possible to obtain excellent cleaning effects.

Moreover, as a notch which is internally transited by a connector-side guide tube part during opening and closing operation of the covering part is formed in a covering tube, it is possible to prevent the covering part from contacting the connector-side guide tube part during opening and closing without giving a large external diameter to the covering part, thereby enabling downsizing.

BRIEF DESCRIPTION OF THE DRAWINGS

FIG. 11B is a side view of the optical connector cleaning tool shown in FIG. 10.

FIG. 12 is an exploded perspective view of the optical connector cleaning tool shown in FIG. 10.

FIG. 13C is a back view which shows the supporting member of the rotary mechanism of the optical connector cleaning tool shown in FIG. 10.

FIG. 34C is a side view of the optical connector cleaning tool shown in FIG. 32.

DESCRIPTION OF THE REFERENCE SYMBOLS

1, 1A: optical connector cleaning tool, 2: cleaning body, 3: feeding mechanism, 5: rotary mechanism, 10: tool body, 20: insertion part, 21: insertion tube, 22: tube base part, 23: head member, 24: pressing face, 25: guide groove, 29: tube extremity part, 30: supply reel, 31: take-up reel, 38: gear, 51: supporting member, 52: rotary shaft, 54: insertion protuberance, 56: gear receiver, 60: optical plug (optical connector), 61: ferrule, 61a: joining end face, 70: optical adapter, 72: connector housing hole, 82: rotary tube part, 85: cam groove, 101: optical connector cleaning tool, 102: cleaning body, 103: feeding mechanism, 105: rotary mechanism, 110: tool body, 111: case, 112: positioning aperture, 113, 114: fitting recess, 120: insertion part, 121: insertion tube, 121c: fitting tube part, 122: tube base part, 123, 123A: head member, 124: pressing face, 125A, 125B: guide opening, 129: tube extremity part, 130: supply reel, 131: take-up reel, 138: gear, 146: projecting piece, 151: supporting member, 152: rotary shaft, 154: insertion protuberance, 155a: contact protuberance, 156: gear receiver, 157: positioning protuberance, 166: engagement protuberance, 182: rotary tube part, 185: cam groove, 201: optical connector cleaning tool, 202: cleaning body, 203: feeding mechanism, 210: tool body, 220: insertion part, 221: insertion tube, 223: head member, 224: pressing face, 240: connector cleaning attachment, 241: main body, 242: covering part, 243: base, 243a: through-hole, 244: outer tube part, 245: tool-side guide tube part, 246: connector-side guide tube part, 251: apical plate, 253: notch.

BEST MODE FOR CARRYING OUT THE INVENTION

Below, an optical connector cleaning tool that implements the present invention is described with reference to drawings.

FIG. 1 to FIG. 5 are drawings which show one embodiment of the optical connector cleaning tool (hereinafter also referred to simply as "cleaning tool") of the present invention.

Figure 1:
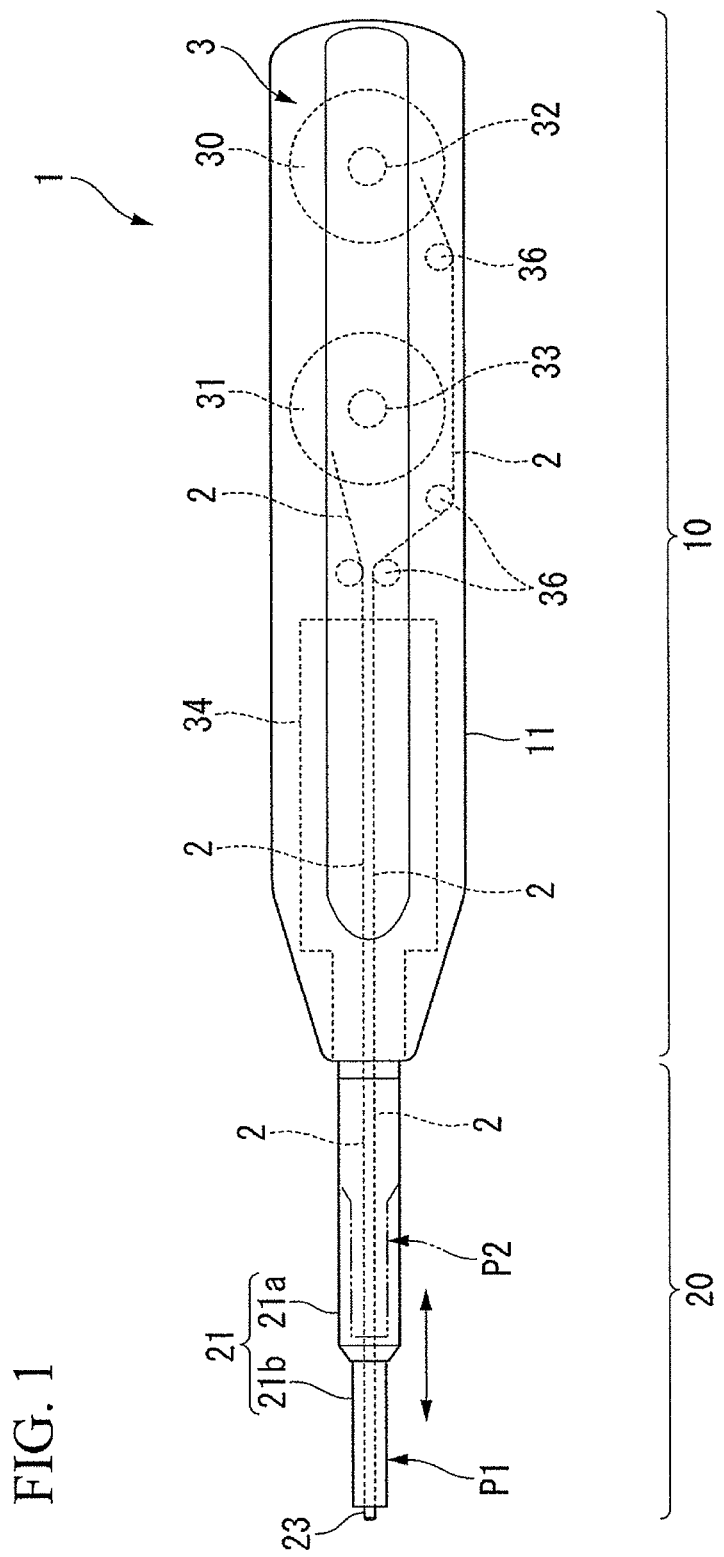
FIG. 1 is an elevation view which shows one embodiment of the optical connector cleaning tool of the present invention.
Figure 2A:
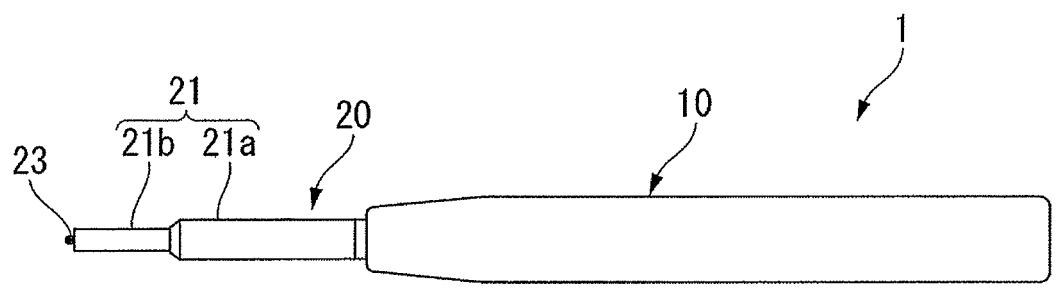
FIG. 2A is a side view of the cleaning tool shown in FIG. 1
Figure 2B:
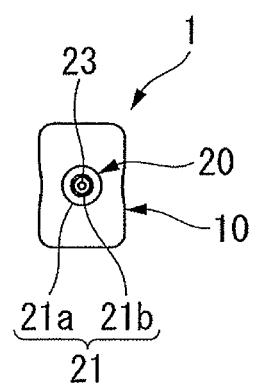
FIG. 2B is a front view of the cleaning tool shown in FIG. 1
Figure 2C:
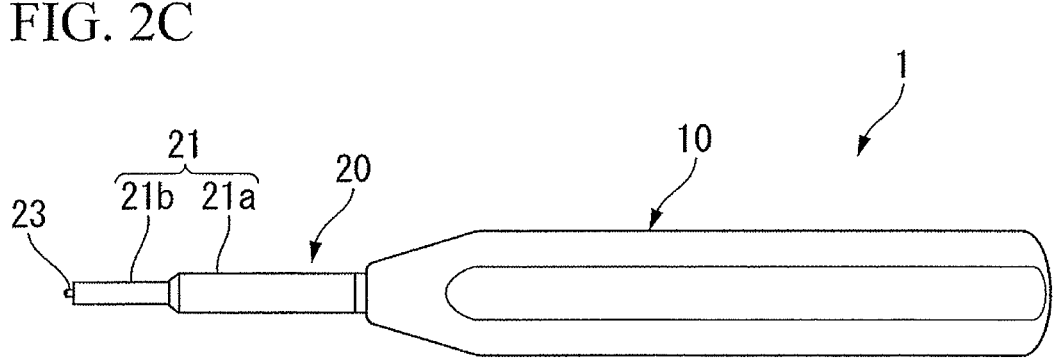
FIG. 2C is an elevation view of the cleaning tool shown in FIG. 1.
Figure 3:
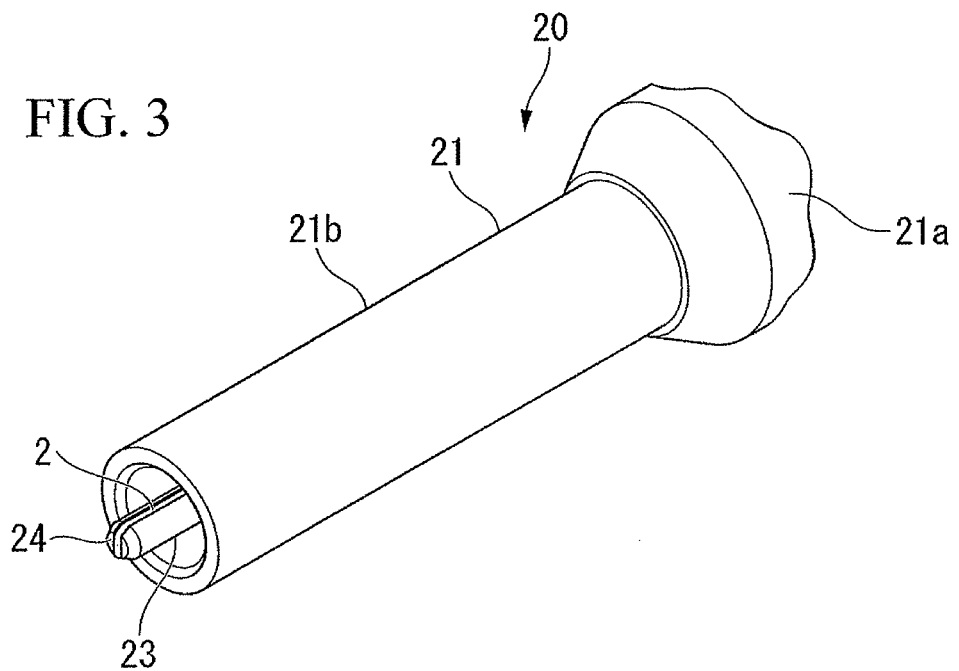
FIG. 3 is a perspective view which shows the essential elements of an insertion part of the optical connector cleaning tool shown in FIG. 1.
Figure 4:
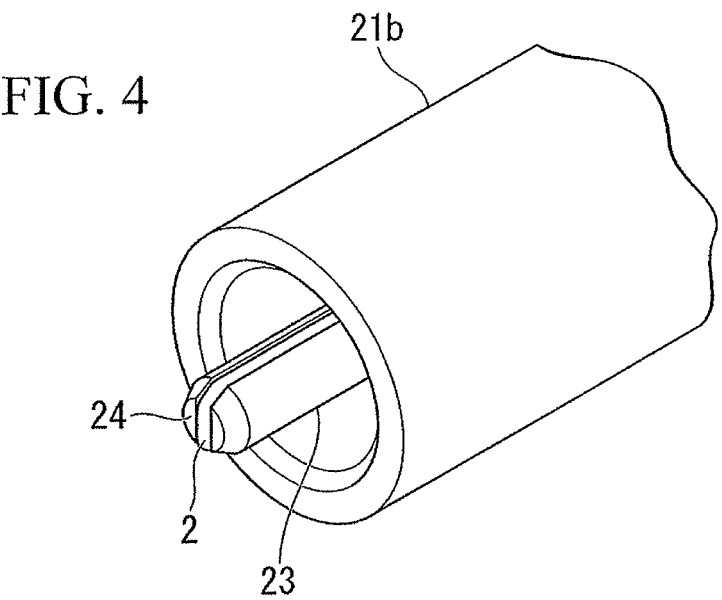
FIG. 4 is an enlarged view of the distal end of the insertion part of the optical connector cleaning tool shown in FIG. 1.
Figure 5:
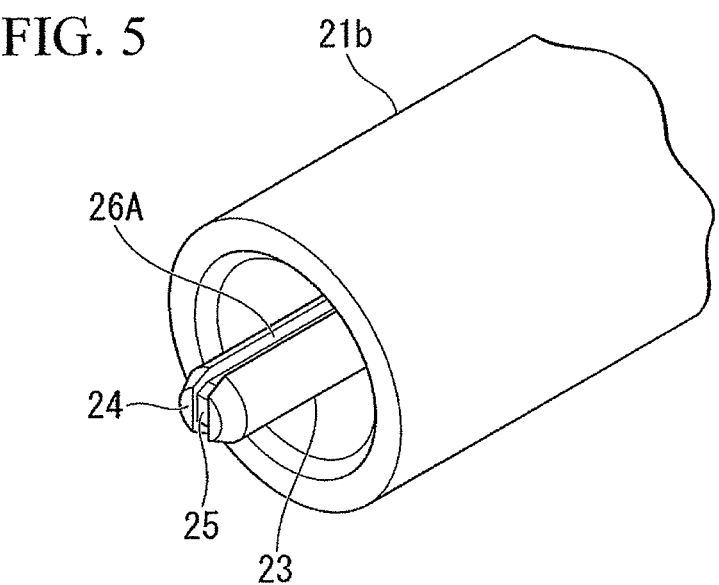
FIG. 5 is an enlarged view of the distal end of the insertion part in a state where cleaning body has been removed, in the optical connector cleaning tool shown in FIG. 1.

FIG. 1 is an elevation view of a cleaning tool 1 of this embodiment. FIG. 2A to FIG. 2C are respectively a side view, front view, and elevation view of the cleaning tool 1. FIG. 3 is a perspective view which shows the essential elements of an insertion part 20 of the cleaning tool 1. FIG. 4 is an enlarged view of the distal portion of the insertion part 20. FIG. 5 is an enlarged view of the distal portion of the insertion part 20 in a state where a cleaning body 2 is removed.

Figure 6:
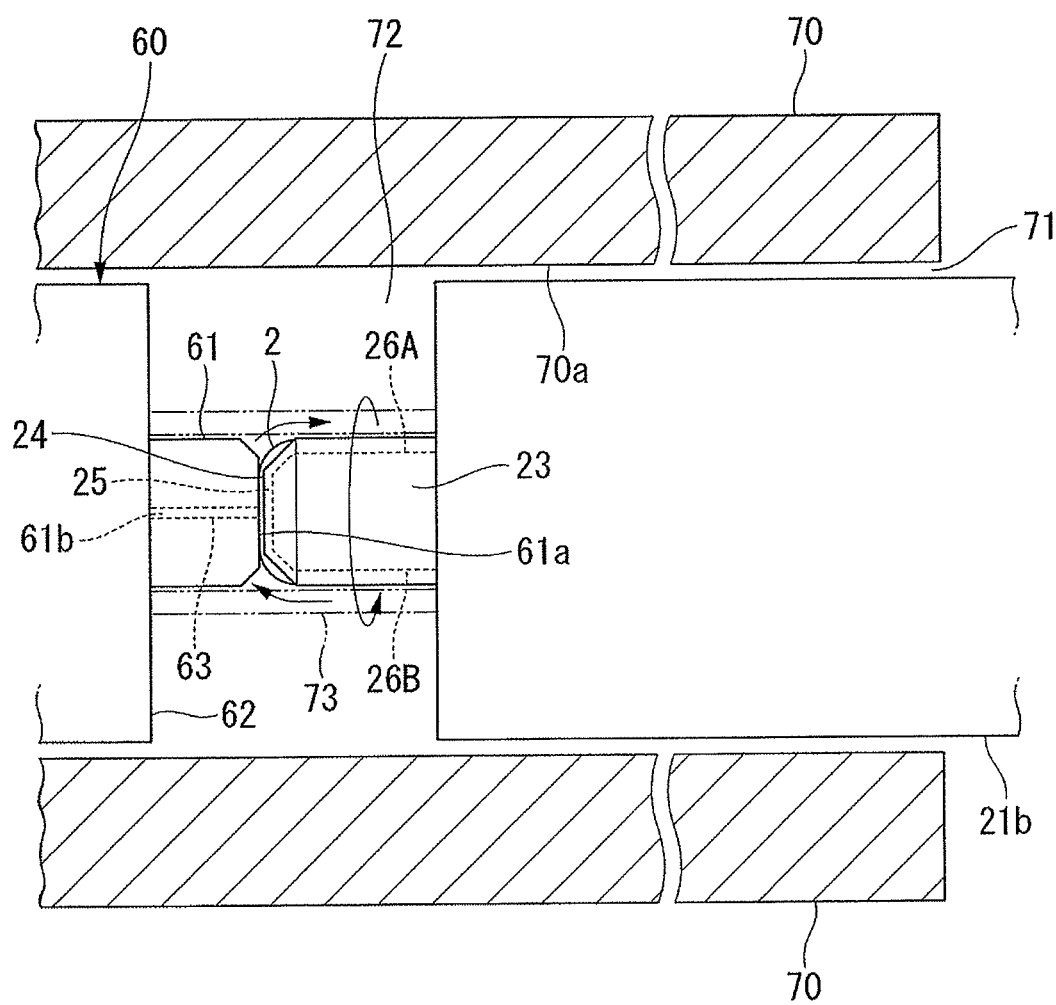
FIG. 6 is a cross-sectional view which shows an optical plug and an optical adapter that enable application of the optical connector cleaning tool shown in FIG. 1.

FIG. 6 is a drawing which shows an optical connector plug 60 (an optical connector; hereinafter, also referred to simply as "optical plug") and optical connector adaptor 70 (connector positioning housing; hereinafter also referred to simply as "optical adaptor") to which the cleaning tool 1 is applied.

As shown in FIG. 6, the optical plug 60 is an optical connector plug that is configured to accommodate a ferrule 61 in a distal portion of a sleeve-shaped housing 62.

At the center of a joining end face 61a of the ferrule 61, an optical fiber hole 61b (miniature hole) is opened. An optical fiber 63 passes through the optical fiber hole 61b, and the distal end of the optical fiber 63 is exposed at the joining end face 61a.

The optical fiber 63 is, for example, an optical fiber bare wire from which coating resin has been removed at the distal end of an optical fiber core wire. The optical fiber 63 is thereby terminated to enable alignment with and connection to other optical connectors.

As the ferrule, one may use a well-known single-core optical ferrule such as, for example, a SC-type ferrule or SC ferrule.

Otherwise, the ferrule 61 may also have a form that narrows toward its distal end, but a cylindrical ferrule 61 is shown in FIG. 6 as a typical example.

The optical adapter 70 has a sleeve-shaped form that has a connector housing hole 72. By inserting the optical plug 60 from a connector insertion port 71, it can be accommodated within the connector housing hole 72.

When the optical plug 60 is inserted from the connector insertion port 71 of the optical adapter 70, it is housed in the connector housing hole 72 while displacement in a skewed direction from the insertion direction is controlled.

When two optical plugs 60 are inserted from both ends of the optical adaptor 70, the configuration is such that the mated ferrules 61 align and abut, and the mated optical fibers 63 optically connect.

As shown in FIG. 6, code number 73 indicates a dividing sleeve for positioning that is commonly used in optical adapters.

As shown in FIG. 1, the cleaning tool 1 is provided with a tool body 10, and an insertion part 20 that projects from this tool body 10.

In the below description, leftward in FIG. 1 is sometimes referred to as forward, and rightward as rearward.

As shown in FIG. 1 to FIG. 5, the insertion part 20 is provided with an insertion tube 21, and a head member 23 that passes through the interior of the insertion tube 21.

The insertion tube 21 has a cylindrical base tube part 21a, and a cylindrical distal tube part 21b that extends forward from the distal end of the base tube part 21a.

It is preferable that the distal tube part 21b be more narrowly formed than the base tube part 21a, and that it be formed so that it is positioned when inserted into the connector housing hole 72.

As shown in FIG. 3 to FIG. 5, the head member 23 is designed to press a cleaning body 2 against the joining end face 61a of the optical plug 60, and is cylindrically formed in the illustrated example.

The distal face of the head member 23 is a pressing face 24 which presses the cleaning body 2 against the joining end face 61a. In the illustrated example, the pressing face 24 is approximately flat and approximately circular.

It is preferable that a guide groove 25 which guides the feeding movement of the cleaning body 2 be formed in the pressing face 24. The guide groove 25 functions as a positioning mechanism of the cleaning body 2, and can prevent the falling off or dislocation of the cleaning body 2.

The guide groove 25 is formed shallower than the diameter of the cleaning body 2 so that the cleaning body 2 can contact the joining end face 61a.

As shown in FIG. 5 and FIG. 6, it is preferable that guide grooves 26A and 26B be formed on the side faces of the head member 23 so as to guide the feeding movement of the cleaning body 2.

The distal end of the head member 23 protrudes from the distal tube part 21b.

The cleaning body 2 which is dispensed from a supply reel 30 winds around the head member 23.

Specifically, as shown in FIG. 1, the cleaning body 2 passes through the interior of the insertion tube 21 from the supply reel 30 within the tool body 10, transits the pressing face 24 of the head member 23, and reaches the take-up reel 31.

There are no particular limitations on the cleaning body 2, and one may adopt commonly known and suitable cleaning cloth (non-woven cloth or woven cloth) that has been processed into filament form. For example, one may cite material composed of ultrafine fiber such as polyester and nylon.

As the cleaning body 2, for example, material with a diameter of 0.1-1 mm, and preferably 0.2-0.3 mm is optimal. Otherwise, as the cleaning body 2, one may also use tape-like material of narrow width.

As shown by arrow marks in FIG. 1, the insertion part 20 can be move in a direction of extension or contraction relative to the tool body 10. That is, it is capable of moving from a normal position P1 shown by a solid line to a contracted position P2 shown by a virtual line.

As shown in FIG. 1, the tool body 10 is provided with a case 11 made of plastic or the like, a feeding mechanism 3 provided therein, and a rotary mechanism 34 that rotates the head member 23.

The feeding mechanism 3 causes feeding movement of the cleaning body 2, and has the supply reel 30 on which the cleaning body 2 is wound, and a take-up reel 31 which reels in the cleaning body 2 after use to recover it.

Inside the case 11, there is provided a supply reel support shaft 32 which is installed so as to enable rotation of the supply reel 30, and a take-up reel support shaft 33 which is installed so as to enable rotation of the take-up reel 31.

The rotary mechanism 34 is configured so as to cause axial rotation of the head member 23 by movement of the insertion part 20 in the direction of contraction from the normal position P1 toward the contracted position P2.

The rotary mechanism 34 may, for example, adopt a configuration where a gear (not illustrated in the drawing) is rotated by movement of the insertion part 20, and the head member 23 is rotationally driven around its axis by this gear There are no particular limitations on the configuration of the rotary mechanism 34 so long as the head member 23 is rotated in conjunction with movement of the insertion part 20.

It is preferable that the rotary mechanism 34 be configured so that the take-up reel 31 can be rotated. For example, a mechanism may be adopted wherein a gear (not illustrated in the drawing) is rotated by movement of the insertion part 20, and the take-up reel 31 is rotated by this gear in conjunction with the insertion part 20.

In the present invention, a configuration is also conceivable wherein an operating dial is provided that is capable of manual manipulation, and the take-up reel 31 is rotated by manipulation of this operating dial.

The code numbers 36 in FIG. 1 are cylindrical guides which are formed on the inner surface of the case 11, and which guide the cleaning body 2.

Next, as one example of the method of use of the cleaning tool 1, a procedure is described wherein the joining end face 61a of the optical plug 60 that is housed within the optical adapter 70 is cleaned.

Figure 7:
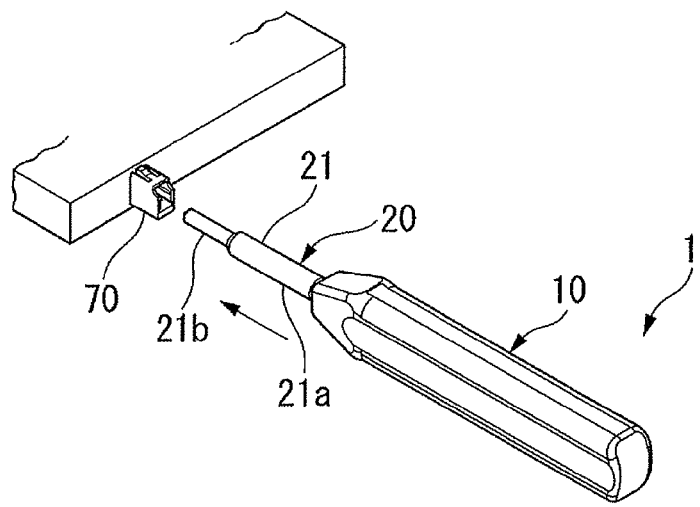
FIG. 7 is a process view which shows a method of use of the optical connector cleaning tool shown in FIG. 1.
Figure 8:
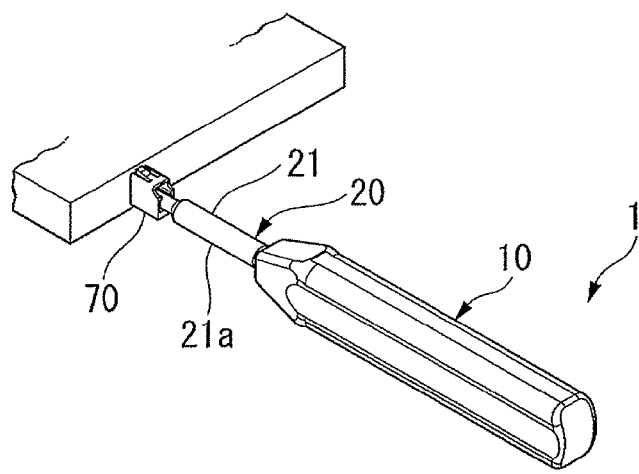
FIG. 8 is a process view which is a continuation from the previous view.

As shown in FIG. 6 to FIG. 8, when the distal tube part 21b of the insertion part 20 of the cleaning tool 1 is inserted from the connector insertion port 71 of the optical adapter 70, the distal tube part 21b enters the connector housing hole 72 while its outer surface is positioned by an inner wall 70a of the optical adapter 70.

By this means, the cleaning body 2 on the pressing face 24 contacts the proper position (in this instance, the optical fiber hole 61b and its periphery) of the joining end face 61a of the optical plug 60.

Figure 9:
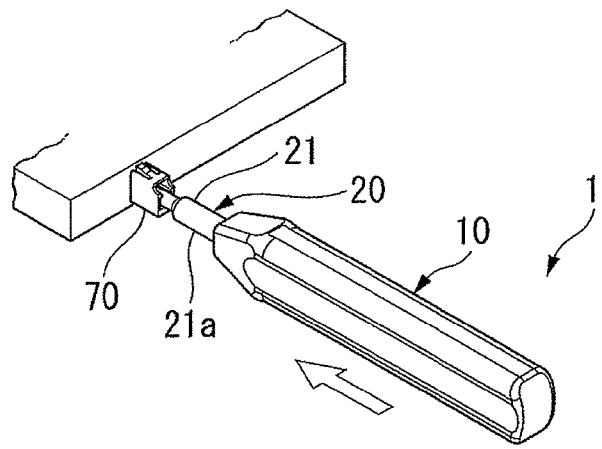
FIG. 9 is a process view which is a continuation from the previous view.

As shown in FIG. 9, when the tool body 10 is pressed further in the insertion direction, the tool body 10 moves in this direction. At this time, the distal end of the insertion part 20 is pushed against the ferrule 61 and the inner wall of the optical adapter 70, and the relative position of the insertion part 20 with respect to the tool body 10 moves toward the contracted position P2 from the normal position P1 (see FIG. 1).

The head member 23 is axially rotated by the rotary mechanism 34 in conjunction with the movement of this insertion part 20. Consequently, the cleaning body 2 rotates around the axis of the head member 23 in a state of contact with the joining end face 61a, and the joining end face 61a is wiped clean.

At the time of movement of the tool body 10 in the insertion direction, the take-up reel 31 is rotationally driven, whereby the cleaning body 2 is withdrawn from the supply reel 30, is fed through the pressing face 24 of the head member 23, and is taken up into the take-up reel 31. Consequently, contamination such as dirt, dust, and oil that adheres to the joining end face 61a is reliably wiped away by the cleaning body 2.

After cleaning, the insertion part 20 can be withdrawn from the connector housing hole 72 by pulling the cleaning tool 1 in the direction opposite the insertion direction (the disengagement direction).

The cleaning tool 1 is able to clean the joining end face 61a merely by insertion of the insertion part 20 into the connector housing hole 72 of the optical connector 70, and by movement of the tool body 10 in the insertion direction. As insertion of the insertion part 20 into the connector housing hole 72, and rotation of the head member 23 can be conducted by successive actions, operation is easy.

Moreover, as the rotary mechanism 34 axially rotates the head member 23 by relative movement of the insertion part 20 relative to the tool body 10, the configuration of the rotary mechanism 34 is simplified compared to the type where the head member is rotated using a motor.

Accordingly, the size of the tool body 10 can be reduced, and the entirety can be downsized.

FIG. 10 to FIG. 26D show a second embodiment of the cleaning tool of the present invention.

Figure 10:
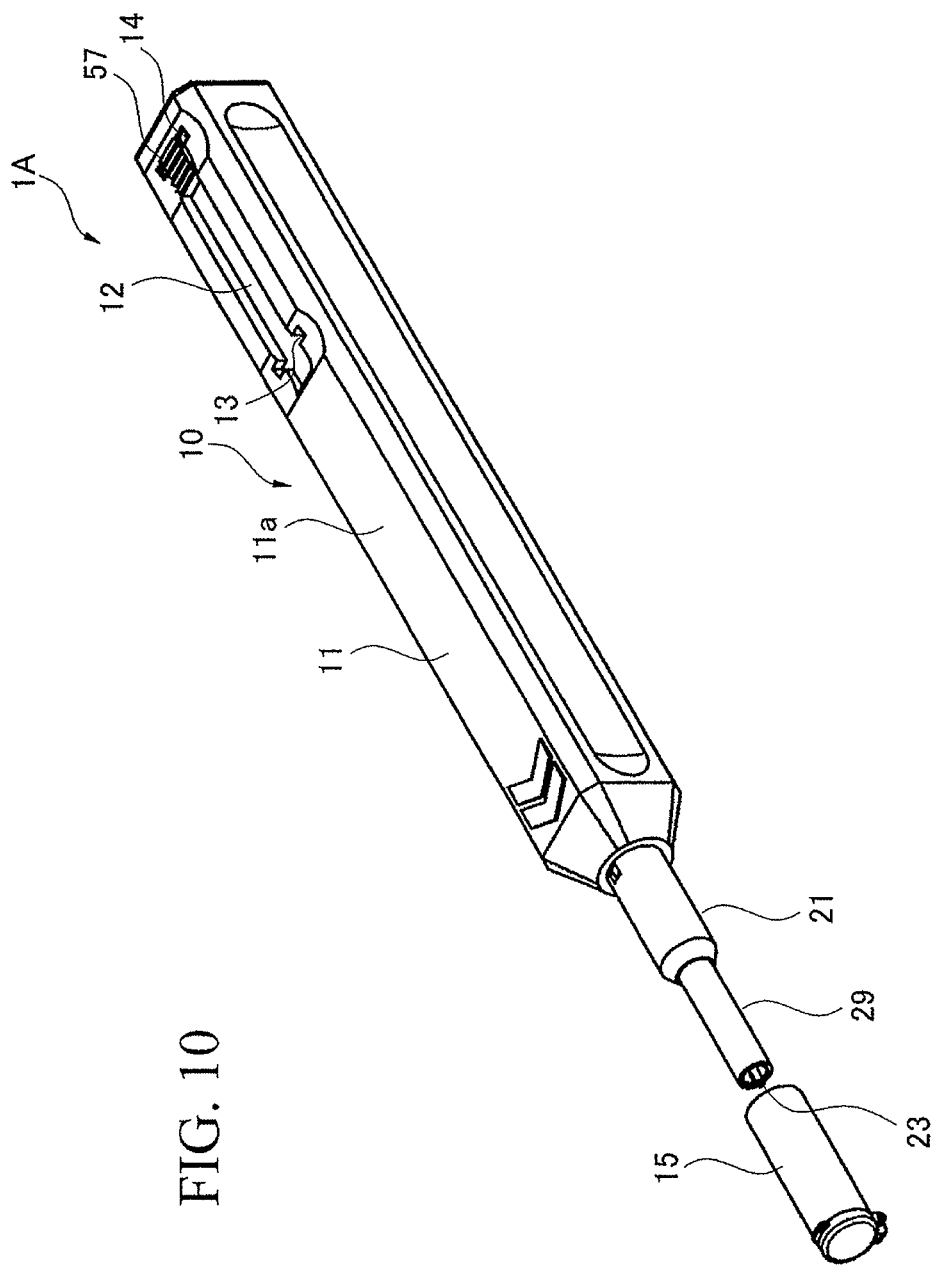
FIG. 10 is a perspective view of another embodiment of the optical connector cleaning tool of the present invention.
Figure 11A:
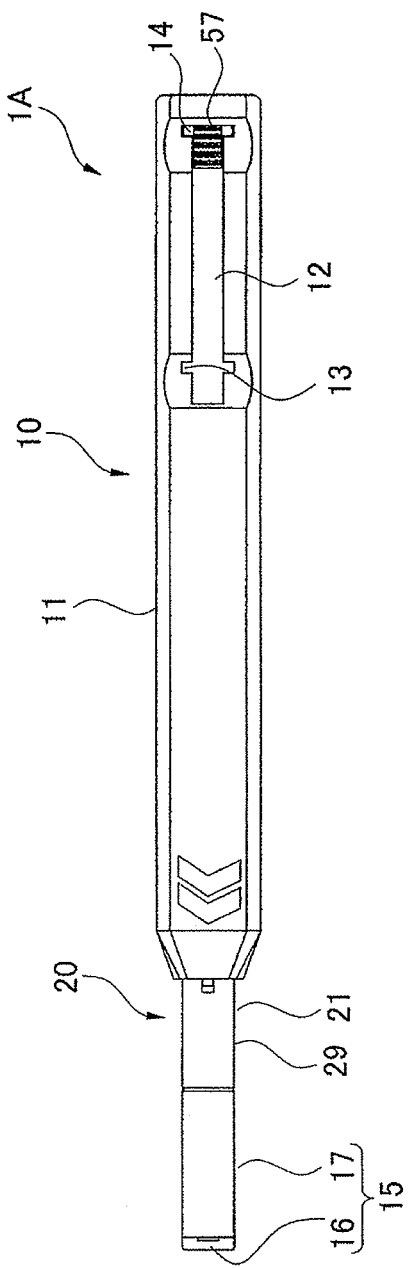
FIG. 11A is an elevation view of the optical connector cleaning tool shown in FIG. 10.
Figure 13A:
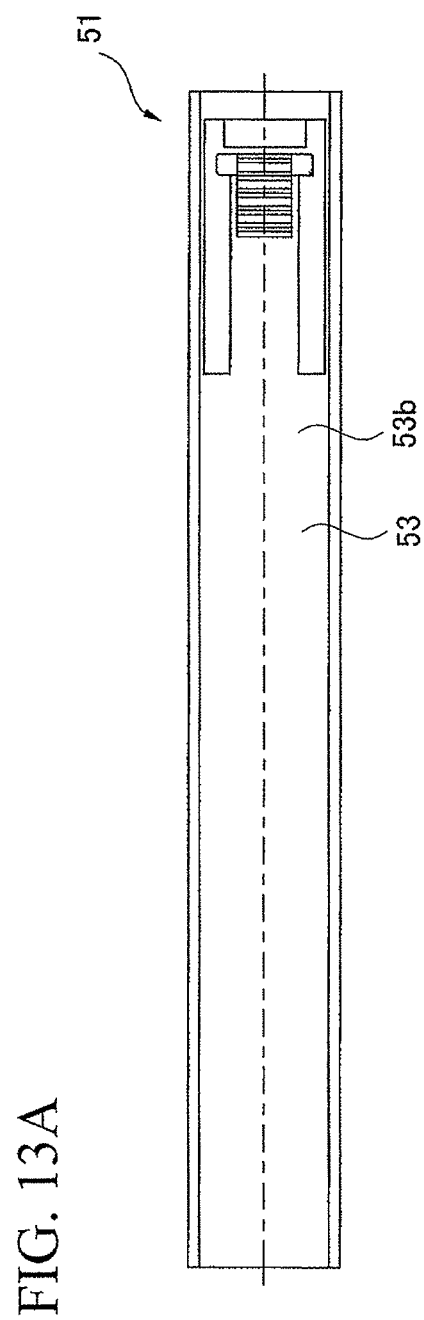
FIG. 13A is an elevation view which shows a supporting member of a rotary mechanism of the optical connector cleaning tool shown in FIG. 10.
Figure 13B:
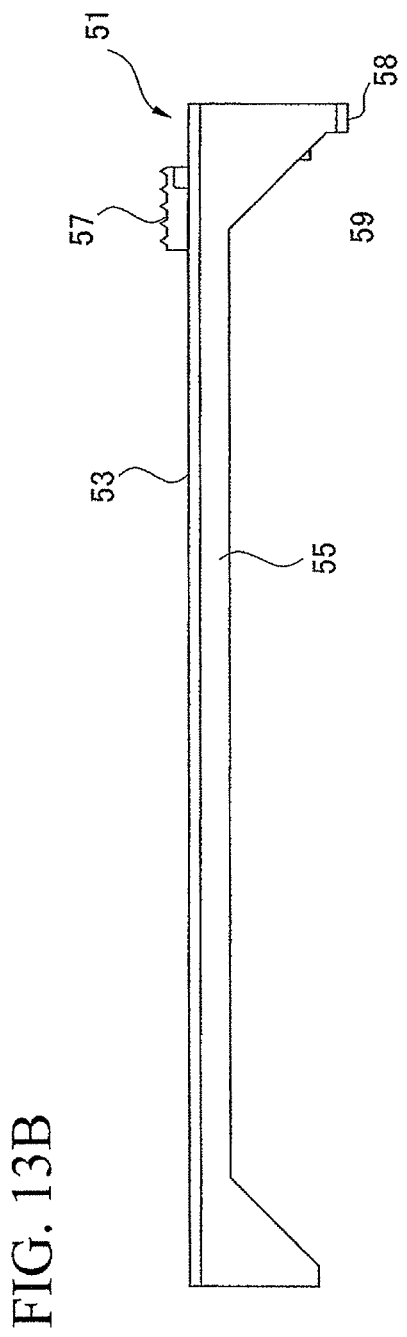
FIG. 13B is a side view which shows the supporting member of the rotary mechanism of the optical connector cleaning tool shown in FIG. 10.
Figure 14:
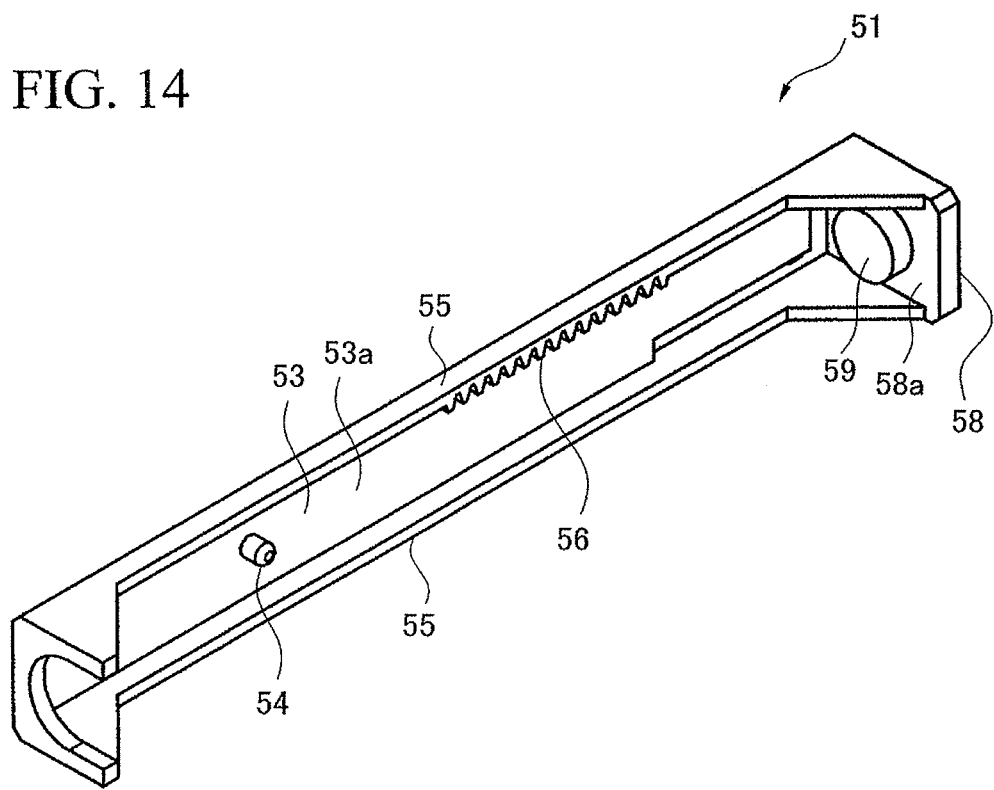
FIG. 14 is a perspective view which shows the supporting member of the rotary mechanism of the optical connector cleaning tool shown in FIG. 10.
Figure 15:
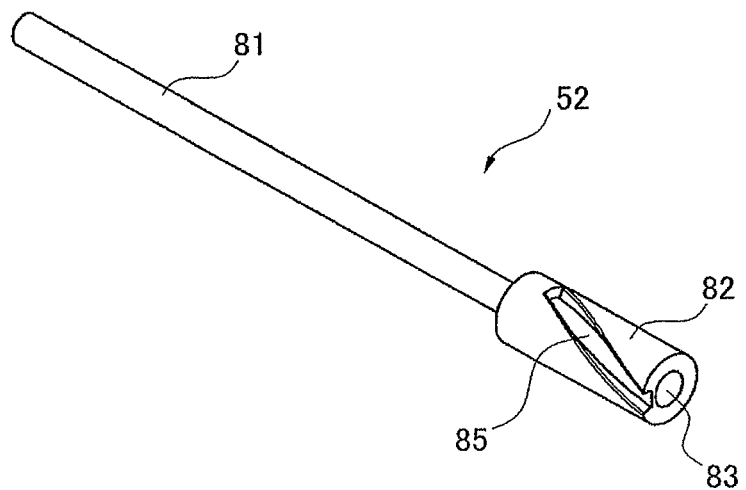
FIG. 15 is a perspective view which shows a rotary shaft of the rotary mechanism of the optical connector cleaning tool shown in FIG. 10.
Figure 16:
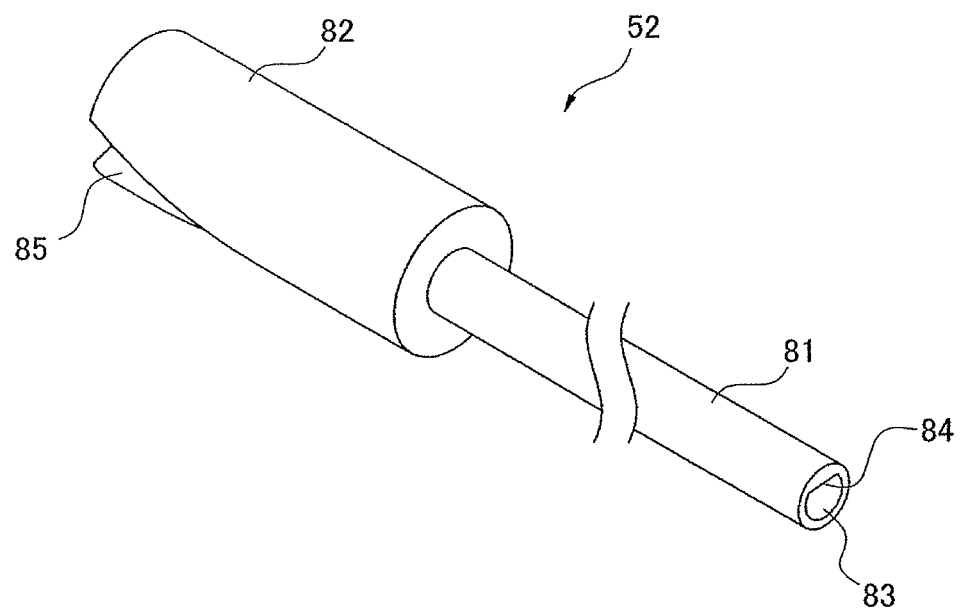
FIG. 16 is an enlarged perspective view of the essential elements of the rotary shaft of the rotary mechanism of the optical connector cleaning tool shown in FIG. 10.
Figure 17:
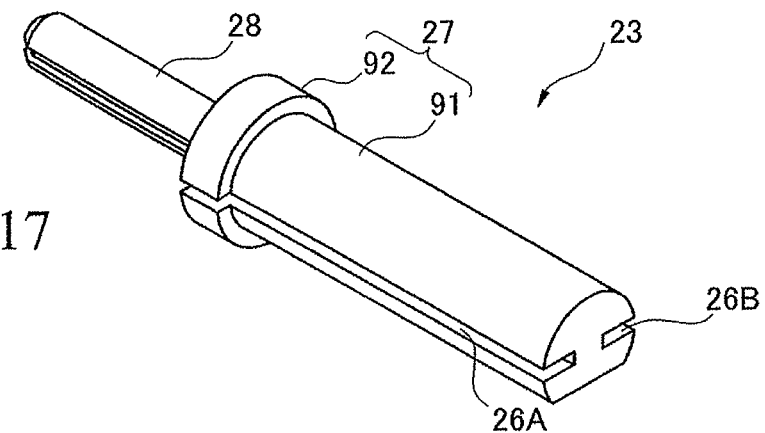
FIG. 17 is a perspective view which shows a head member of the optical connector cleaning tool shown in FIG. 10.
Figure 18A:
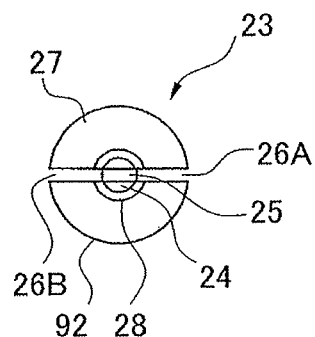
FIG. 18A is a front view of the head member of the optical connector cleaning tool shown in FIG. 10.
Figure 18B:
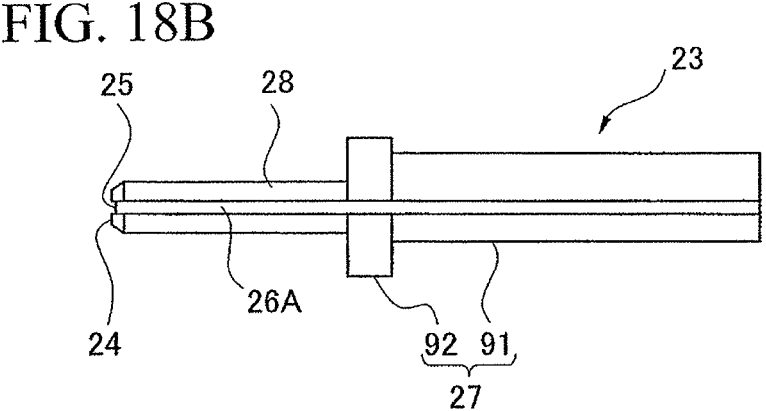
FIG. 18B is an elevation view of the head member of the optical connector cleaning tool shown in FIG. 10.
Figure 19:
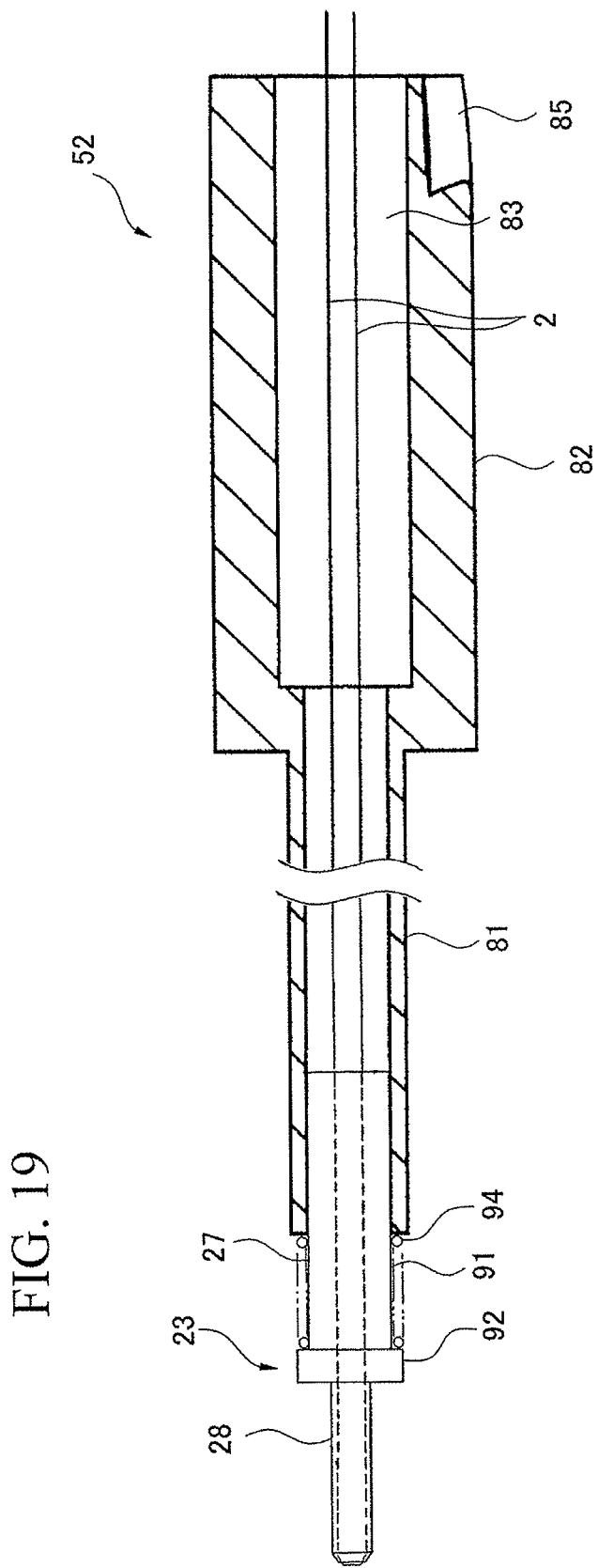
FIG. 19 is a partial cross-sectional view which shows the rotary shaft of the rotary mechanism and the head member attached to the distal end of this rotary shaft of the optical connector cleaning tool shown in FIG. 10.
Figure 20:
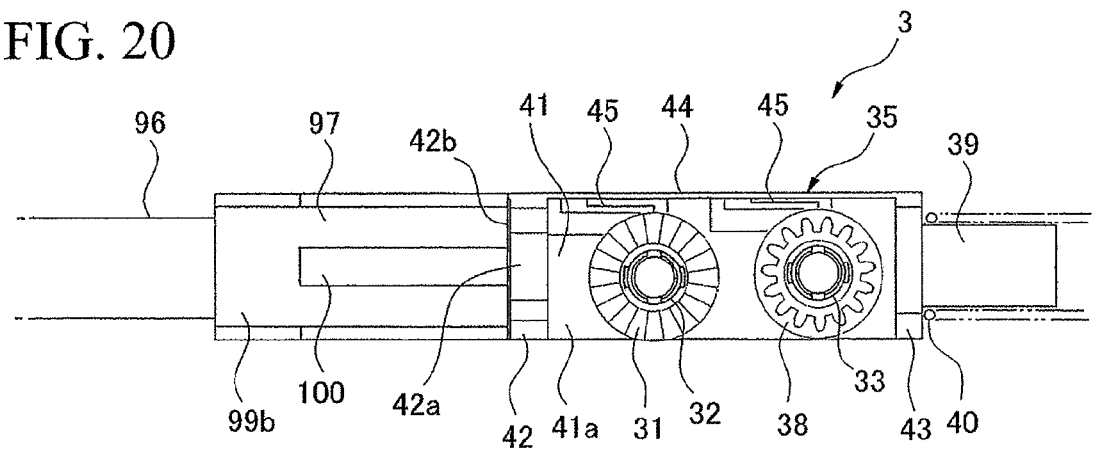
FIG. 20 is an elevation view which shows a feeding mechanism of the optical connector cleaning tool shown in FIG. 10.
Figure 21:
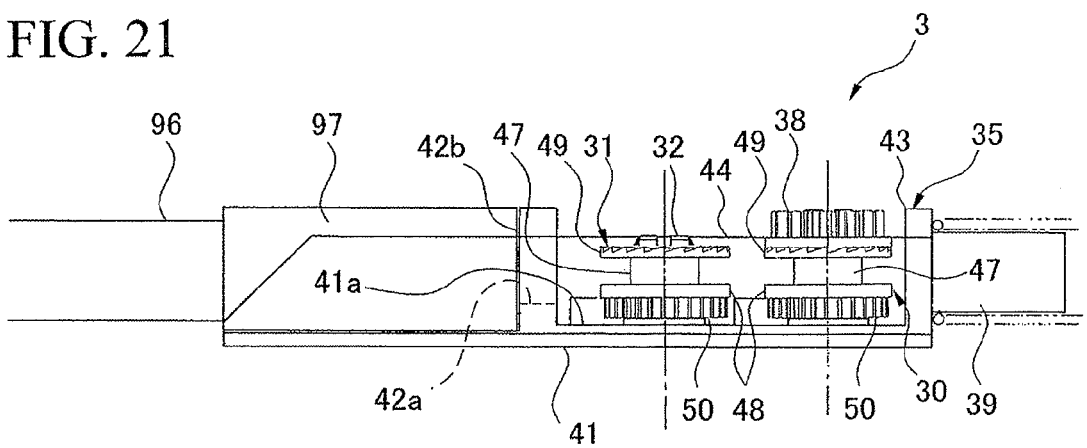
FIG. 21 is a side view of the feeding mechanism of the optical connector cleaning tool shown in FIG. 10.
Figure 22:
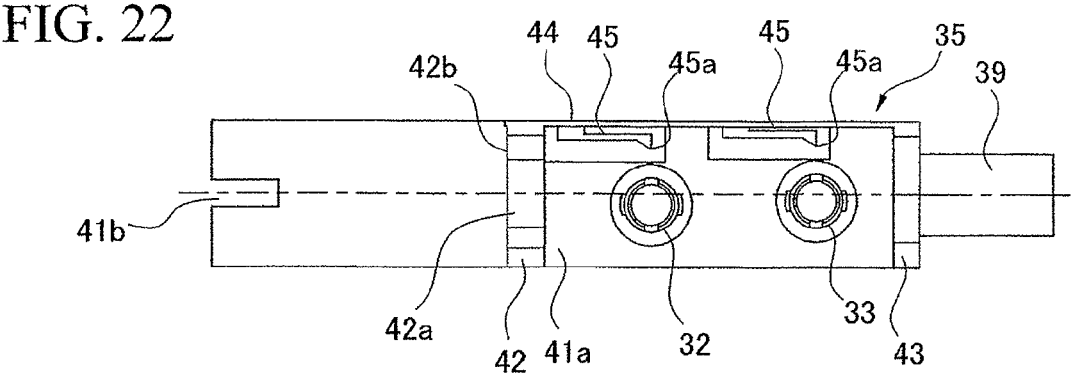
FIG. 22 is an elevation view which shows a supporting part of the feeding mechanism of the optical connector cleaning tool shown in FIG. 10.
Figure 23:
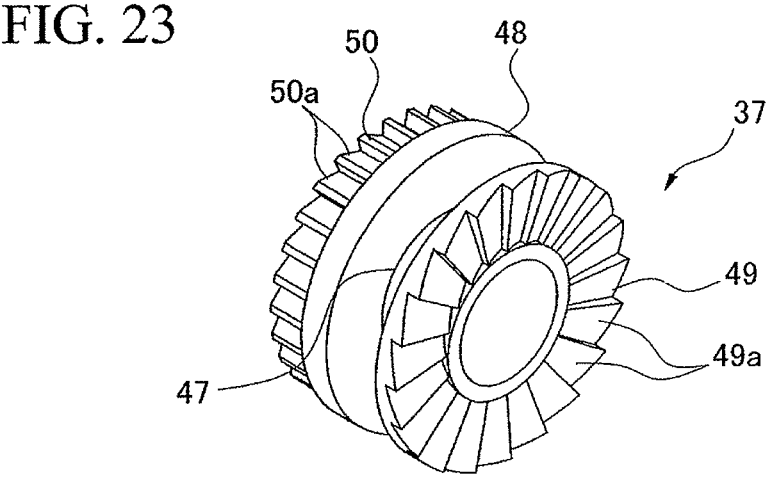
FIG. 23 is a perspective view of a bobbin used in a supply reel and a take-up reel of the feeding mechanism of the optical connector cleaning tool shown in FIG. 10.
Figure 24A:
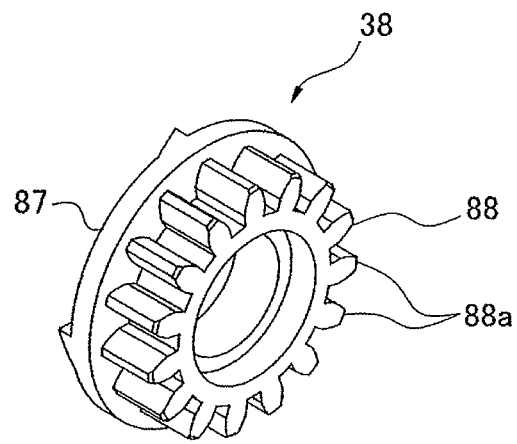
FIG. 24A is a perspective view which shows a gear used in the take-up reel of the feeding mechanism of the optical connector cleaning tool shown in FIG. 10, viewed from one side.
Figure 24B:
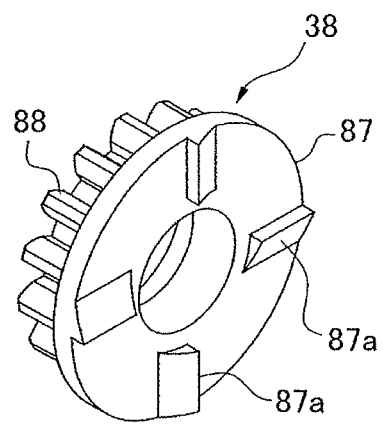
FIG. 24B is a perspective view which shows the gear used in the take-up reel of the feeding mechanism of the optical connector cleaning tool shown in FIG. 10, viewed from the other side.
Figure 25A:
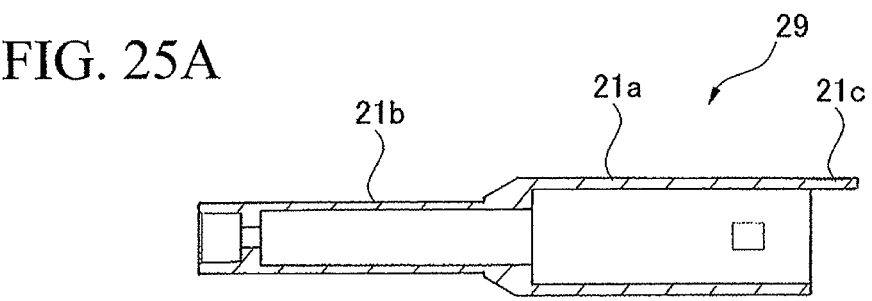
FIG. 25A is a cross-sectional view which shows a tube extremity part of an insertion tube of the optical connector cleaning tool shown in FIG. 10.
Figure 25B:
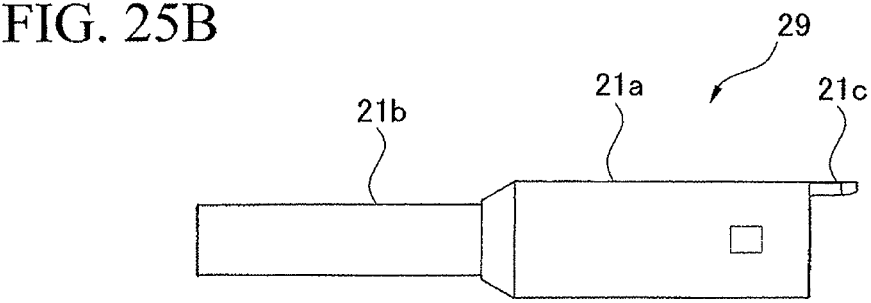
FIG. 25B is an elevation view which shows the tube extremity part of the insertion tube of the optical connector cleaning tool shown in FIG. 10.
Figure 26A:
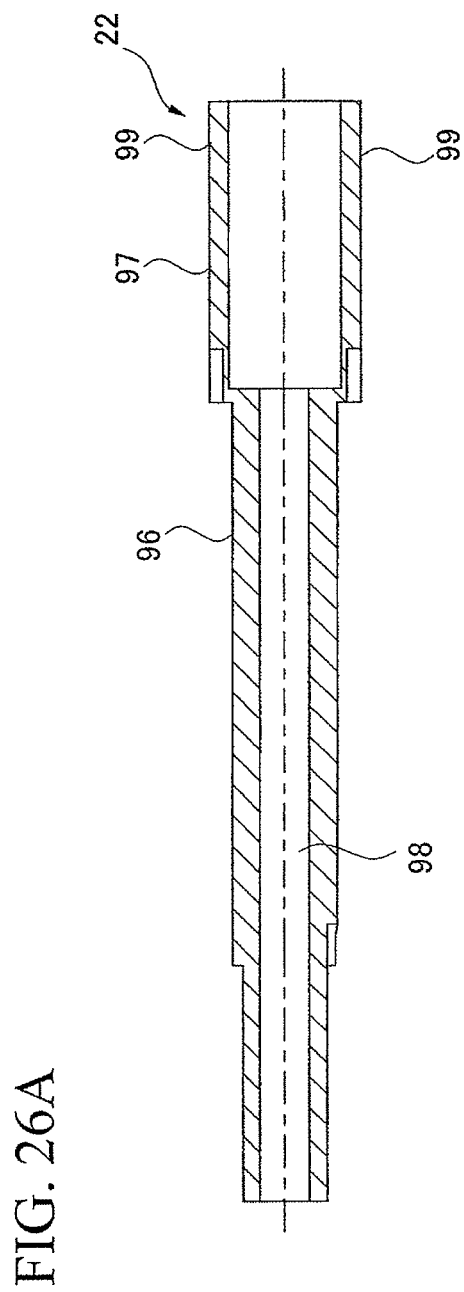
FIG. 26A is a cross-sectional view which shows a tube base part of the insertion tube of the optical connector cleaning tool shown in FIG. 10.
Figure 26B:
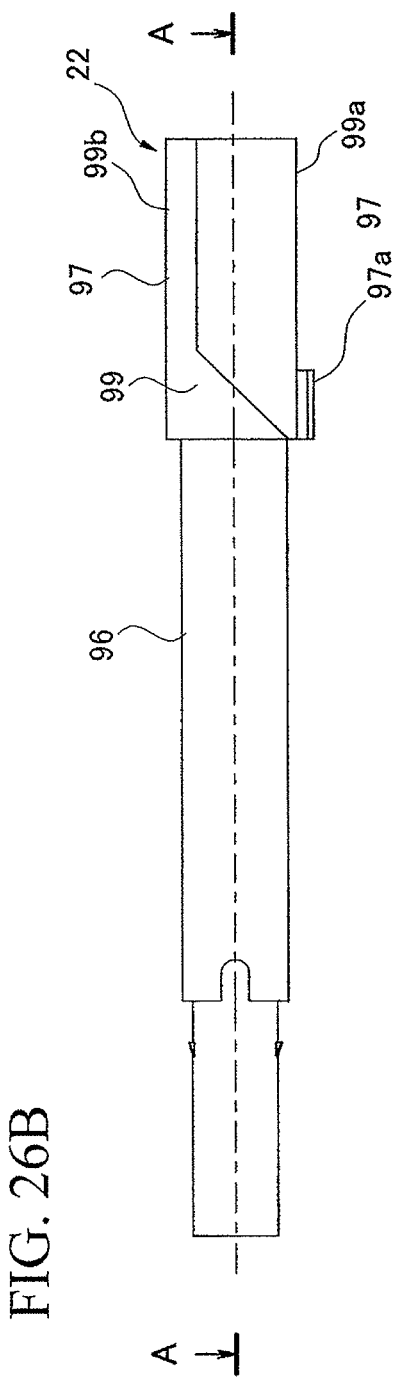
FIG. 26B is an elevation view which shows the tube base part of the insertion tube of the optical connector cleaning tool shown in FIG. 10.
Figure 26C:
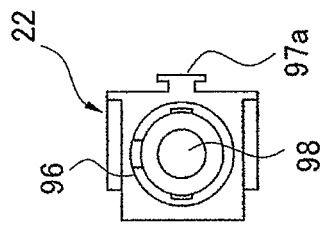
FIG. 26C is a front view which shows the tube base part of the insertion tube of the optical connector cleaning tool shown in FIG. 10.
Figure 26D:
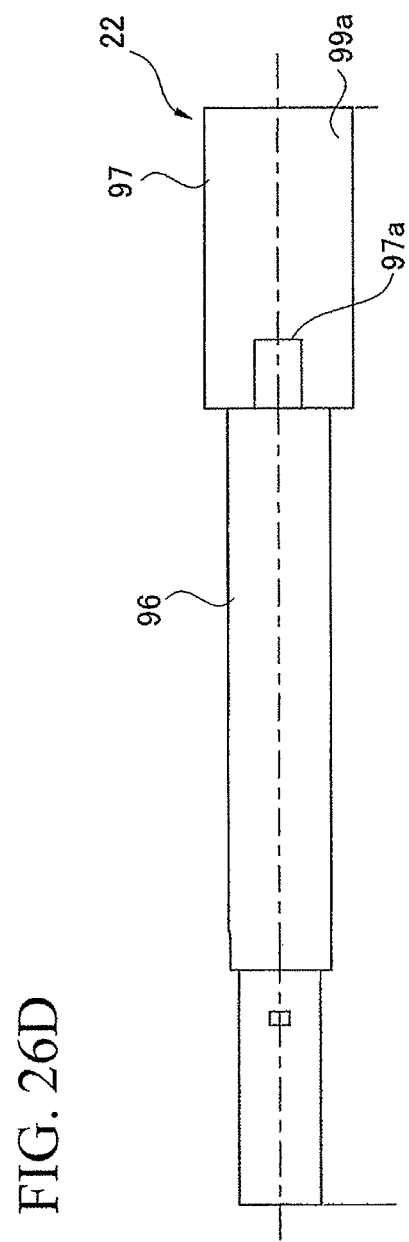
FIG. 26D is a bottom view which shows the tube base part of the insertion tube of the optical connector cleaning tool shown in FIG. 10.

FIG. 10 is a perspective view of a cleaning tool 1A of this embodiment. FIG. 11A and FIG. 11B are respectively an elevation view and a side view of the cleaning tool 1A. FIG. 12 is an exploded perspective view of the cleaning tool 1A. FIG. 13A to FIG. 13C show a supporting member 51 of a rotary mechanism 5, and are respectively an elevation view, side view, and back view thereof. FIG. 14 is a perspective view of the supporting member 51. FIG. 15 is a perspective view which shows a rotary shaft 52 of the rotary mechanism 5. FIG. 16 is an enlarged perspective view of the essential elements of the rotary shaft 52. FIG. 17 is a perspective view of the head member 23. FIG. 18A and FIG. 18B are a front view and elevation view of the head member 23. FIG. 19 is a partial cross-sectional view which shows the rotary shaft 52 and the head member 23 attached to its distal end. FIG. 20 is an elevation view which shows the feeding mechanism 3. FIG. 21 is a side view of the feeding mechanism 3. FIG. 22 is an elevation view which shows a supporting part 35 of the feeding mechanism 3. FIG. 23 is a perspective view which shows a bobbin 37 that is used in the supply reel 30 and take-up reel 31. FIG. 24A and FIG. 24B show a gear 38 which is used in the take-up reel 31, where FIG. 24A is a perspective view seen from one side, and FIG. 24B is a perspective view seen from the other side. FIG. 25A and FIG. 25B show a tube extremity part 29 of the insertion tube 21, and are respectively a cross-sectional view and an elevation view thereof. FIG. 26A to FIG. 26D show a tube base part 22 of the insertion tube 21, and are respectively a cross-sectional view, elevation view, front view, and bottom view. FIG. 26A is a fragmentary view taken in the direction of the arrows along the A-A cross-section of FIG. 26B.

As shown in FIG. 10 to FIG. 12, the cleaning tool 1A is provided with a tool body 10, and an insertion part 20 which protrudes from this tool body 10. In the below description, with respect to FIG. 11A and FIG. 11B, leftward indicates the forward direction, and rightward indicates the backward direction.

The tool body 10 is provided with the case 11, the feeding mechanism 3, and the rotary mechanism 5 which rotates the head member 23.

The case 11 is formed in a tubular shape which is approximately rectangular in cross-section. In the rear part of a side plate 11a, a positioning aperture 12 is formed into which a below-mentioned positioning protuberance 57 is inserted.

The positioning aperture 12 is formed in a slit-like shape in a longitudinal direction. At the front end and rear end thereof, first and second fitting recesses 13 and 14 are respectively formed into which the positioning protuberance 57 fits.

In the state shown in FIG. 10 to FIG. 12, the feeding mechanism 3 and the rotary mechanism 5 are positioned by fitting the positioning protuberance 57 into the second fitting recess 14 which is formed at the rear end of the positioning aperture 12.

As shown in FIG. 12 to FIG. 16, the rotary mechanism 5 is provided with a supporting member 51, and a rotary shaft 52 which can axially rotate relative to the supporting member 51.

The supporting member 51 is provided with a base plate 53 in the form of a long plate extending in the longitudinal direction, an insertion protuberance 54 which is formed so as to project from an inner face 53a of the base plate 53, side plates 55 which are formed so as to extend toward the inner face 53a side from the two side edges of the base plate 53, a serrated gear receiving part 56 which is formed on one of the side plates 55, a positioning protuberance 57 which is formed on an outer face 53b of the base plate 53, a rear end plate part 58 which is formed so as to extend toward the inner face 53a side from the edge of the rear end of the base plate 53, and a retaining protuberance 59 which is formed on a front face 58a of the rear end plate 58 so as to extend forward.

As shown in FIG. 13A to FIG. 13C and in FIG. 14, the gear receiving part 56 is composed of multiple receiving teeth 56a that are formed on the inner face of one of the side plates 55 so as to extend toward the other side plate 55. The receiving teeth 56a are arrayed in a lengthwise direction (longitudinal direction) of the supporting member 51.

The insertion protuberance 54 is formed in an approximately cylindrical shape. The protrusion height and outer diameter of the insertion protuberance 54 are set so that it can fit into a cam groove 85 of a rotary tube part 82.

As shown in FIG. 15 and FIG. 16, the rotary shaft 52 is provided with a guide tube part 81, and a rotary tube part 82 which is provided at the rear end of the guide tube part 81.

A through-hole 83 is formed within the rotary shaft 52 through which the cleaning body 2 passes. The through-hole 83 is approximately circular in cross-section, and is formed so as to extend from the front end of the guide tube part 81 to the rear end of the rotary tube part 82.

As shown in FIG. 16, the guide tube part 81 is formed in an approximately cylindrical shape, and is made such that the base part 27 of the head member 23 can fit into its front end. On the inner surface of the front end part of the guide tube part 81, a rotary stopper 84 that is formed from wall thickness is formed.

As shown in FIG. 15, the rotary tube part 82 is formed in an approximately cylindrical shape, and a cam groove 85 into which the insertion protuberance 54 of the supporting member 51 inserts is formed on its outer surface.

The cam groove 85 is formed so as to extend in a longitudinal direction, and at least a portion thereof is inclined relative to the axial direction of the rotary tube part 82. Consequently, when the rotary shaft 52 moves in the longitudinal direction, the rotary shaft 52 is axially rotated by the movement of the rotary tube part 82 along the cam groove 85.

As shown in FIG. 17 to FIG. 19, the head member 23 is provided with a base part 27, and an approximately cylindrical distal part 28 that extends from the front end of the base part 27.

The distal face of the distal part 28 constitutes the pressing face 24 which presses the cleaning body 2 against the joining end face 61a. It is preferable that the guide groove 25 which guides the feeding movement of the cleaning body 2 be formed in the pressing face 24.

It is preferable that guide grooves 26A and 26B which guide the feeding movement of the cleaning body 2 be formed on the side faces of the base part 27 and distal part 28. The distal end of the distal part 28 protrudes from the distal tube part 21b.

The base part 27 has an insertion part 91 that inserts into the through-hole 83 of the guide tube part 81, and a flange 92 that is formed at the front end of the insertion part 91.

A notch 93 with a shape that matches the rotary stopper 84 formed in the guide tube part 81 is formed in the insertion part 91. By engagement of the notch 93 with the rotary stopper 84, the head member 23 is prevented from rotating relative to the guide tube part 81.

As shown in FIG. 19, the cleaning body 2 passes from the supply reel 30 through the interior of the insertion tube 21, transits the pressing face 24 of the head member 23, and is taken up by the take-up reel 31.

Code number 94 in FIG. 19 is a biasing means (e.g., a coil spring) which is provided between the front end of the guide tube part 81 and the flange 92. The biasing means 94 may be configured so that the head member 23 is biased forward when the head member 23 is pressed against the joining end face 61a.

As shown in FIG. 20 to FIG. 22, the feeding mechanism 3 is provided with a supply reel 30 on which the cleaning body 2 is wound, a take-up reel 31 which takes up and recovers the cleaning body 2 after use, a supporting part 35 which is installed to enable these to rotate, a gear 38 which is attached to the take-up reel 31, a retaining tube 39 which is formed on the supporting part 35, and a biasing means 40 (e.g., a coil spring) which is attached to the retaining tube 39.

The supporting part 35 is provided with a base plate 41 in the form of a long plate that extends in the longitudinal direction, a supply reel support shaft 32 which is provided on an inner face 41a of the base plate 41, and which is installed to enable rotation of the supply reel 30, a take-up reel support shaft 33 which is installed to enable rotation of the take-up reel 31, a dividing plate 42 which is formed so as to extend from the lengthwise central part of the base plate 41 toward its inner face 41a side, a rear end plate 43 which is formed so as to extend from the rear end of the base plate 41 toward its inner face 41a side, and a side plate 44 which is formed so as to extend from one of the side edges of the base plate 41 toward its inner face 41a side.

A transit recess 42a through which the cleaning body 2 passes is formed in the dividing plate 42.

The supply reel support shaft 32 is formed farther toward the rear than the dividing plate 42. The take-up reel support shaft 33 is formed farther toward the rear than the supply reel support shaft 32.

Two extending plates 45, 45 which extend rearward are formed on the inner face of the side plate 44, and engagement claws 45a, 45a which respectively project toward the reels 30 and 31 are formed at the distal end of the extending plates 45. The extending plates 45 are elastically formed so as to be capable of bending deformation, and the engagements claws 45a are moved toward or away from the reels 30 and 31 by the bending deformation of the extending plates 45.

A notch 41b into which fits a below-mentioned fitting projection 97a of the tube base part 22 of the insertion tube 21 is formed at the front end of the base plate 41.

The retaining tube 39 is cylindrically formed, and is formed so as to extend backward from the rear face of the rear end plate 43.

Figure 29:
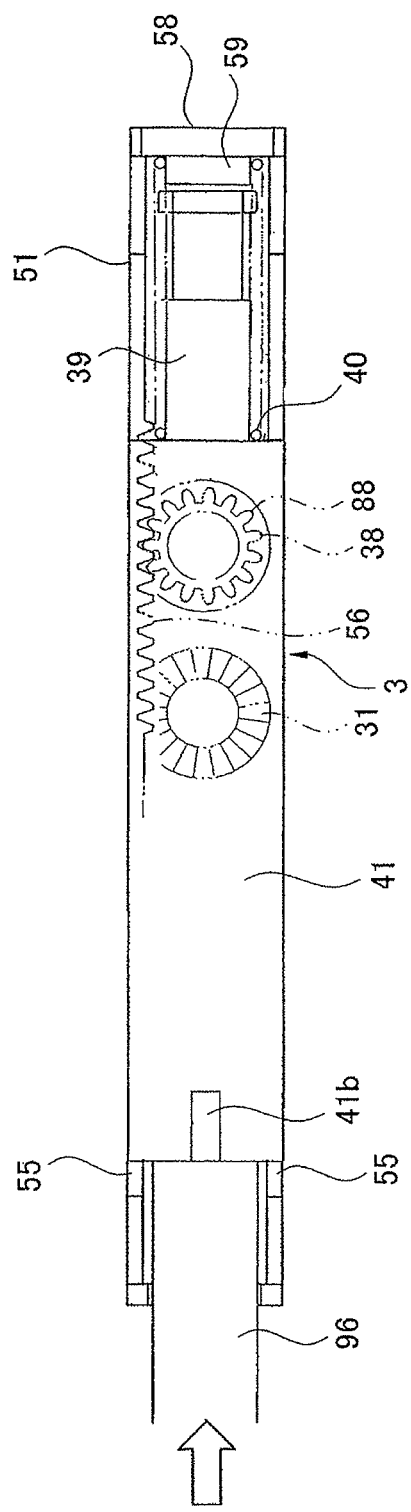
FIG. 29 is a partial cross-sectional view which serves to describe the operation of the optical connector cleaning tool shown in FIG. 10.
Figure 30:
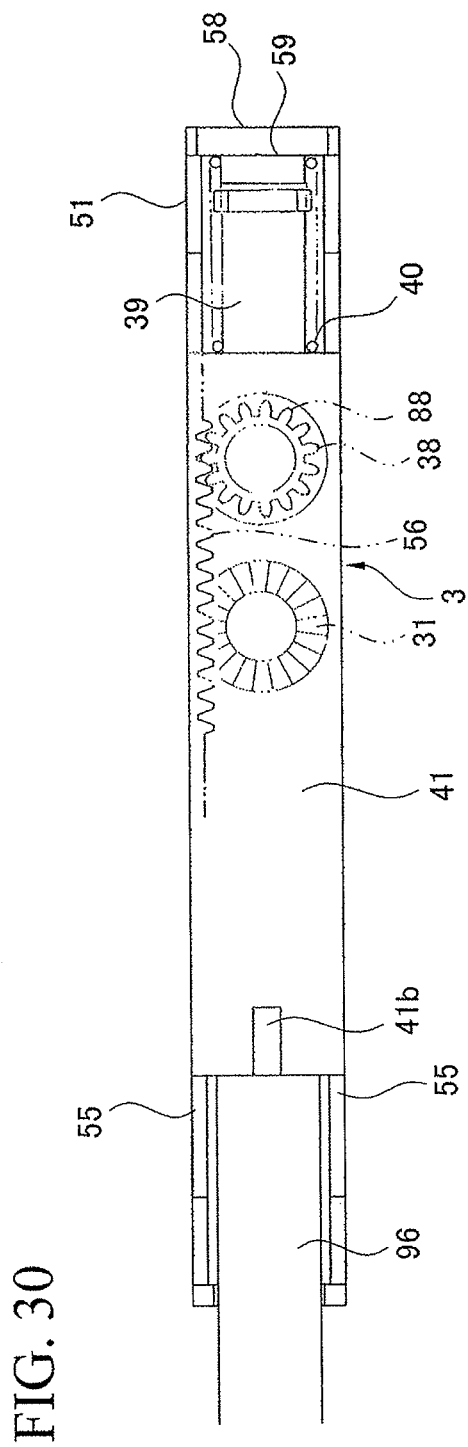
FIG. 30 is a partial cross-sectional view which serves to describe the operation of the optical connector cleaning tool shown in FIG. 10.

The front end of the biasing means 40 contacts the rear end plate 43, and its rear end contacts the rear end plate part 58 in a state of engagement with the retaining protuberance 59 of the supporting member 51 (see FIG. 29 and FIG. 30).

As shown in FIG. 23, the supply reel 30 and the take-up reel 31 are each composed from a bobbin 37.

The bobbin 37 is provided with a barrel 47 around which the cleaning body 2 is wound, a first end plate 48 which is provided at one end of the barrel 47, a second end plate 49 which is provided at the other end of the barrel 47, and an engagement teeth section 50 which is provided in the first end plate 48.

The engagement teeth section 50 is provided with multiple teeth 50a which are arrayed in the circumferential direction, and rotation of the bobbin 37 in a reverse direction is blocked by the engagement of the extending plate 45 with the engagement claw 45a.

Multiple engagement protuberances 49a which are arrayed in the circumferential direction are formed in the second end plate 49.

The bobbin 37 is attached to the supporting part 35 by passage of the support shaft 32, 33 through the barrel 47.

As shown in FIG. 24A and FIG. 24B, the gear 38 has a discoid base plate 87, and a gear wheel 88 which is formed on one face of the base plate 87. On the other face of the base plate 87, engagement projections 87a are formed which engage with the engagement protuberances 49a of the bobbin 37.

The gear wheel 88 has multiple teeth 88a which are arrayed in the circumferential direction, and these teeth 88a are capable of engaging with the gear receiving part 56 of the supporting member 51.

The gear 38 is disposed so as to overlap the second end plate 49 of the bobbin 37 used as the take-up reel 31. As the engagement projections 87a of the base plate 87 engage with the engagement protuberances 49a of the second end plate 49, the bobbin is also rotated in conformity with rotation of the gear 38.

As shown in FIG. 12, the insertion tube 21 is provided with a tube base part 22 and a tube extremity part 29 that is provided at the distal end of the tube base part 22.

As shown in FIG. 25A and FIG. 25B, the tube extremity part 29 has a cylindrical basal tube part 21a, and a cylindrical distal tube part 21b which extends forward from the distal end of the basal tube part 21a. It is removable from the tube base part 22.

It is preferable that the distal tube part 21b be formed narrower than the basal tube part 21a, and that it be formed so that it is positioned upon insertion into the connector housing hole 72.

As a fitting protuberance 21c which fits into the fitting recess 22a that is formed in the tube base part 22 is formed at the rear end of the basal tube part 21a, rotation of the tube extremity part 29 is blocked.

As shown in FIG. 26A to FIG. 26D, the tube base part 22 is provided with a communicating tube part 96, and a holding frame 97 which is disposed at the rear end of the communicating tube part 96.

A through-hole 98 through which the rotary shaft 52 passes is formed within the tube base part 22.

The communicating tube part 96 is formed in an approximately cylindrical shape, and is configured so that the guide tube part 81 of the rotary shaft 52 passes through it.

The holding frame 97 is formed in a tubular shape which is rectangular in cross-section, and is capable of housing the rotary tube part 82 of the rotary shaft 52 within it.

A fitting projection 97a which fits the notch 41b of the supporting part 35 of the feeding mechanism 3 is formed on one side plate 99a of the four side plates 99 which configure the holding frame 97.

A slit 100 into which the insertion protuberance 54 of the supporting member 51 of the rotary mechanism 5 is inserted is formed in the longitudinal direction in the side plate 99b that faces the side plate 99a (see FIG. 20).

The holding frame 97 may be provided at a position where it is capable of contacting the front face of the dividing plate 42 of the feeding mechanism 3.

The feeding mechanism 3 and rotary mechanism 5 can be moved within the case 11.

In the state shown in FIG. 10 to FIG. 12, as the positioning protuberance 57 of the supporting member 51 of the rotary mechanism 5 is engaged with the second fitting recess 14 that is formed at the rear end of the positioning aperture 12 of the case 11, the feeding mechanism 3 and rotary mechanism 5 are positioned comparatively rearward within the case 11.

This position is referred to as a rearward position.

It is possible to position the feeding mechanism 3 and rotary mechanism 5 forward from the aforementioned rearward position by pressing the positioning protuberance 57, releasing its engagement with the second fitting recess 14, moving it forward along the positioning aperture 12, and engaging it with the first fitting recess 13. This position is referred to as a forward position.

By disposing the feeding mechanism 3 and rotary mechanism 5 at the forward position, the insertion part 20 can also be moved and positioned forward.

Figure 31:
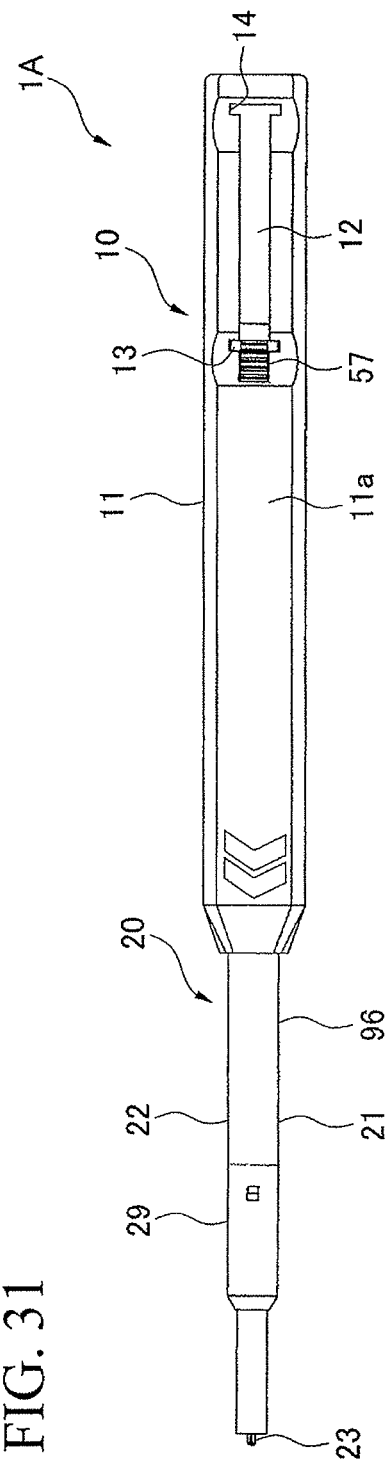
FIG. 31 is an elevation view which shows the state where the insertion part of the optical connector cleaning tool shown in FIG. 10 is extended.

FIG. 31 shows the cleaning tool 1A in a state where the insertion part 20 is in the forward position.

In this state, the insertion part 20 which is the part that extends from the tool body 10 is lengthened. Consequently, when conducting cleaning operations, it is possible to prevent the exercise of adverse effects on other optical adapters 70 that are adjacent to the target optical adapter 70.

As shown in FIG. 10 to FIG. 12, a cap 15 which covers the distal tube part 21b can be attached to the distal end of the insertion part 20. The cap 15 is provided with a distal plate part 16 and a tube part 17 which extends from the periphery of the distal plate part 16. The head member 23 can be protected by use of the cap 15.

Next, one example of the method of use of the cleaning tool 1A is described.

Figure 27:
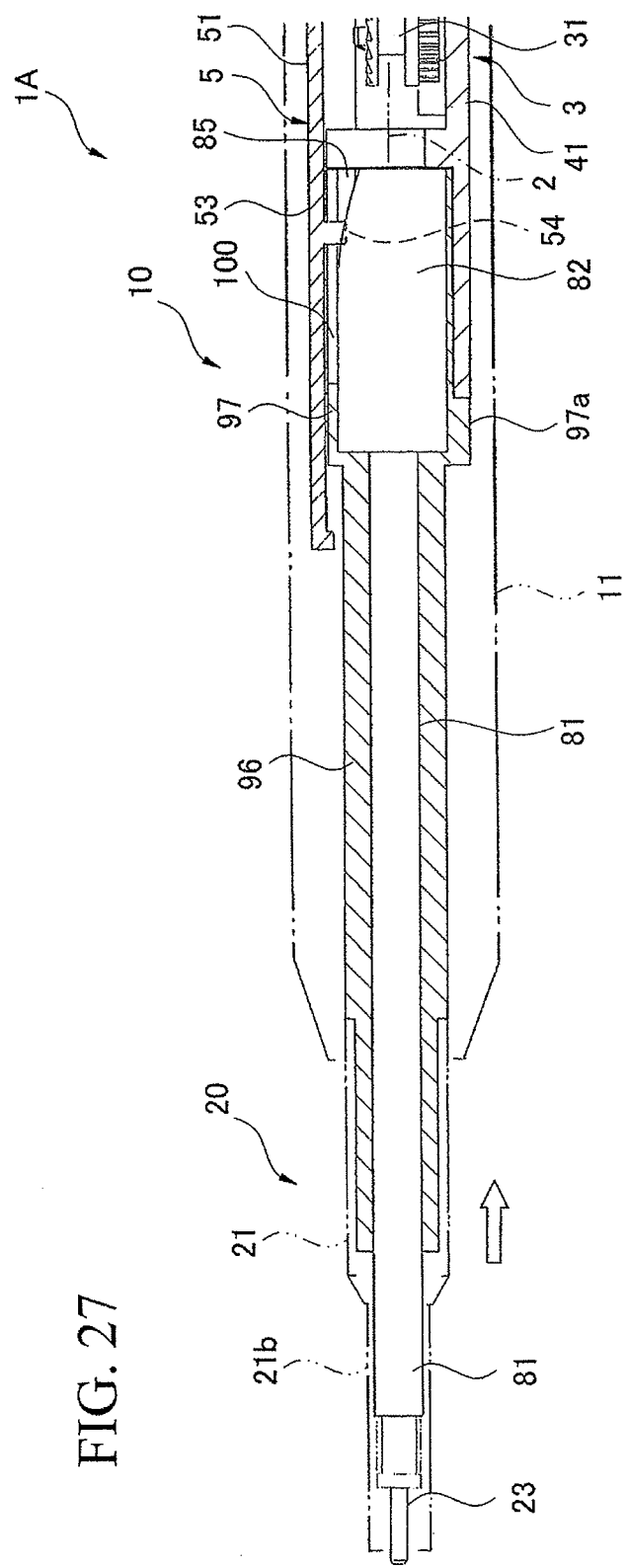
FIG. 27 is a partial cross-sectional view which serves to describe the operation of the optical connector cleaning tool shown in FIG. 10.

As shown in FIG. 6 to FIG. 8 and in FIG. 27, when the distal tube part 21b of the insertion part 20 is inserted from the connector insertion port 71 of the optical adapter 70, the distal tube part 21b enters the connector housing hole 72 while its outer surface is positioned by the inner wall 70a of the optical adapter 70.

By this means, the cleaning body 2 on the pressing face 24 contacts the appropriate position (in this instance, the optical fiber hole 61b and its periphery) of the joining end face 61a of the optical plug 60.

Figure 28:
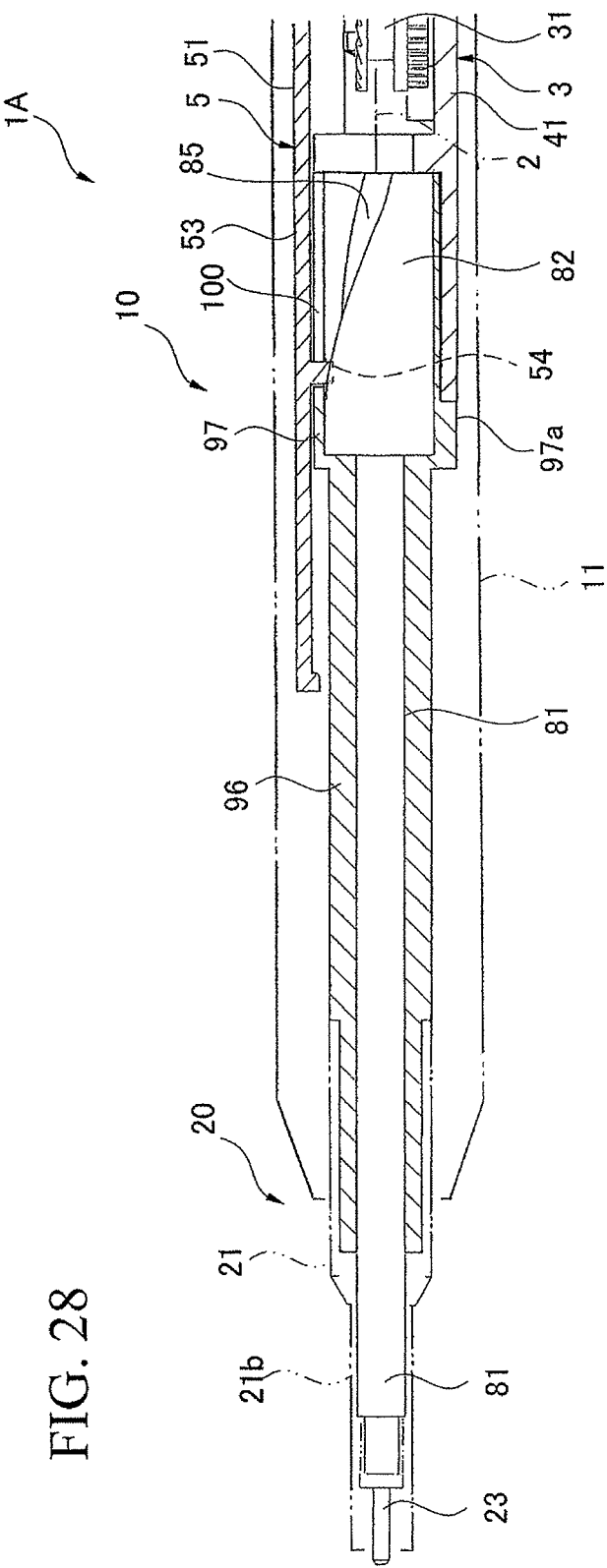
FIG. 28 is a partial cross-sectional view which serves to describe the operation of the optical connector cleaning tool shown in FIG. 10.

As shown in FIG. 27 and FIG. 28, when the tool body 10 is pressed further in the insertion direction, the tool body 10 moves in this direction. At this time, the distal end of the insertion part 20 presses the ferrule 61 and the wall within the optical adapter 70, and the relative position of the insertion part 20 with respect to the tool body 10 moves from the normal position P1 toward the contracted position P2 (see FIG. 1).

Due to the movement of this insertion part 20, the rotary shaft 52 is moved backward relative to the supporting member 51.

As a result, the rotary tube part 82 moves along the cam groove 85, and the rotary shaft 52 is axially rotated.

The head member 23 is axially rotated by the rotation of the rotary shaft 52, with the result that the cleaning body 2 rotates around the axis of the head member 23 while in a state of contact with the joining end face 61a, and the joining end face 61a is wiped clean.

As shown in FIG. 29 and FIG. 30, when the tool body 10 moves in the insertion direction, it presses the insertion part 20, and the feeding mechanism 3 also moves backward.

Due to the movement of the feeding mechanism 3 relative to the supporting member 51, force in the rotational direction is imparted to the gear wheel 88 of the gear 38 by the gear receiving part 56. The take-up reel 31 also rotates due to the rotation of the gear 38, thereby taking up the cleaning body 2.

In conjunction with this, the cleaning body 2 is unwound from the supply reel 30, and undergoes feeding movement by transiting the pressing face 24 of the head member 23. The take-up length of the cleaning body 2 resulting from a single movement of the tool body 10 is a fixed quantity.

Contamination such as dirt, dust, and oil adhering to the joining end face 61a is reliably wiped off by the feeding movement of the cleaning body 2.

When pressing in the insertion direction is stopped, and when the insertion part 20 is withdrawn from the optical adapter 70, the insertion part 20 is moved from the contracted position P2 to the normal position P1 by the elastic force of the biasing means 40 (see FIG. 1).

In the cleaning tool 1A, the rotary mechanism 5 is provided which is equipped with the supporting member 51, and the rotary shaft 52 which is capable of axial rotation relative to the supporting member 51.

As the rotary shaft 52 is provided with the rotary tube part 82 in which is formed the cam groove 85 into which the insertion protuberance 54 that is formed in the supporting member 51 is inserted, and as it is configured so as to axially rotate by movement of the rotary tube part 82 along the cam groove 85 resulting from longitudinal movement, it is possible to cause axial rotation of the head member 23 by a simple mechanism.

As the structure of the rotary mechanism 5 is simple, the size of the tool body 10 can be reduced, and the entirety can be downsized.

In the cleaning tool 1A, the feeding mechanism 3 is provided with the supply reel 30, the take-up reel 31, and the gear 38 which is attached to the take-up reel 31. The gear 38 is capable of engaging with the gear receiving part 56, is rotated by the gear receiving part 56 according to the movement of the feeding mechanism 3, and causes rotation of the take-up reel 31, thereby enabling the cleaning body 2 to be reeled in. Consequently, the cleaning body 2 can be made to undergo feeding movement by a simple mechanism.

As the structure of the feeding mechanism 3 is simple, the size of the tool body 10 can be reduced, and the entirety can be downsized.

In the cleaning tool 1A, as the insertion tube 21 is provided with the tube base part 22 and the tube extremity part 29 which may be attached to and removed from this, it is possible to use the tube extremity part 29 which has the distal tube part 21b with a shape corresponding to the shape of the connector housing hole 72 of the optical adapter 70.

Accordingly, application to multiple types of optical adaptors 70 is possible.

The present invention may be applied to various types of optical fiber connectors. For example, it may be applied to single-core optical connectors such as the SC type optical connector (SC: Single fiber Coupling optical fiber connector) which is regulated by JIS C 5973, the MU type optical connector (MU: Miniature-Unit coupling optical fiber connector) which is regulated by JIS C 5983, the LC type optical connector (trademarked by Lucent Co.), and the SC2 type optical connector. As to the SC2 type optical connector, it eliminates the latch attached to the outer side of the housing from the SC type optical connector.

The illustrated examples concerned the optical plug 60 and optical adapter 70, but the object of the cleaning tool of the present invention is not limited thereto, and a configuration may also be adopted wherein an optical connector receptacle (specifically, a receptacle housing) is made to function as a positioning housing for connectors.

In this case, the ferrule which is incorporated into the sleeve-shaped receptacle housing functions as the optical connector pertaining to the present invention. The joining end face of the ferrule is cleaned by inserting the insertion part of the cleaning tool into the connector housing hole which is the interior space of the receptacle housing.

The structure of a cleaning tool 101 which is a third embodiment of the cleaning tool of the present invention is described below.

Figure 32:
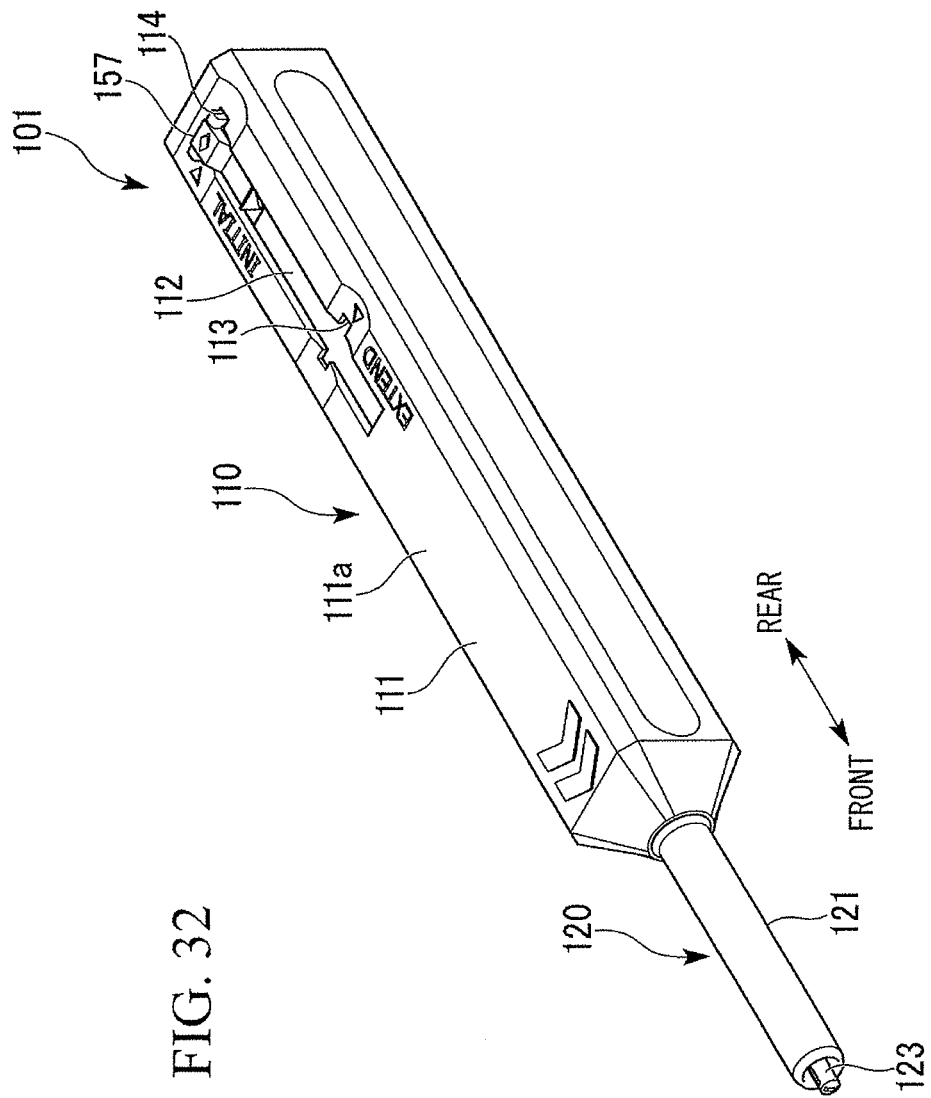
FIG. 32 is a perspective view which shows one embodiment of the optical connector cleaning tool of the present invention.
Figure 33:
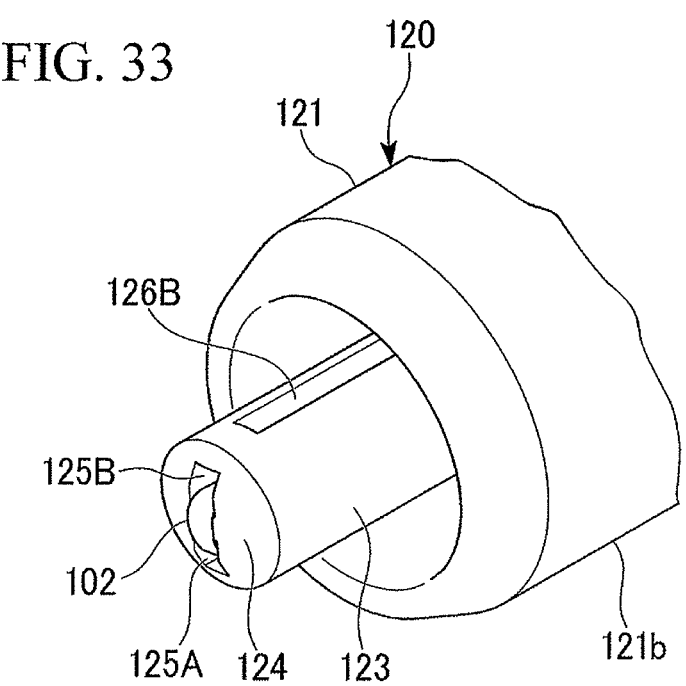
FIG. 33 is an enlarged perspective view of the essential elements of the optical connector cleaning tool shown in FIG. 32.
Figure 34A:
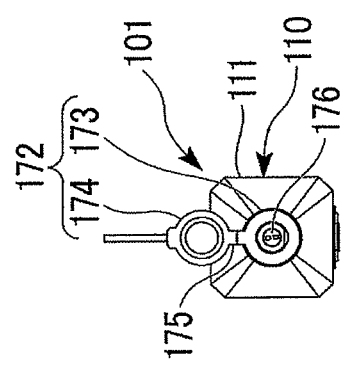
FIG. 34A is a front view of the optical connector cleaning tool shown in FIG. 32.
Figure 34B:
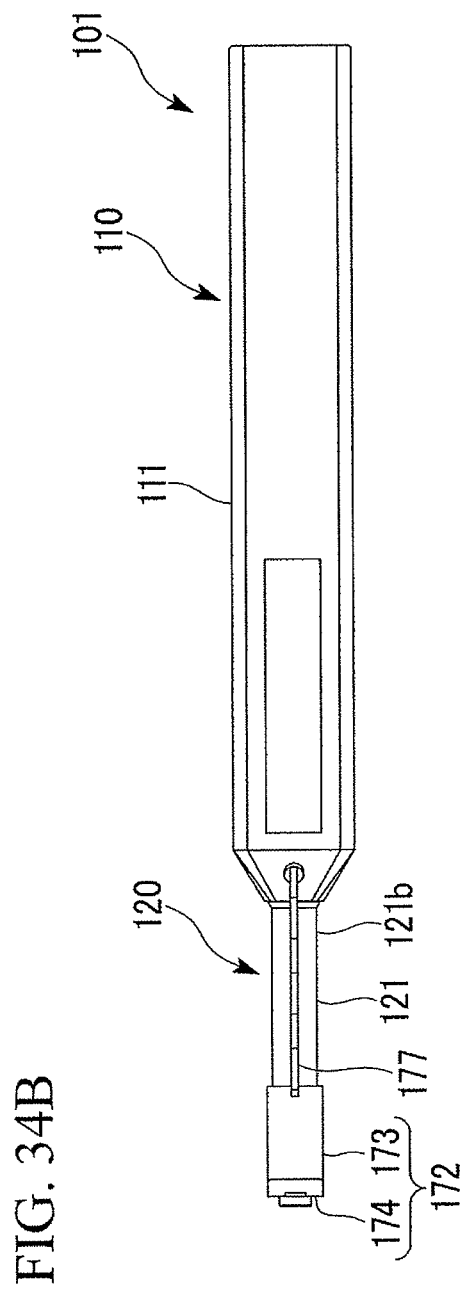
FIG. 34B is a back view of the optical connector cleaning tool shown in FIG. 32.
Figure 34D:
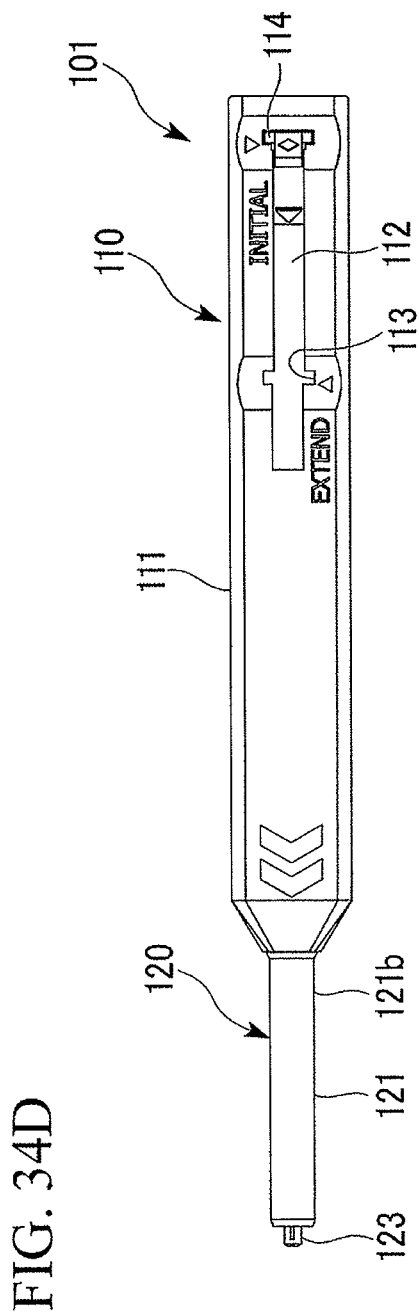
FIG. 34D is an elevation view of the optical connector cleaning tool shown in FIG. 32.
Figure 35:
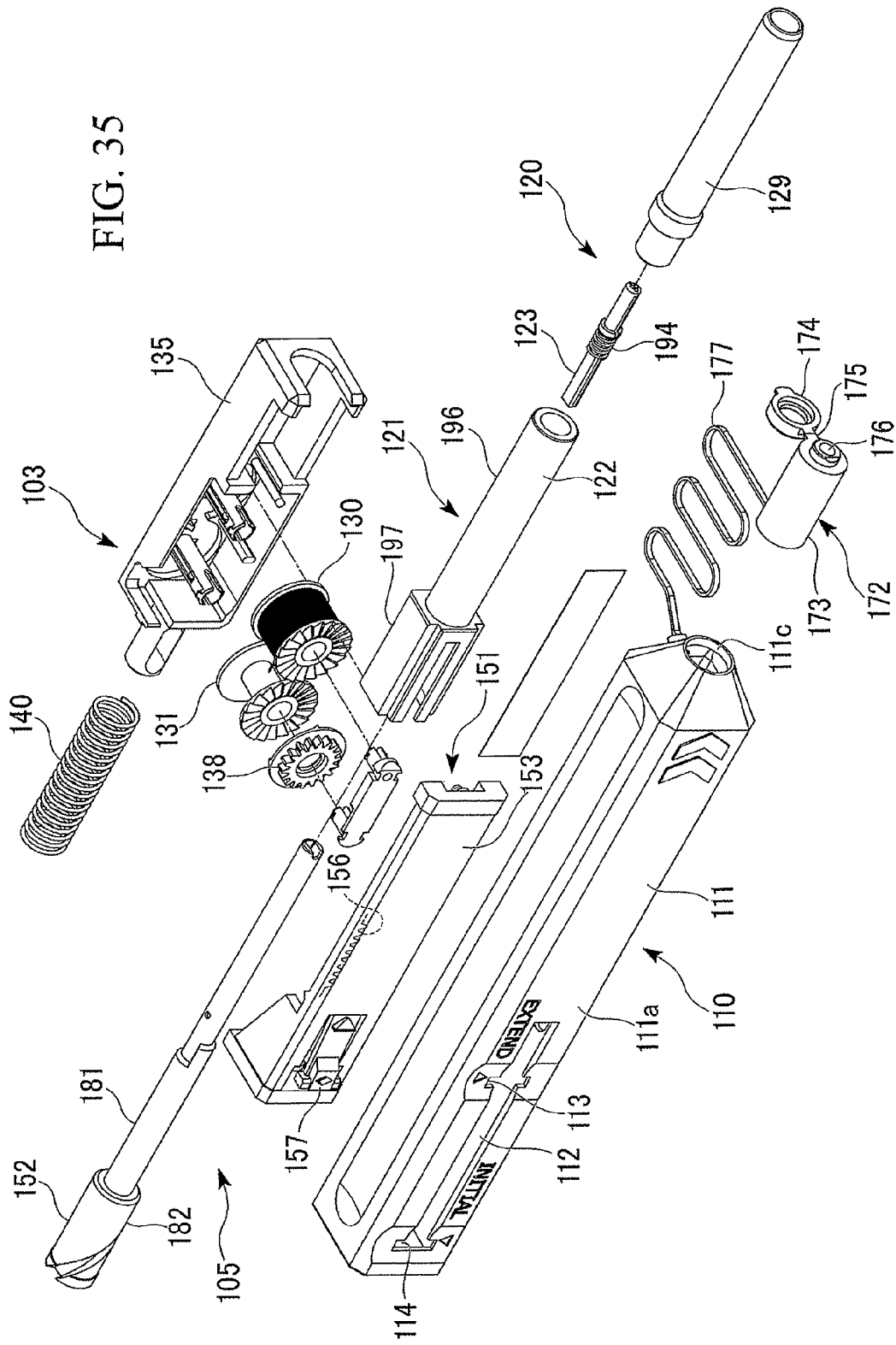
FIG. 35 is an exploded perspective view of the optical connector cleaning tool shown in FIG. 32.
Figure 36A:
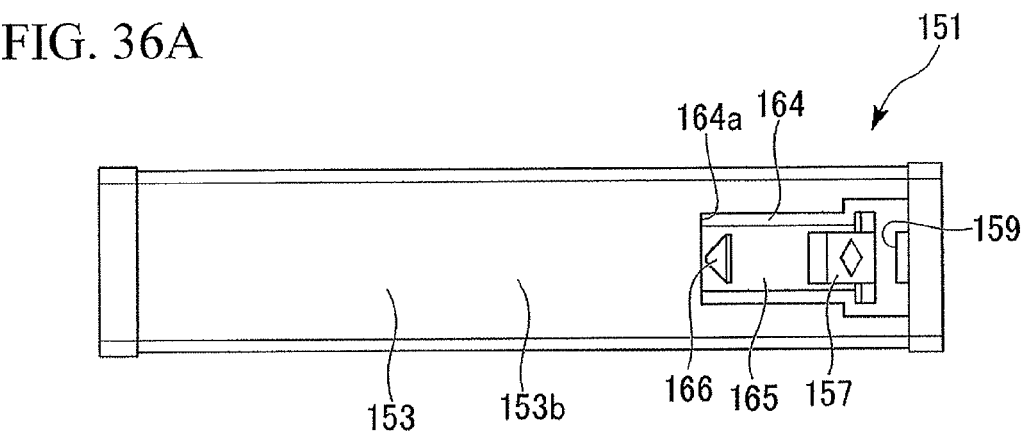
FIG. 36A is an elevation view which shows the supporting member of the rotary mechanism of the optical connector cleaning tool shown in FIG. 32.
Figure 36B:
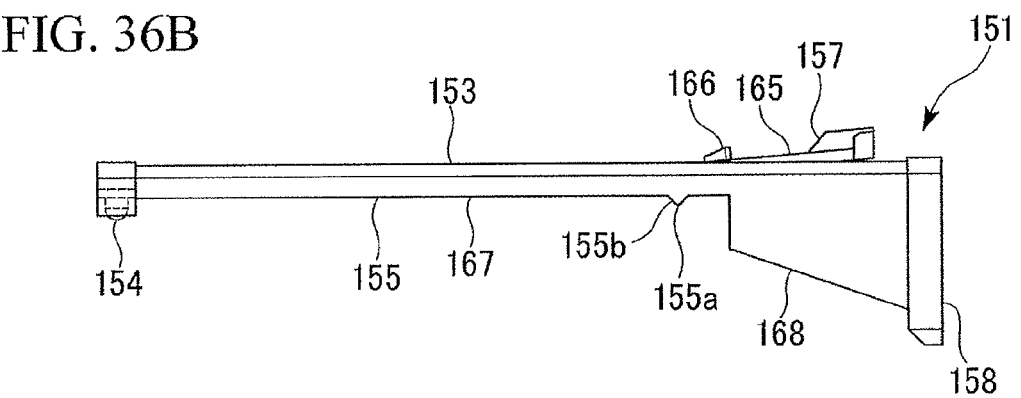
FIG. 36B is a side view which shows the supporting member of the rotary mechanism of the optical connector cleaning tool shown in FIG. 32.
Figure 36C:
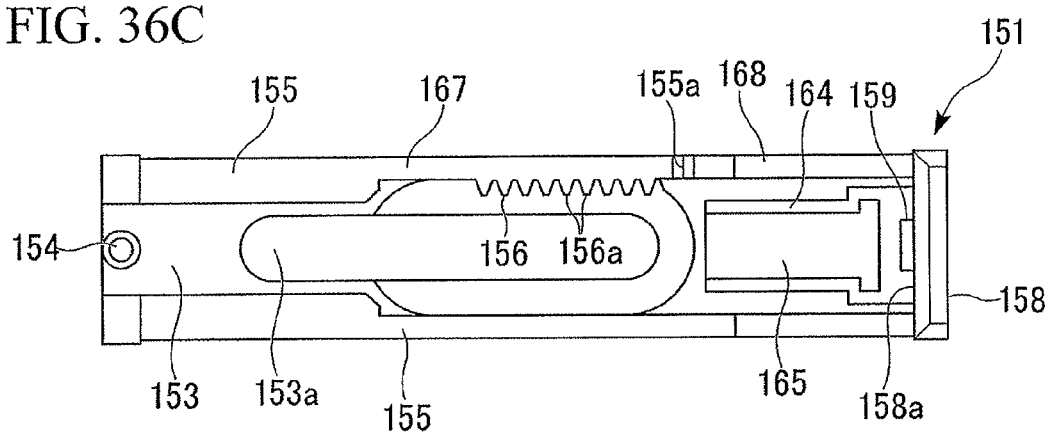
FIG. 36C is a back view which shows the supporting member of the rotary mechanism of the optical connector cleaning tool shown in FIG. 32.
Figure 37:
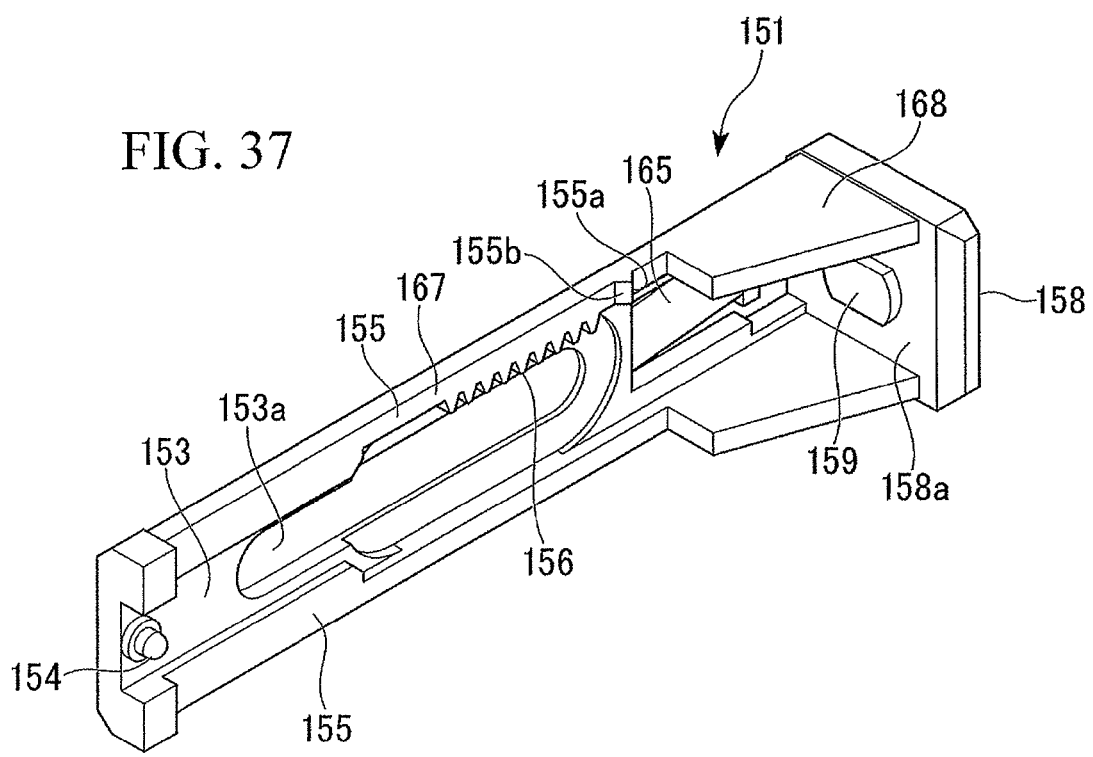
FIG. 37 is a perspective view of the supporting member of the optical connector cleaning tool shown in FIG. 32.
Figure 38:
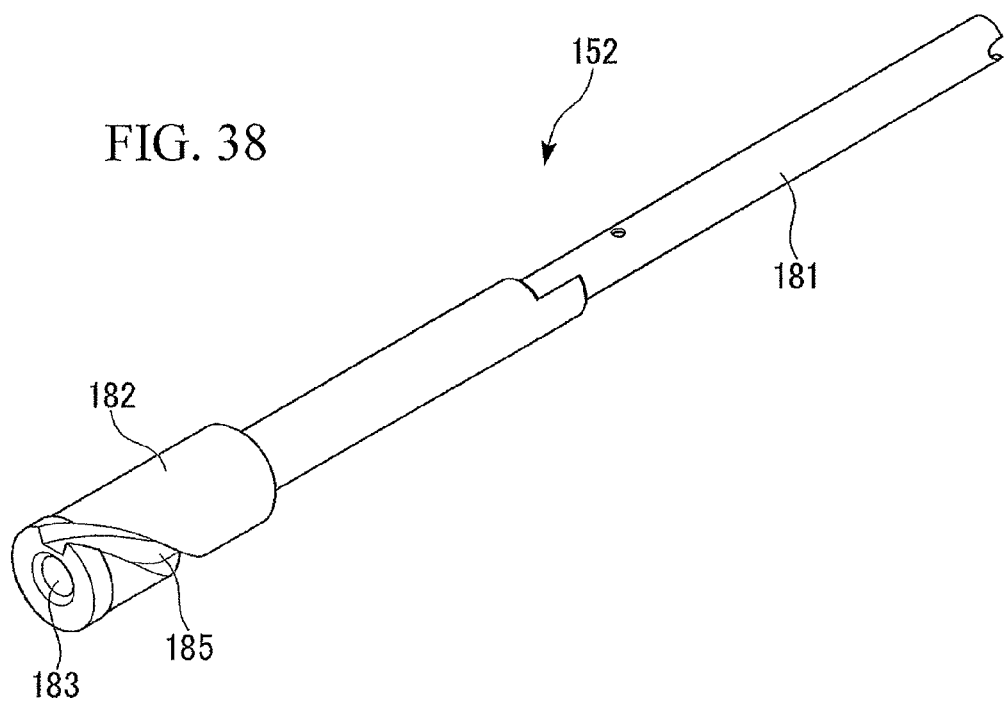
FIG. 38 is a perspective view which shows the rotary shaft of the rotary mechanism of the optical connector cleaning tool shown in FIG. 32.
Figure 39:
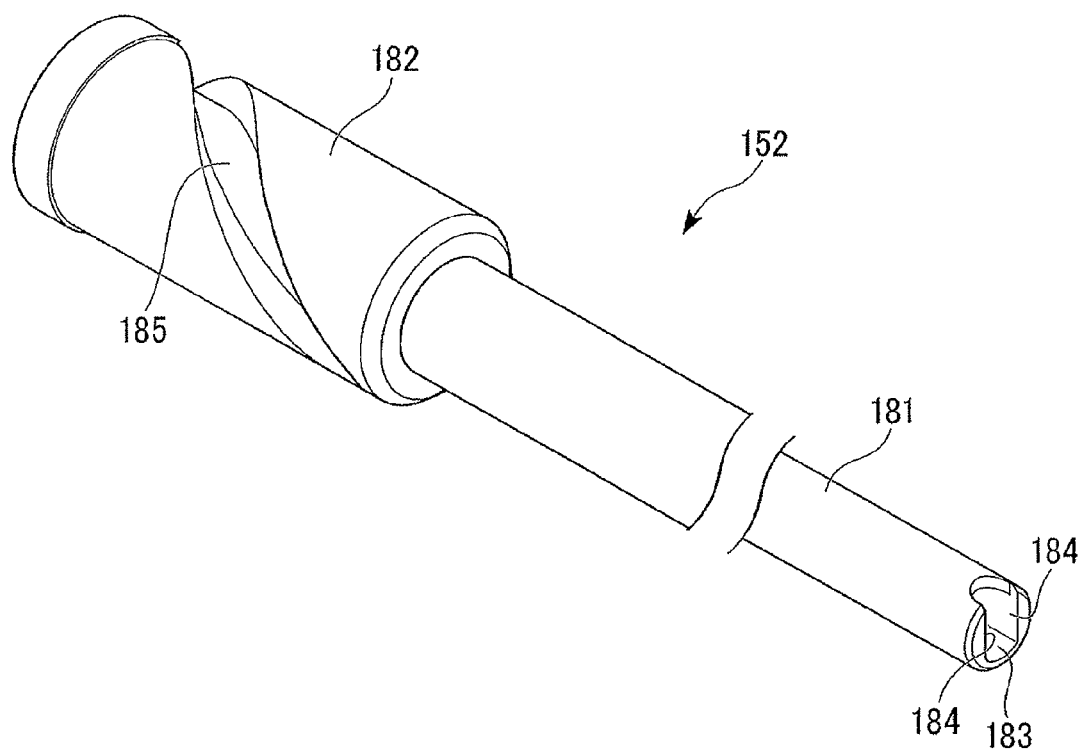
FIG. 39 is an enlarged perspective view of the essential elements of the rotary shaft of the optical connector cleaning tool shown in FIG. 32.
Figure 40:
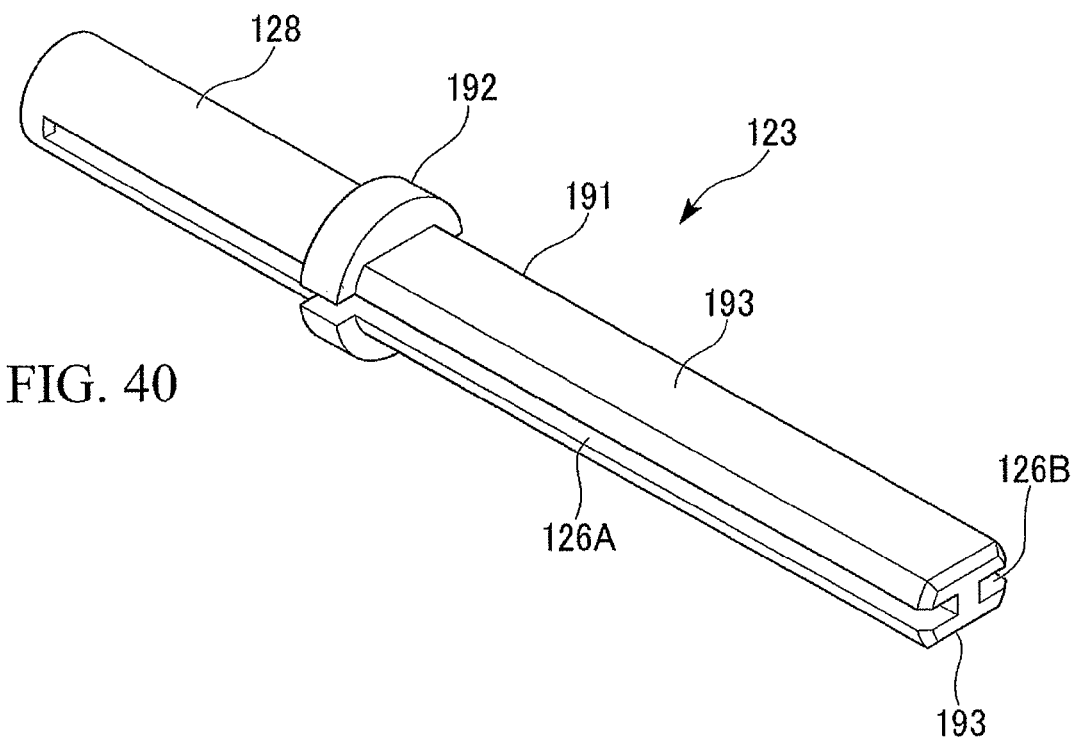
FIG. 40 is a perspective view of the head member of the optical connector cleaning tool shown in FIG. 32, viewed from one side.
Figure 41:
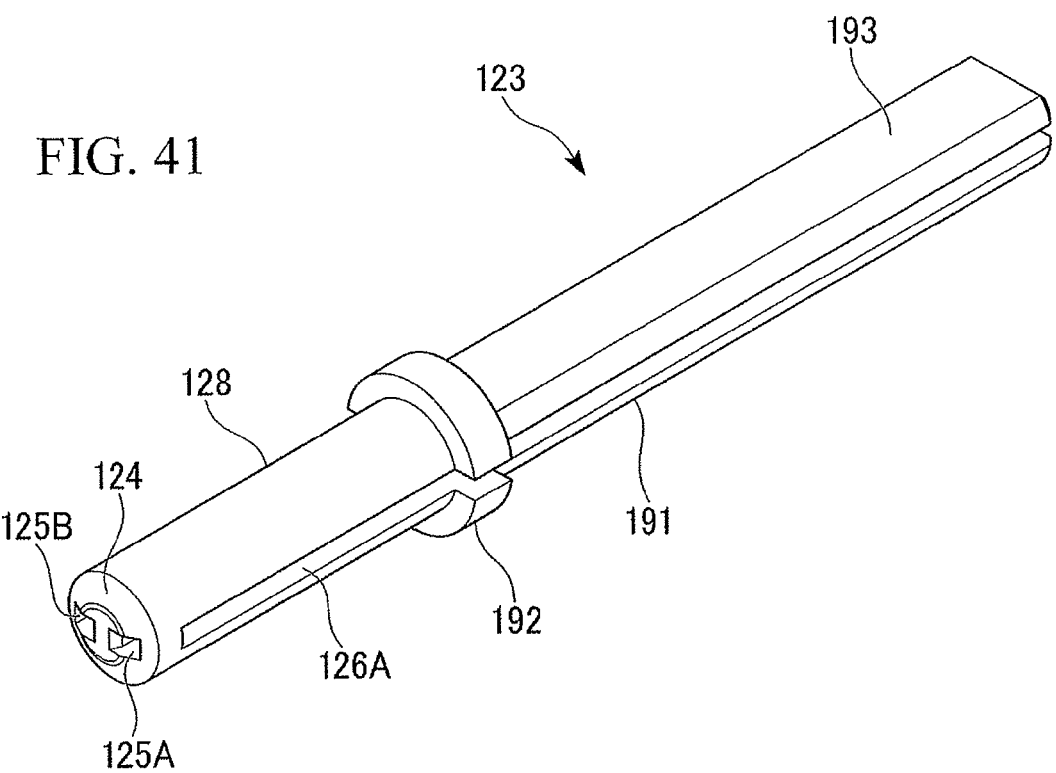
FIG. 41 is a perspective view of the head member of the optical connector cleaning tool shown in FIG. 32, viewed from the other side.
Figure 42:
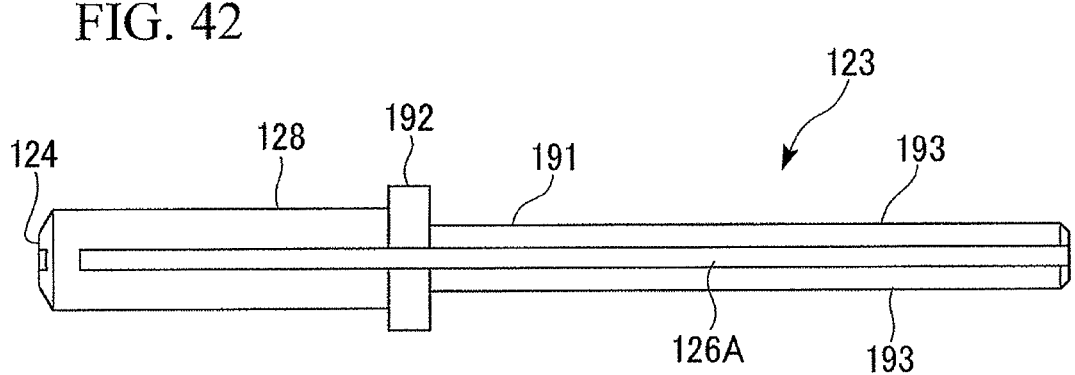
FIG. 42 is an elevation view of the head member of the optical connector cleaning tool shown in FIG. 32.
Figure 43:
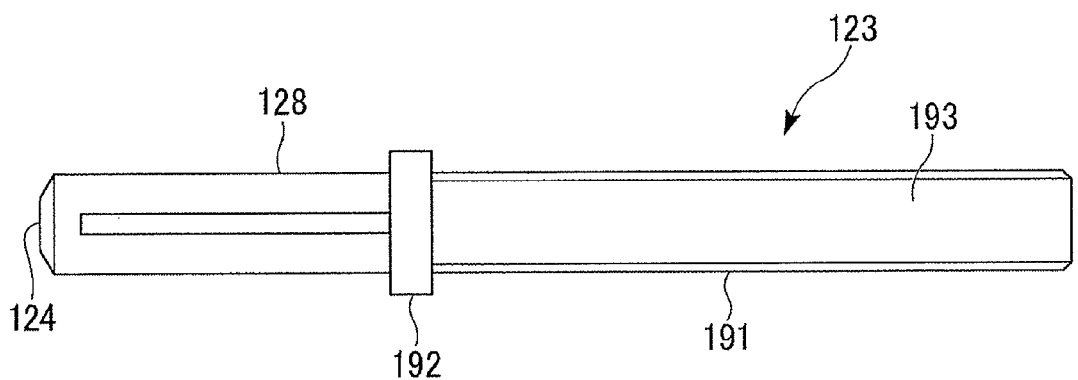
FIG. 43 is a plan view of the head member of the optical connector cleaning tool shown in FIG. 32.
Figure 44:
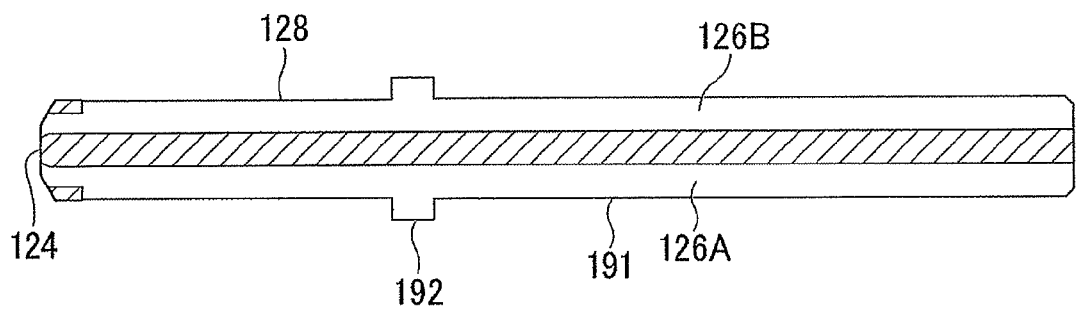
FIG. 44 is a plan cross-sectional view of the head member of the optical connector cleaning tool shown in FIG. 32.
Figure 45:
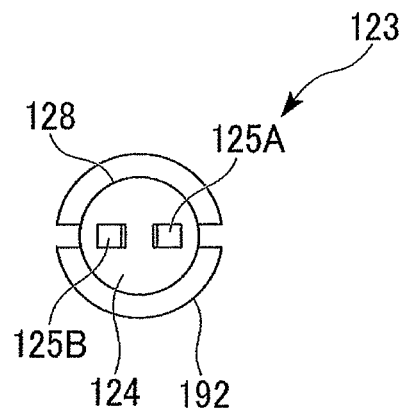
FIG. 45 is a front view of the head member of the optical connector cleaning tool shown in FIG. 32.
Figure 46:
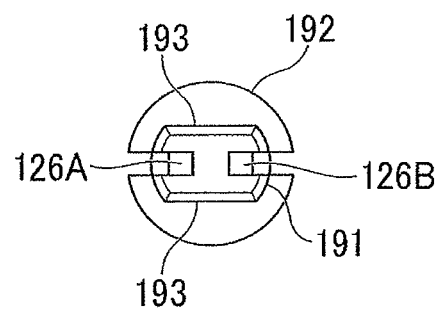
FIG. 46 is a rear view of the head member of the optical connector cleaning tool shown in FIG. 32.
Figure 47:
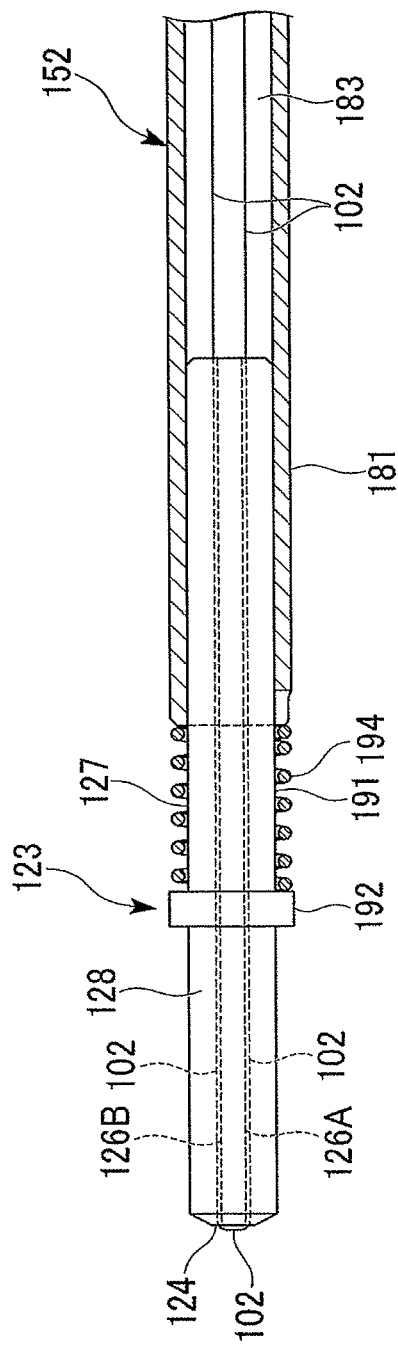
FIG. 47 is a partial cross-sectional view which shows the rotary shaft and the head member attached to the distal end of this rotary shaft of the optical connector cleaning tool shown in FIG. 32.
Figure 48:
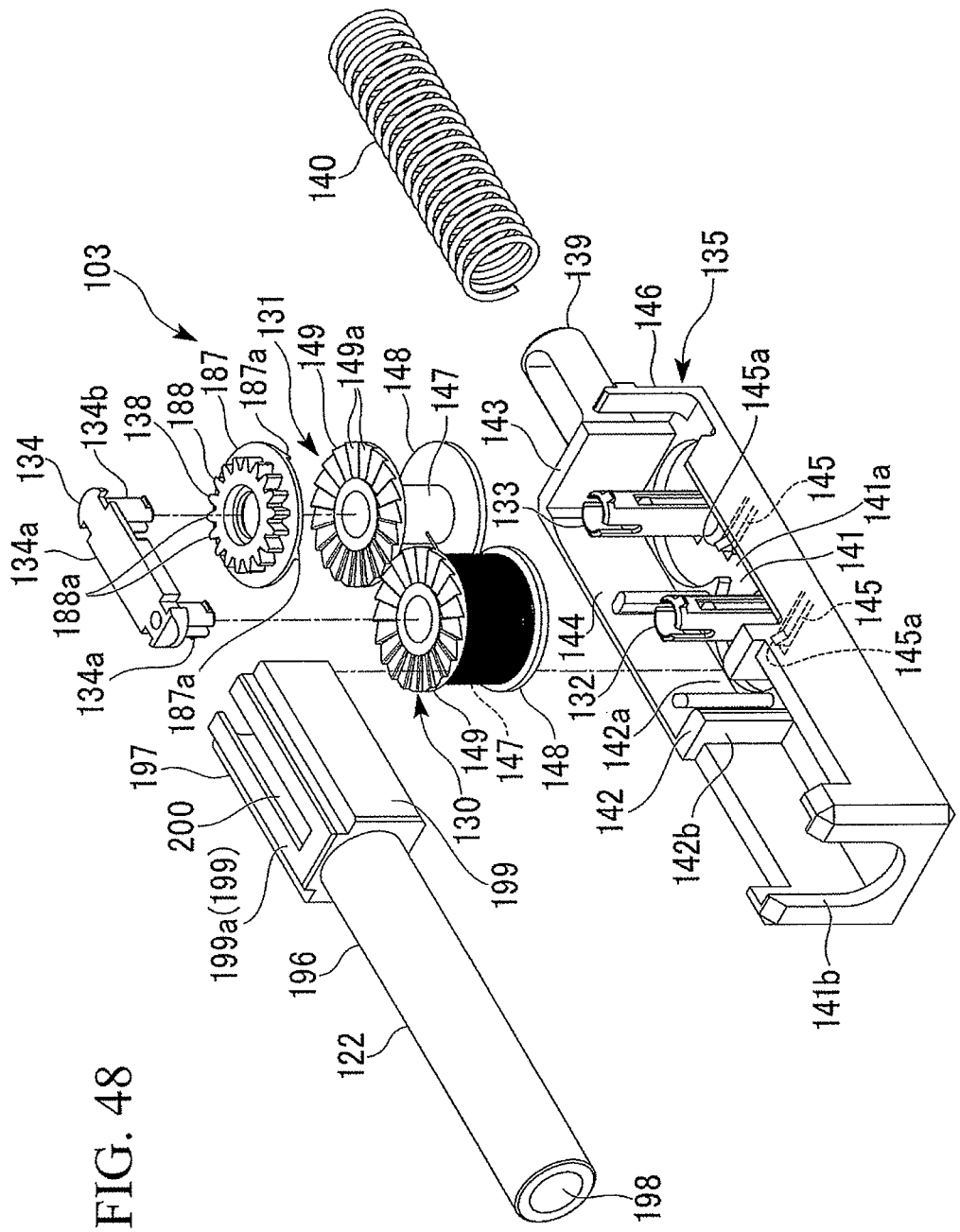
FIG. 48 is a perspective view which shows the feeding mechanism of the optical connector cleaning tool shown in FIG. 32.
Figure 49:
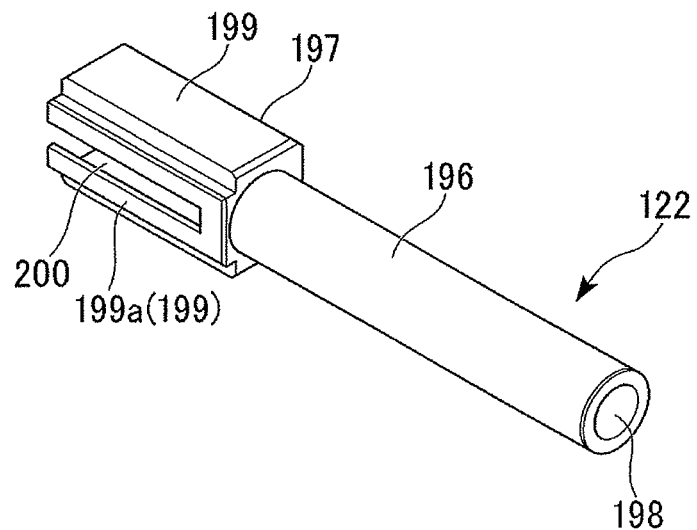
FIG. 49 is a perspective view which shows the tube base part of the insertion tube of the optical connector cleaning tool shown in FIG. 32.
Figure 50:
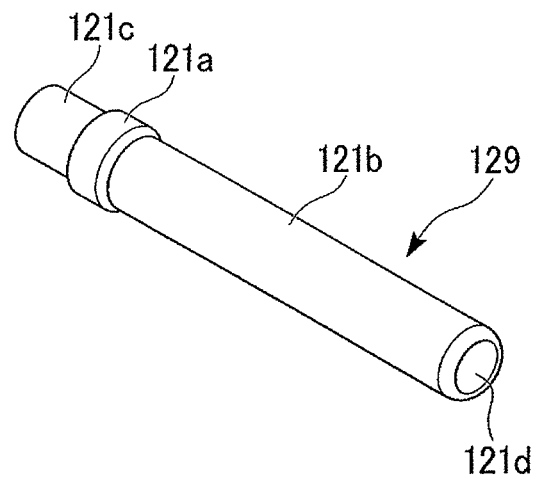
FIG. 50 is a perspective view which shows the tube extremity part of the insertion tube of the optical connector cleaning tool shown in FIG. 32.

FIG. 32 is a perspective view of the cleaning tool 101. FIG. 33 is an enlarged perspective view of the essential elements of the cleaning tool 101. FIG. 34A to FIG. 34D are respectively a front view, back view, side view, and elevation view of the cleaning tool 101. FIG. 35 is an exploded perspective view of the cleaning tool 101. FIG. 36A to FIG. 36C show a supporting member 151, and are respectively an elevation view, side view, and back view. FIG. 37 is a perspective view of the supporting member 151. FIG. 38 is a perspective view which shows a rotary shaft 152 of a rotary mechanism 105. FIG. 39 is an enlarged perspective view of the essential elements of the rotary shaft 152. FIG. 40 is a perspective view of a head member 123, viewed from one side. FIG. 41 is a perspective view of the head member 123, viewed from the other side. FIG. 42 is an elevation view of the head member 123. FIG. 43 is a plan view of the head member 123. FIG. 44 is a plan cross-sectional view of the head member 123. FIG. 45 is a front view of the head member 123. FIG. 46 is a rear view of the head member 123. FIG. 47 is a partial cross-sectional view which shows the rotary shaft 152 and the head member 123 attached to its distal end. FIG. 48 is an exploded perspective view which shows a feeding mechanism 103. FIG. 49 is a perspective view which shows a tube base part 122 of the insertion tube 121. FIG. 50 is a perspective view which shows a tube extremity part 129 of the insertion tube 121.

As shown in FIG. 32 to FIG. 35, the cleaning tool 101 is provided with a tool body 110, and an insertion part 120 which protrudes from this tool body 110. In the below description, as shown in FIG. 32, the distal direction (insertion direction) of the insertion part 120 is referred to on occasion as forward, and its opposite direction as rearward.

The tool body 110 is provided with a case 111, a supporting member 151 disposed within the case 111, a feeding mechanism 103 which conducts supply and take up of a cleaning body 102, and a rotary mechanism 105 which rotates a head member 123.

The case 111 is formed in a tubular shape which is approximately rectangular in cross-section. In the rear part of one side plate 111a of the four side plates 111a, a positioning aperture 112 is formed into which a below-mentioned positioning protuberance 157 inserts.

The positioning aperture 112 is formed in a slit-like shape in the longitudinal direction. A first fitting recess 113 into which the positioning protuberance 157 fits is formed in the front part of the positioning aperture 112, and a second fitting recess 114 into which the positioning protuberance 157 fits is formed in the rear part of the positioning aperture 112.

In the state shown in FIG. 32 and FIG. 34A to FIG. 34D, the feeding mechanism 103 and the rotary mechanism 105 are positioned by fitting the positioning protuberance 157 into the second fitting recess 114.

At the front end of the case 111, a through-hole 111c is formed through which the insertion part 120 passes.

As shown in FIG. 35 to FIG. 37, the supporting member 151 is provided with a base plate 153 in the form of a long plate extending in the longitudinal direction, an insertion protuberance 154 which is formed so as to project from an inner face 153a of the base plate 153, side plates 155 which are formed so as to project toward the inner face 153a side from the two side edges of the base plate 153, a serrated gear receiving part 156 which is formed on one of the side plates 155, a positioning protuberance 157 which is provided on an outer face 153b of the base plate 153, a rear end plate part 158 which is formed so as to extend toward the inner face 153a side from the edge of the rear end of the base plate 153, and a retaining protuberance 159 which is formed on a front face 158a of the rear end plate 158 so as to extend forward.

As shown in FIG. 36B and FIG. 37, the side plates 155 are respectively composed of a side plate base 167 having approximately fixed projection height from the base plate 153, and a side plate projection 168 which is provided at the rear of the side plate base 167 and which projects higher than the side plate base 167.

As shown in FIG. 36C and FIG. 37, the gear receiving part 156 is composed of multiple receiving teeth 156a that are formed on the inner face side of one of the side plates 155—specifically, on the inner face side of the side plate base 167—so as to project toward the other side plate 155. The receiving teeth 156a are arrayed in the lengthwise direction (longitudinal direction) of the supporting member 151.

The insertion protuberance 154 is formed in an approximately cylindrical shape. The protrusion height and outer diameter of the insertion protuberance 154 are set so that it can fit into a cam groove 185 of a rotary tube part 182.

As shown in FIG. 36B and FIG. 36C, a contact protuberance 155a which projects downward is formed on the bottom face side of one of the side plates 155—specifically, on the bottom face side of the side plate base 167. In the illustrated example, the contact protuberance 155a is formed in an approximately triangular shape such that its width gradually narrows in the projection direction, and its front face 155b is an inclined face which is inclined relative to the base plate 153.

As shown in FIG. 36A, an aperture 164 is formed in the rear part of the base plate 153. A plate-like elastic piece 165 is formed within the aperture 164 so as to extend rearward from the front end 164a of the aperture 164.

As shown in FIG. 36B, it is preferable when the elastic piece 165 is formed so as to incline upward in the drawing in the direction of extension, because the distance between the base plate 153 and the case 111 can be fully maintained, and the positioning protuberance 157 can also reliably engage with the fitting recesses 113 and 114.

The aforementioned positioning protuberance 157 is formed so as to project upward from the top face (outer face) of the rear end of the elastic piece 165.

An engagement protuberance 166 is formed on the top face of the elastic piece 165, forward from the positioning protuberance 157.

By configuring the elastic piece 165 so that its rear end can be moved upward or downward by elastic bending deformation, the positioning protuberance 157 can be rendered capable of engaging and disengaging with the fitting recesses 113 and 114.

As shown in FIG. 35, FIG. 38, and FIG. 39, the rotary mechanism 105 is provided with a rotary shaft 152 which is capable of axial rotation relative to the supporting member 151.

The rotary shaft 152 is provided with a guide tube part 181, and a rotary tube part 182 which is provided at the rear end of the guide tube part 181.

A through-hole 183 is formed within the rotary shaft 152 through which the cleaning body 102 passes. The through-hole 183 is formed so as to extend from the front end of the guide tube part 181 to the rear end of the rotary tube part 182.

The guide tube part 181 is formed in an approximately cylindrical shape, and is made such that an insertion part 191 of the head member 123 can be inserted into the through-hole 183 at its front end. Rotary stoppers 184 whose inner surfaces are flat are formed on the inner surface of the front end part of the guide tube part 181.

The rotary tube part 182 is formed in an approximately cylindrical shape, and the cam groove 185 into which the insertion protuberance 154 of the supporting member 151 inserts is formed on its outer surface.

The cam groove 185 is formed so as to extend in the longitudinal direction, and at least a portion thereof is inclined relative to the axial direction of the rotary tube part 182. Consequently, when the rotary shaft 152 is moved in the longitudinal direction as described below, the rotary shaft 152 is axially rotated by the movement of the rotary tube part 182 along the cam groove 185. In the illustrated example, the cam groove 185 is formed in a helical shape.

As shown in FIG. 40 to FIG. 46, the head member 123 is provided with an insertion part 191 which passes through the through-hole 183 of the guide tube part 181, a flange 192 which is formed at the front end of the insertion part 191, and an approximately cylindrical distal part 128 which extends forward from the front face of the flange 192.

The distal face of the distal part 128 constitutes a pressing face 124 which presses the cleaning body 102 against the joining end face 61a.

As shown in FIG. 41 and FIG. 45, guide openings 125A and 125B which are apertures through which the cleaning body 102 passes are formed in the pressing face 124.

Of these, one guide opening 125A guides the cleaning body 102 from the feeding mechanism 103 to the pressing face 124, and is formed approximately rectangular in cross-section in the illustrated example. The other guide opening 125B guides the cleaning body 102 that has transited the pressing face 124 to the feeding mechanism 103, and is formed approximately rectangular in cross-section in the illustrated example.

Dislocation of the cleaning body 102 can be reliably prevented by the formation of these guide openings 125A and 125B.

It is preferable that guide grooves 126A and 126B which guide the feeding movement of the cleaning body 102 be formed in the side faces of the distal part 128. The distal part 128 is formed so that its distal end protrudes from a distal tube part 121b. The guide grooves 126A and 126B are also formed in the side faces of the insertion part 191 and the flange 192.

The guide grooves 126A and 126B are formed at positions which match the guide openings 125A and 125B.

A flat part 193 which has a form that matches the rotary stopper 184 that is formed in the guide tube part 181 is formed in the insertion part 191. The head member 123 is configured so that it does not rotate relative to the guide tube part 181 when the flat part 193 engages with the rotary stopper 184.

As shown in FIG. 33, FIG. 35, FIG. 41, and FIG. 47, the cleaning body 102 which is dispensed from the supply reel 130 winds around the head member 123.

In the illustrated example, the cleaning body 102 passes through the interior of the through-hole 183 of the rotary shaft 152 from the supply reel 130 within the tool body 110, transits the guide groove 126A and the guide opening 125A of the head member 123, reaches the pressing face 124, transits the guide opening 125B and the guide groove 126B, and arrives at the take-up reel 131.

There are no particular limitations on the cleaning body 102, and one may adopt commonly known and suitable cleaning cloth (non-woven cloth or woven cloth) that has been processed into filament (or string) form. For example, one may cite material composed of ultrafine fiber such as polyester and nylon. There are no particular limitations on the cross-sectional form of the cleaning body 102, and it may be made, for example, approximately circular, polygonal, and so on.

As the cleaning body 102, for example, material with a diameter of 0.1-1 mm, and preferably 0.2-0.3 mm is optimal.

As filamentous cleaning body 102 has a narrower width than tape-like material, it facilitates formation of the guide openings 125A and 125B from a design standpoint even when the external diameter of the distal part 128 is small.

Otherwise, as the cleaning body 102, one may also use tape-like material of narrow width.

Code number 194 in FIG. 47 is a biasing means (e.g., a coil spring) which is provided between the front end of the guide tube part 181 and the flange 192. The biasing means 194 imparts a forward bias to the head member 123 when the head member 123 is pressed against the joining end face 61a.

As shown in FIG. 48, the feeding mechanism 103 is provided with a supply reel 130 on which the cleaning body 102 is wound, a take-up reel 131 which takes up and recovers the cleaning body 102 after use, a supporting part 135 which is installed to enable these to rotate, a gear 138 which is attached to the take-up reel 131, a retaining tube 139 which is formed on the supporting part 135, a biasing means 140 (e.g., a coil spring) which is attached to the retaining tube 139, and a pressing part 134.

The supporting part 135 is provided with a base plate 141 in the form of a long plate that extends in the longitudinal direction, a supply reel support shaft 132 which is provided on an inner face 141a of the base plate 141, and which is installed to enable rotation of the supply reel 130, a take-up reel support shaft 133 which is installed to enable rotation of the take-up reel 131, a dividing plate 142 which is formed so as to extend from the lengthwise central part of the base plate 141 toward its inner face 141a side, a rear end plate 143 which is formed so as to extend from the rear end of the base plate 141 toward its inner face 141a side, a side plate 144 which is formed so as to extend from one of the side edges of the base plate 141 toward its inner face 141a side, and a projecting piece 146 which is formed so as to extend from the rear end of the base plate 141 toward its inner face 141a side.

Two extending plates 145, 145 which extend vertically relative to the radial direction of the reels 130 and 131 are formed on the base plate 141, and engagement claws 145a, 145a which respectively project toward the reels 130 and 131 are formed at the distal end of the extending plates 145, 145. The extending plates 145 are capable of elastic bending deformation, and the engagements claws 145a are capable of being moved toward or away from the reels 130 and 131 by the bending deformation of the extending plates 145.

A notch 141b into which a communicating tube 196 of a tube base part 122 fits is formed at the front end of the base plate 141.

The retaining tube 139 is cylindrically formed, and is formed so as to extend backward from the rear face of the rear end plate 143.

The front end of the biasing means 140 contacts the rear end plate 143, and its rear end contacts the rear end plate part 158 in a state of engagement with the retaining protuberance 159 of the supporting member 151.

The pressing part 134 serves to prevent dislocation of the reels 130 and 131 and the gear 138, and fitting parts 134b and 134c which are capable of fitting the reel support shafts 132 and 133 are formed at the front end and rear end of a body part 134a that is in the form of a long plate extending in the longitudinal direction.

By means of the pressing part 134, it is possible to prevent the reels 131 and 131 from being pulled and tilted by the cleaning body 102, and coming off the support shafts 132 and 133.

A transit recess 142a through which the cleaning body 102 passes is formed in the dividing plate 142.

The supply reel support shaft 132 and the take-up reel support shaft 133 are formed farther toward the rear than the dividing plate 142.

The supply reel 130 and the take-up reel 131 are respectively provided with a barrel 147 around which the cleaning body 102 is wound, a first end plate 148 which is provided at one end of the barrel 147, and a second end plate 149 which is provided at the other end of the barrel 147.

Multiple engagement recesses (not illustrated in the drawings) which are arrayed in the circumferential direction are formed on the outer face of the first end plate 148. Reverse rotation of the reels 130 and 131 is blocked by engagement of the engagement claws 145a of the extending plates 145 with the aforementioned engagement recesses. Multiple engagement protuberances 149a which are arrayed in the circumferential direction are formed on the outer face of the second end plate 149.

The reels 130 and 131 are attached to the supporting part 135 by having the support shafts 132 and 133 run through the respective barrel 147.

The gear 138 has a discoid base plate 187, and a gear wheel 188 which is formed on one face of the base plate 187. On the other face of the base plate 187, engagement projections 187a are formed which engage with the engagement protuberances 149a of the take-up reel 131.

The gear wheel 188 has multiple teeth 188a which are arrayed in the circumferential direction, and these teeth 188a are formed so as to be capable of engaging with the receiving teeth 156a of the gear receiving part 156 of the supporting member 151.

The gear 138 is disposed so as to overlap the second end plate 149 of the take-up reel 131. As the engagement projections 187a of the base plate 187 engage with the engagement protuberances 149a of the second end plate 149, the take-up reel 131 is also rotated in conformity with rotation of the gear 138.

The engagement projections 187a are formed so that they do not engage with the engagement protuberances 149a when the gear 138 rotates in a direction which is opposite the take-up direction.

The projecting piece 146 is an elastic piece capable of bending deformation, and is formed so as to contact the contact protuberance 155a of the supporting member 151 when the supporting member 151 moves forward relative to the feeding mechanism 103.

As shown in FIG. 35, FIG. 49, and FIG. 50, the insertion part 120 is provided with an insertion tube 121 and a head member 123 which passes through the insertion tube 121.

The insertion tube 121 is provided with a tube base part 122 and a tube extremity part 129 which is provided at the distal end of the tube base part 122.

As shown in FIG. 49, the tube base part 122 is provided with a communicating tube 196 and a holding frame 197 which is provided at the rear end of the communicating tube 196.

The communicating tube part 196 is formed in an approximately cylindrical shape, and is formed with a through-hole 198 which enables the guide tube part 181 of the rotary shaft 152 to pass through it.

The holding frame 197 is formed in a tubular shape which is rectangular in cross-section, and is capable of housing the rotary tube part 182 of the rotary shaft 152 within it. A slit 200 into which the insertion protuberance 154 of the supporting member 151 inserts is formed in the longitudinal direction in the side plate 199a which is one of the four side plates 199 that configure the holding frame 197.

The holding frame 197 may be formed so that it is capable of contacting the front face of the dividing plate 142 of the feeding mechanism 103.

As shown in FIG. 50, the tube extremity part 129 has a fitting tube part 121c which is provided on the rear face side of a flange 121a, and a cylindrical distal tube part 121b which extends forward from the front face side of the flange 121a.

It is preferable that the fitting tube part 121c be formed so that it removably fits into the through-hole 198 at the distal end of the tube base part 122. By forming the fitting tube part 121c so that it fits into the through-hole 198 of the tube base part 122, the structure of the tube extremity part 129 is simplified, and the cost required for metal mold fabrication can be economized.

Moreover, by configuring the tube extremity part 129 to be attached to and removed from the tube base part 122 at will, it is possible to select for use a tube extremity part 129 in conformity with the specifications of the optical adapter 70, thereby enabling application to multiple types of optical adapter 70.

In the distal tube part 121*b*, a through-hole 121*d* is formed through which the guide tube part 181 of the rotary shaft 152 and the head member 123 pass.

It is preferable that the distal tube part 121*b* be formed so that its displacement in a skewed direction from the insertion direction is controlled at the time of insertion into the connector housing hole 72.

With respect to the insertion part 120, the insertion tube 121 passes through the through-hole 111*c* of the case 111, and projects forward from the case 111.

As shown in FIG. 32, the insertion part 120 is capable of movement in the longitudinal direction (a direction of extension or contraction) relative to the tool body 110.

In the state shown in FIG. 32 and FIG. 34A to FIG. 34D, the positioning protuberance 157 of the supporting member 151 is engaged with the second fitting recess 114 that is formed at the rear end of the positioning aperture 112 of the case 111, with the result that the feeding mechanism 103 and the rotary mechanism 105 are positioned relatively rearward within the case 111. This position is referred to as a rearward position.

By pressing the positioning protuberance 157 to disengage it from the second fitting recess 114, by moving it forward along the positioning aperture 112, and by engaging it with the first fitting recess 113, it is possible to position the feeding mechanism 103 and rotary mechanism 105 forward from the aforementioned rearward position. This position is referred to as a forward position.

By disposing the feeding mechanism 103 and rotary mechanism 105 at the forward position, the insertion part 120 is also disposed forward.

Figure 62:
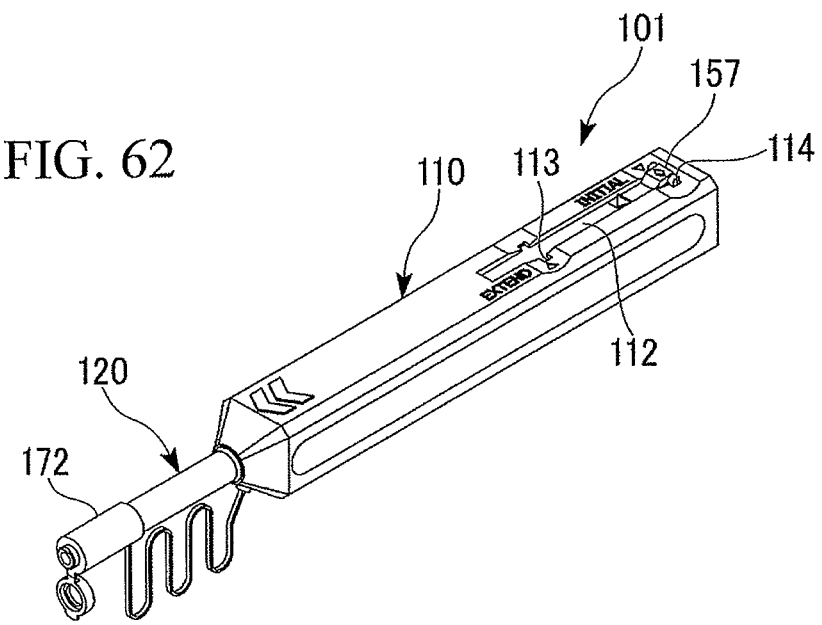
FIG. 62 is a perspective view which shows the optical connector cleaning tool shown in FIG. 32.
Figure 63:
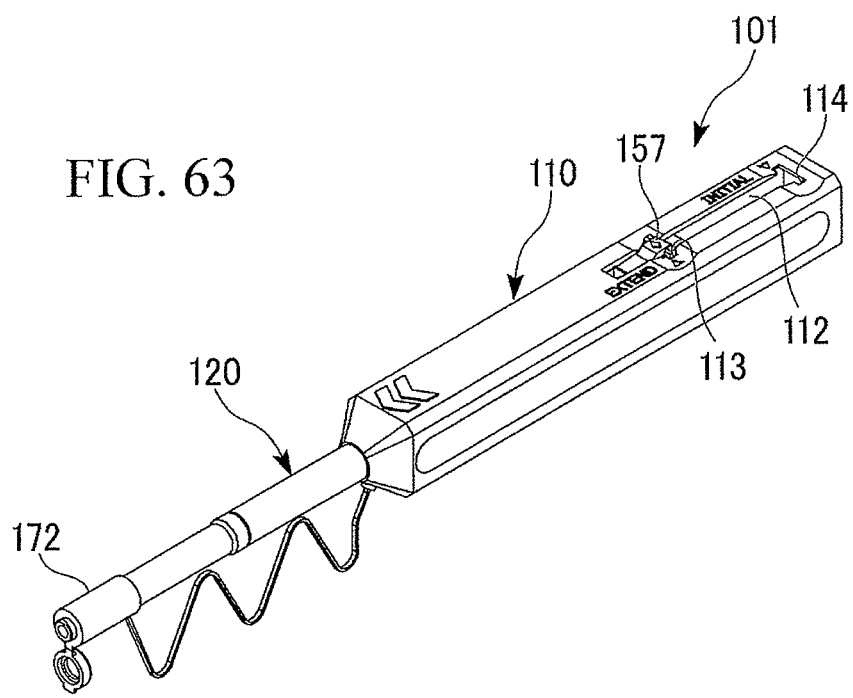
FIG. 63 is a perspective view which shows the state where the insertion part of the optical connector cleaning tool shown in FIG. 32 is extended.
Figure 64:
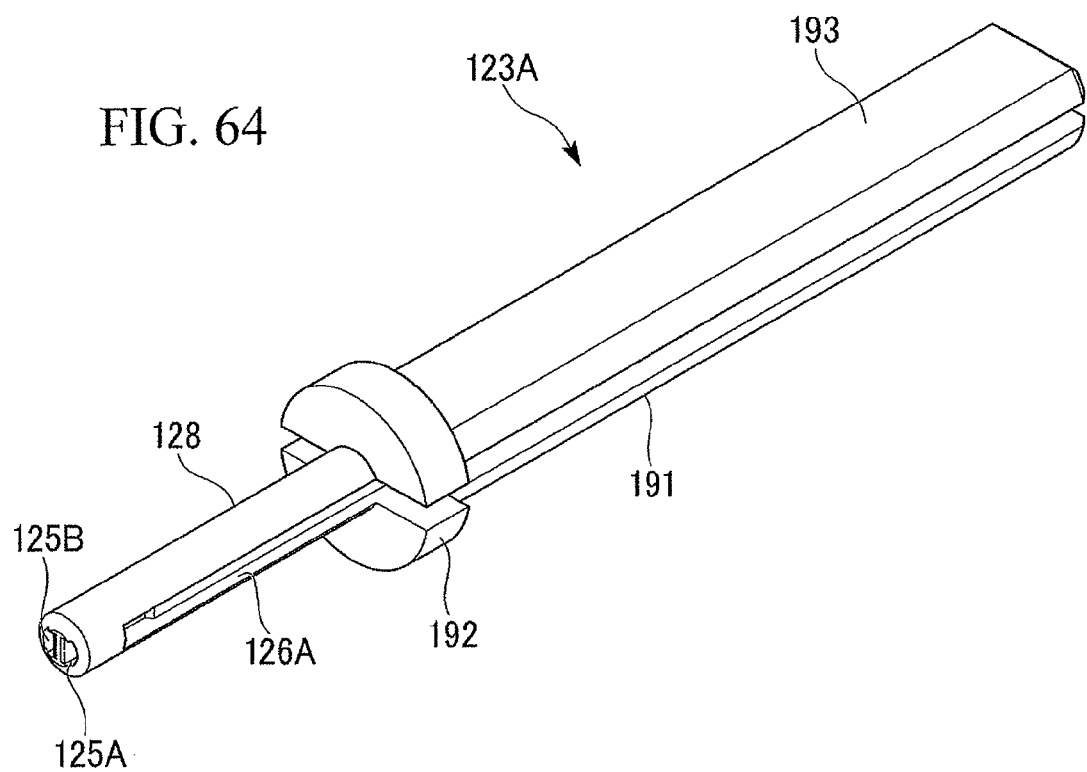
FIG. 64 is a perspective view of another example of the head member, viewed from one side.

FIG. 62 shows the cleaning tool 101 in a state where the insertion part 120 is in the rearward position, and FIG. 63 shows the cleaning tool 101 in a state where the insertion part is in the forward position.

In the state where the insertion part 120 is in the forward position, the portion of the insertion part 120 that extends from the tool body 110 is lengthened, thereby facilitating the conduct of cleaning operations so that adverse effects are not imparted to other optical adapters 70 that are adjacent to the target optical adapter 70.

As shown in FIG. 34A to FIG. 34D and FIG. 35, a cap 172 can be attached to the distal end of the insertion part 120. The cap 172 has a guide body 173 which is approximately sleeve-shaped (cylindrical), and a cover 174 which is joined by a hinge 175 to one end of the guide body 173.

At one end on the cover 174 side of the guide body 173, a connector insertion port 176 (plug insertion port) is opened into which the optical plug 60 inserts. By inserting the optical plug 60 here, the joining end face 61*a* of the optical plug 60 can be wiped clean by the cleaning body 102.

As the cover 174 is connected to the case 111 via a retaining cord 177, loss of the cover 174 can be prevented.

Next, one example of the method of use of the cleaning tool 101 is described.

Figure 51:
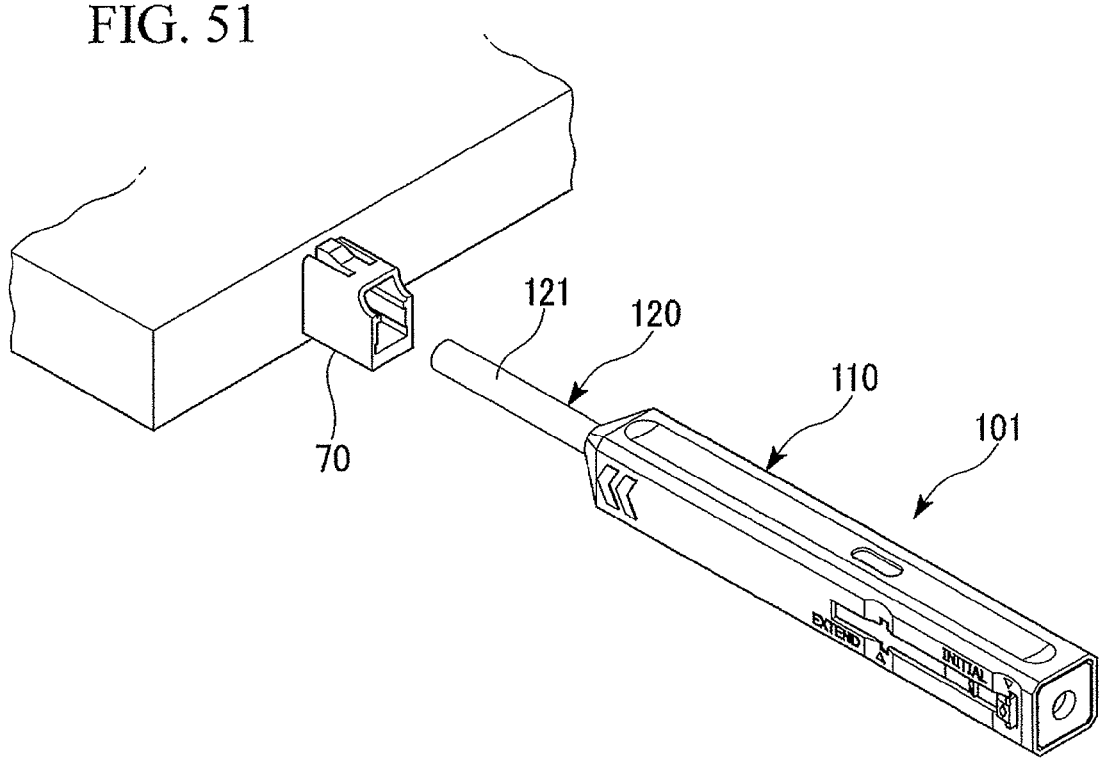
FIG. 51 is a process view which shows a method of use of the optical connector cleaning tool shown in FIG. 32.
Figure 52:
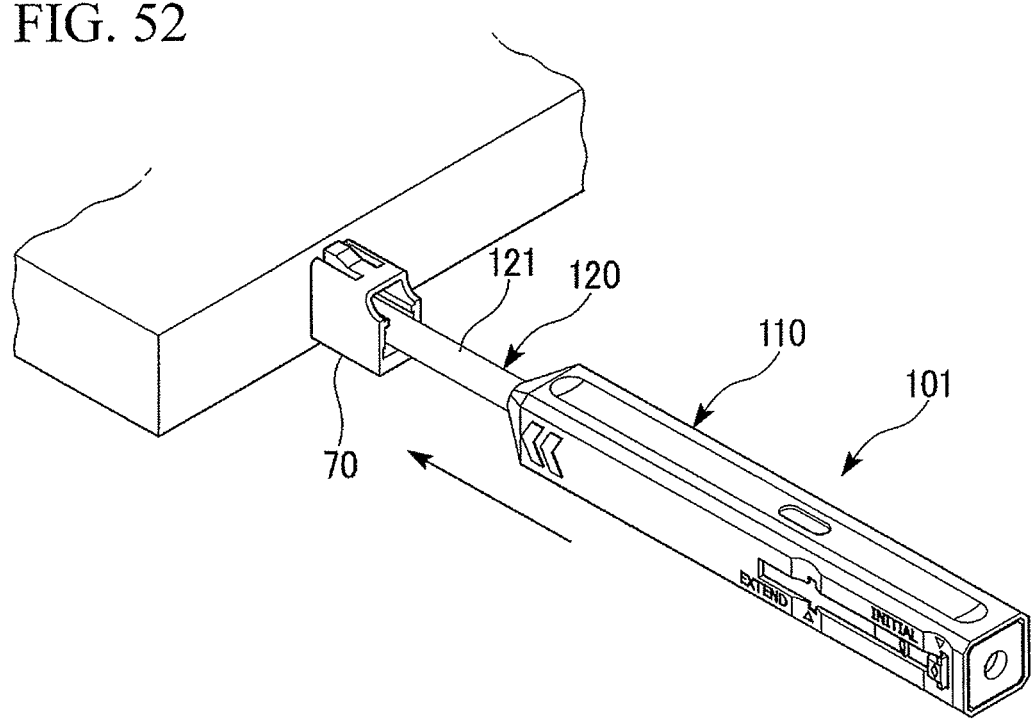
FIG. 52 is a process view which is a continuation from the previous view.
Figure 56:
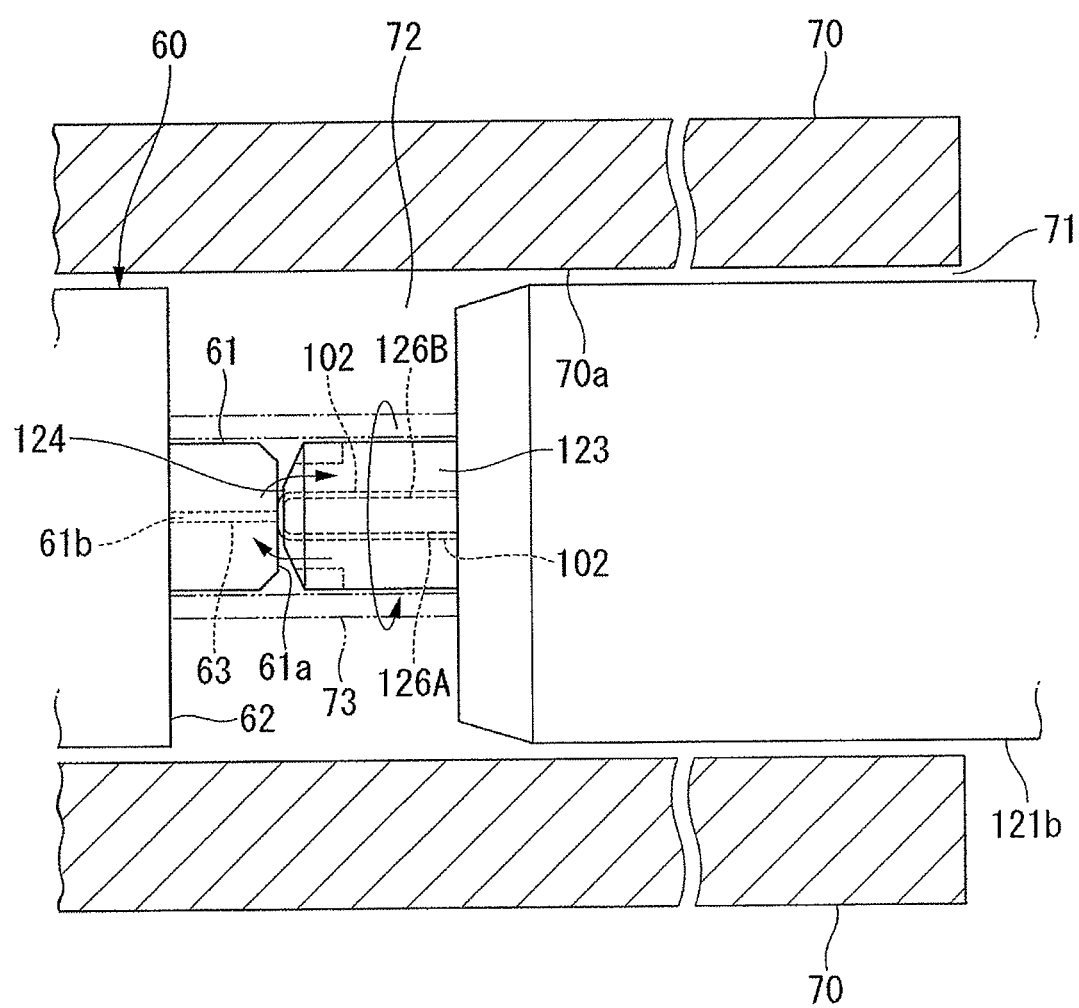
FIG. 56 is a partial cross-sectional view which serves to describe the operation of the optical connector cleaning tool shown in FIG. 32.

As shown in FIG. 51, FIG. 52, and FIG. 56, when the insertion tube 121 of the insertion part 120 is inserted from the connector insertion port 71 of the optical adapter 70, the insertion tube 121 enters the connector housing hole 72 while its outer surface is positioned by the inner wall 70*a* of the optical adapter 70.

By this means, the cleaning body 102 on the pressing face 124 contacts the appropriate position (in this instance, the optical fiber hole 61*b* and its periphery) of the joining end face 61*a* of the optical plug 60.

Figure 53:
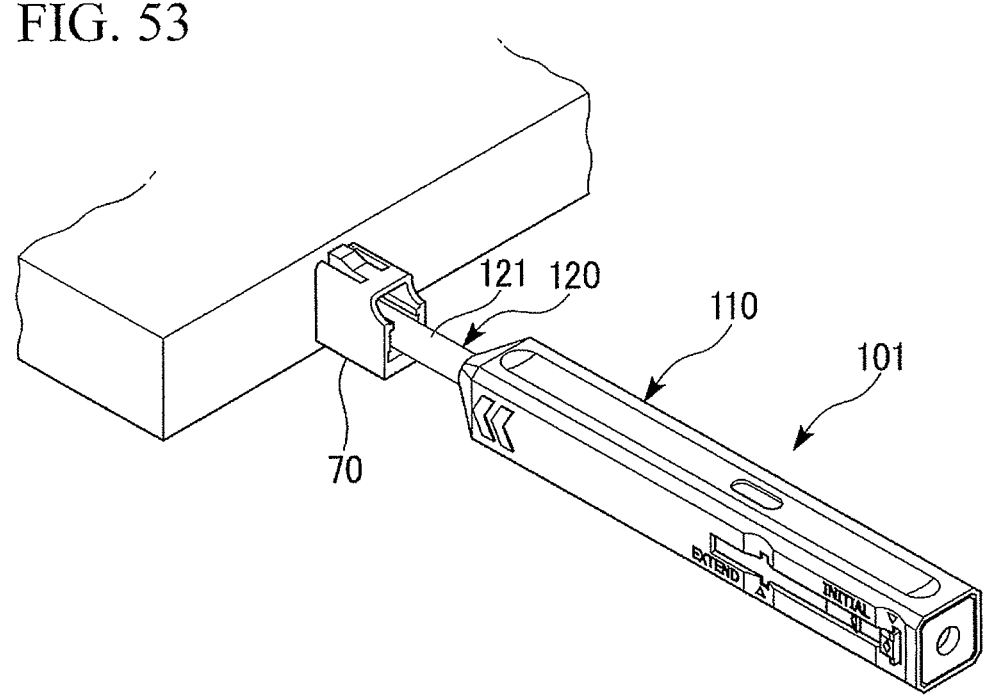
FIG. 53 is a process view which is a continuation from the previous view.

As shown in FIG. 53, when the tool body 110 is pressed further in the insertion direction, the tool body 110 moves in this direction. At this time, the distal end of the insertion part 120 presses the ferrule 61 and the wall within the optical adapter 70, and the insertion part 120 moves backward in relative terms (that is, in the direction of contraction) with respect to the tool body 110.

Figure 54:
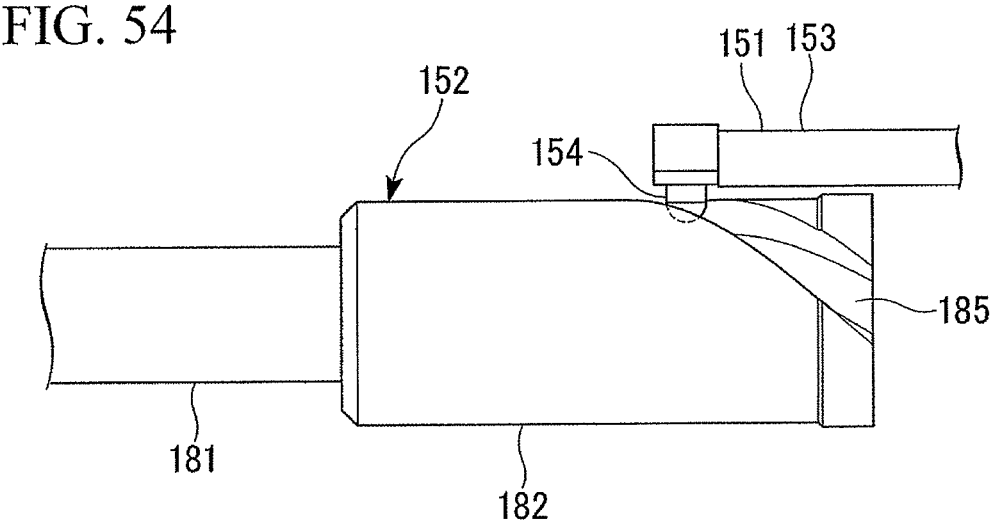
FIG. 54 is an explanatory view which shows the operation of the rotary shaft of the optical connector cleaning tool shown in FIG. 32.
Figure 55:
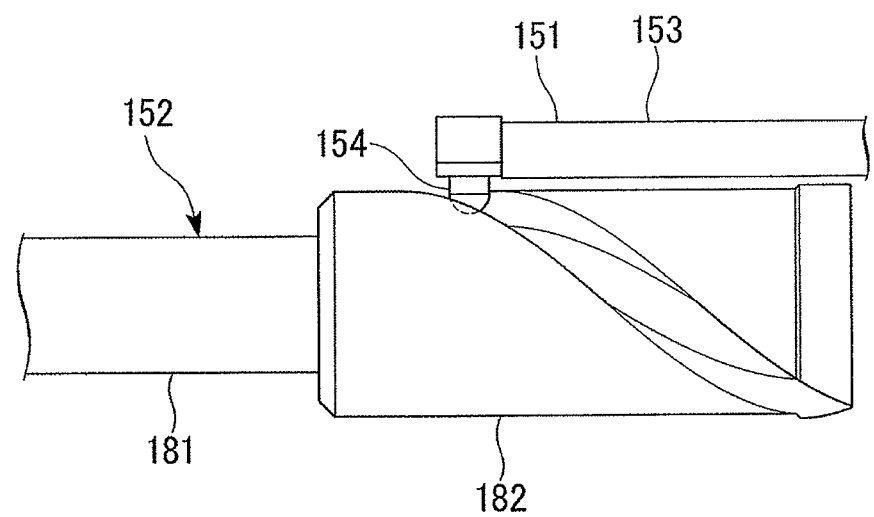
FIG. 55 is an explanatory view which shows the operation of the rotary shaft of the optical connector cleaning tool shown in FIG. 32.

As shown in FIG. 54 and FIG. 55, due to the movement of the tool body 110, the supporting member 151 is moved forward relative to the rotary shaft 152. As a result, the rotary tube part 182 is circumferentially moved along the cam groove 185, and the rotary shaft 152 axially rotates.

As shown in FIG. 56, the head member 123 is axially rotated by the rotation of the rotary shaft 152, with the result that the cleaning body 102 rotates around the axis of the head member 123 while in a state of contact with the joining end face 61*a*, and the joining end face 61*a* is wiped clean.

As shown in FIG. 35, FIG. 37, and FIG. 58A to FIG. 58C, due to the forward movement of the supporting member 151 relative to the feeding mechanism 103, force is imparted in the rotational direction to the gear wheel 188 of the gear 138 by the gear receiving part 156. The take-up reel 131 also rotates due to the rotation of the gear 138, thereby taking up the cleaning body 102.

In conjunction with this, the cleaning body 102 is unwound from the supply reel 130, and undergoes feeding movement by transiting the pressing face 124 of the head member 123. The take-up length of the cleaning body 102 resulting from a single movement of the tool body 110 is a fixed quantity.

Contamination such as dirt, dust, and oil adhering to the joining end face 61*a* is reliably wiped off by the feeding movement of the cleaning body 102.

When the insertion part 120 is withdrawn from the optical adapter 70, the insertion part 120 is moved forward in relative terms with respect to the tool body 110 (that is, in the direction of extension) by the elastic force of the biasing means 140, and returns to the normal position shown in FIG. 52 and other drawings.

Figure 57:
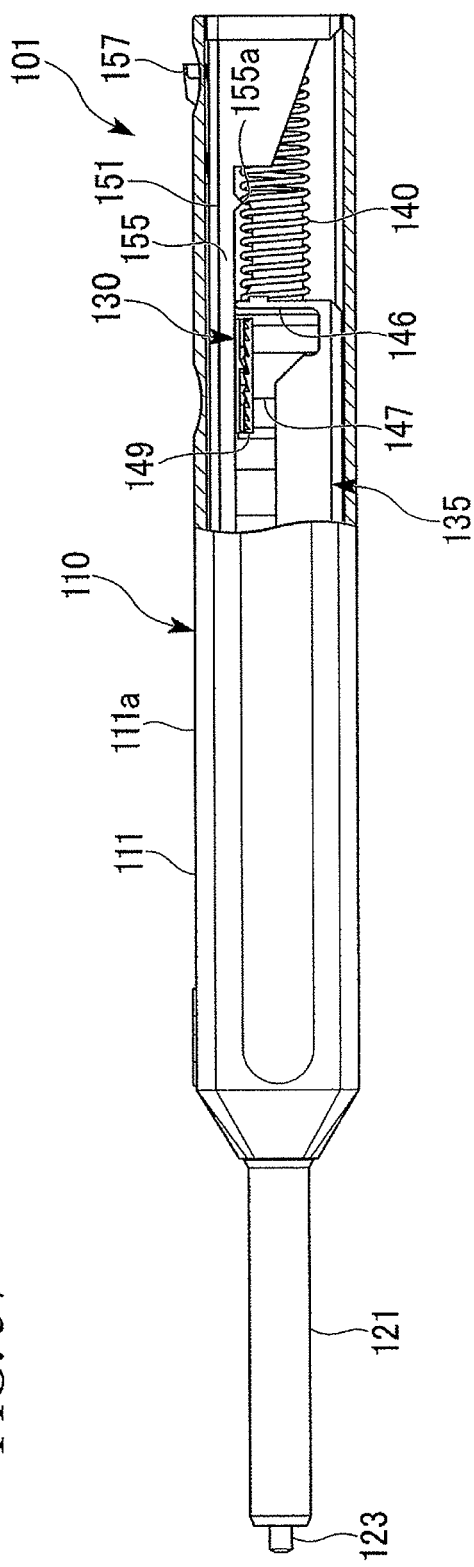
FIG. 57 is a partial cross-sectional view which serves to describe the operation of the optical connector cleaning tool shown in FIG. 32.
Figure 58A:
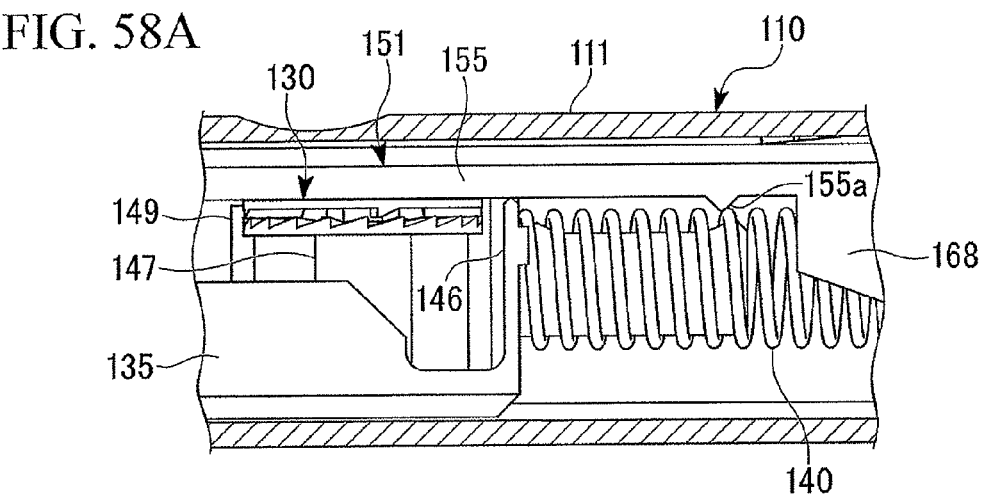
FIG. 58A is a partial cross-sectional view which serves to describe the operation of the optical connector cleaning tool shown in FIG. 32.
Figure 58B:
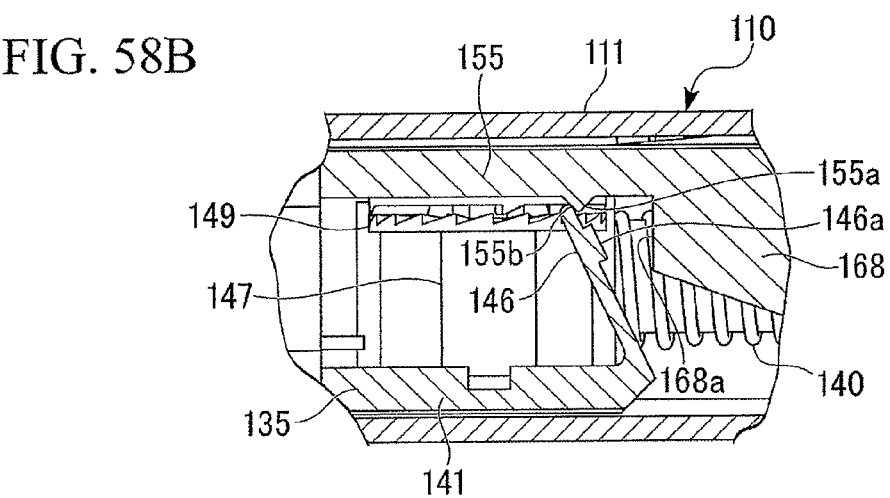
FIG. 58B is a partial cross-sectional view which serves to describe the operation of the optical connector cleaning tool shown in FIG. 32.

As shown in FIG. 57, FIG. 58A and FIG. 58B, when the tool body 110 is moved in the insertion direction, the distal end of the projecting piece 146 contacts the front face 155*b* of the contact protuberance 155*a* due to the movement of the supporting member 151, and the state ensues wherein the projecting piece 146 is inclined forward due to elastic bending deformation.

Figure 58C:
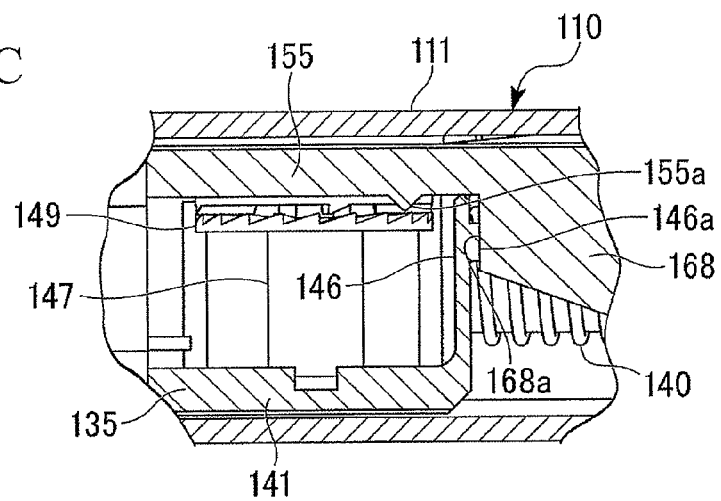
FIG. 58C is a partial cross-sectional view which serves to describe the operation of the optical connector cleaning tool shown in FIG. 32.
Figure 59A:
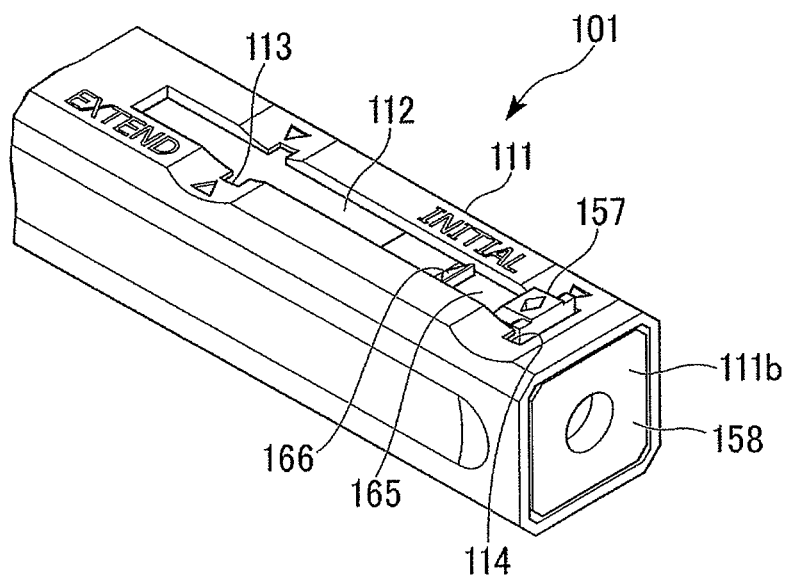
FIG. 59A is a perspective view which serves to describe the operation of the optical connector cleaning tool shown in FIG. 32.
Figure 59B:
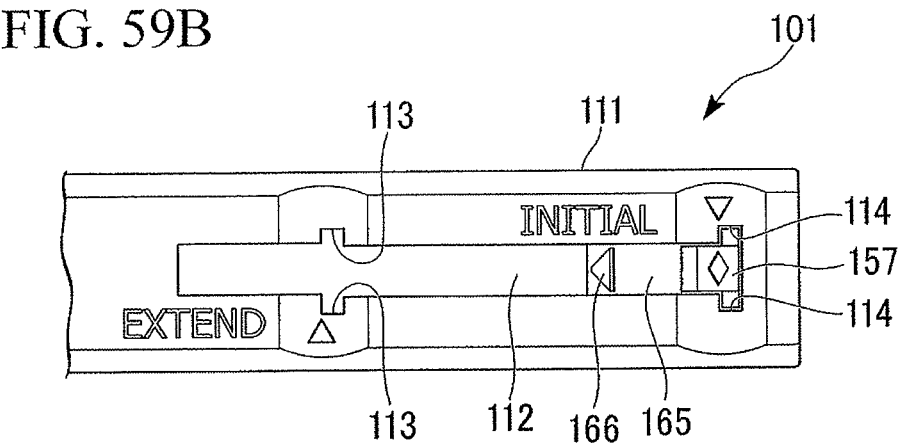
FIG. 59B is a perspective view which serves to describe the operation of the optical connector cleaning tool shown in FIG. 32.

As shown in FIG. 58C, when the supporting member 151 is moved further forward, the projecting piece 146 comes off from the contact protuberance 155*a*, and the protuberance 146*a* impacts a front end face 168*a* of the side plate projection 168 due to elastic restorative force. An impact sound occurs at this time, thereby enabling confirmation that the tool body 110 has moved its full distance.

As shown in FIG. 59A to FIG. 61B, the supporting member 151 is capable of being removed from a rear aperture 111*b* of the case 111. The process of removing the supporting member 151 from the case 111 is described below.

When the positioning protuberance 157 is pressed to cause downward elastic deformation of the elastic piece 165, and when the positioning protuberance 157 is removed from the second fitting recess 114, the supporting member 151 becomes capable of rearward movement.

Figure 60A:
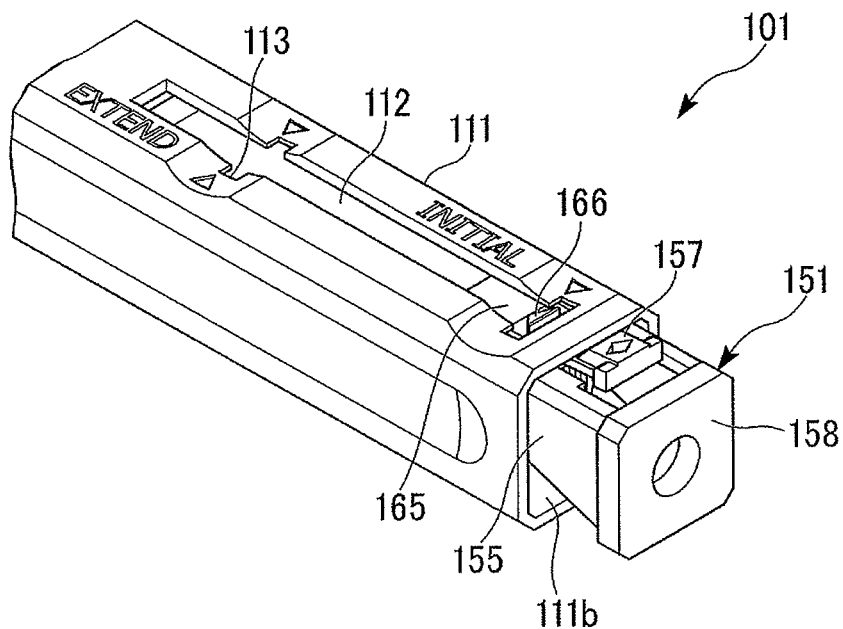
FIG. 60A is a perspective view which serves to describe the operation of the optical connector cleaning tool shown in FIG. 32.
Figure 60B:
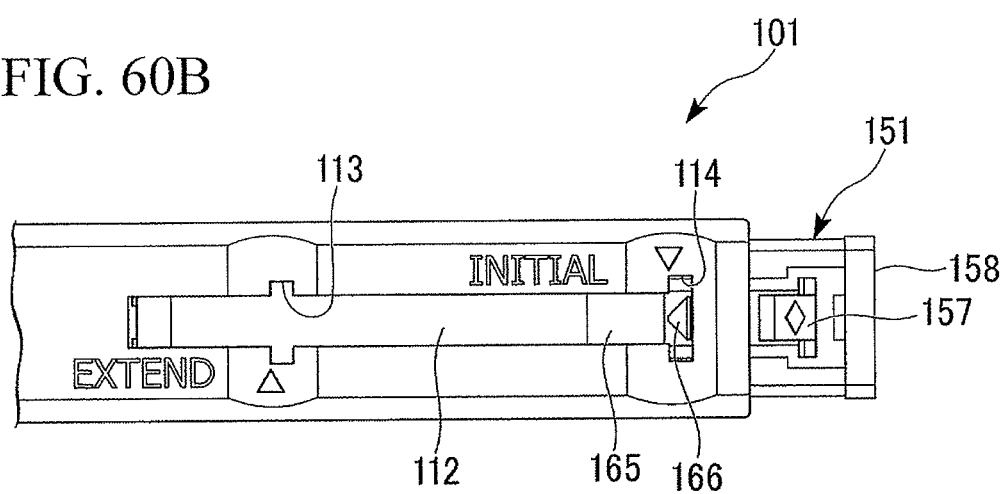
FIG. 60B is a perspective view which serves to describe the operation of the optical connector cleaning tool shown in FIG. 32.

As shown in FIG. 60A and FIG. 60B, at an intermediate position in the process of rearward movement of the supporting member 151 for the purpose of removal, when the engagement protuberance 166 reaches the rear end part of the positioning aperture 112, the engagement protuberance 166 engages with this rear end part.

Thus, as the engagement protuberance 166 engages with the rear end part of the positioning aperture 112 during the process of removal of the supporting member 151, it is possible to prevent the supporting member 151 from shooting out from the case 111 due to the biasing force of the biasing means 140.

Figure 61A:
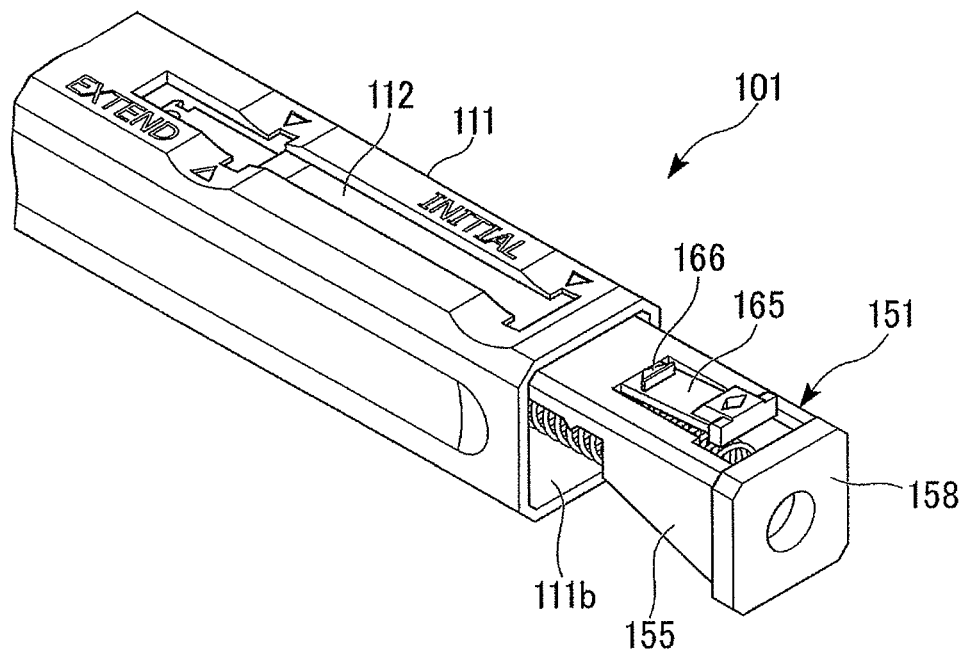
FIG. 61A is a perspective view which serves to describe the operation of the optical connector cleaning tool shown in FIG. 32.
Figure 61B:
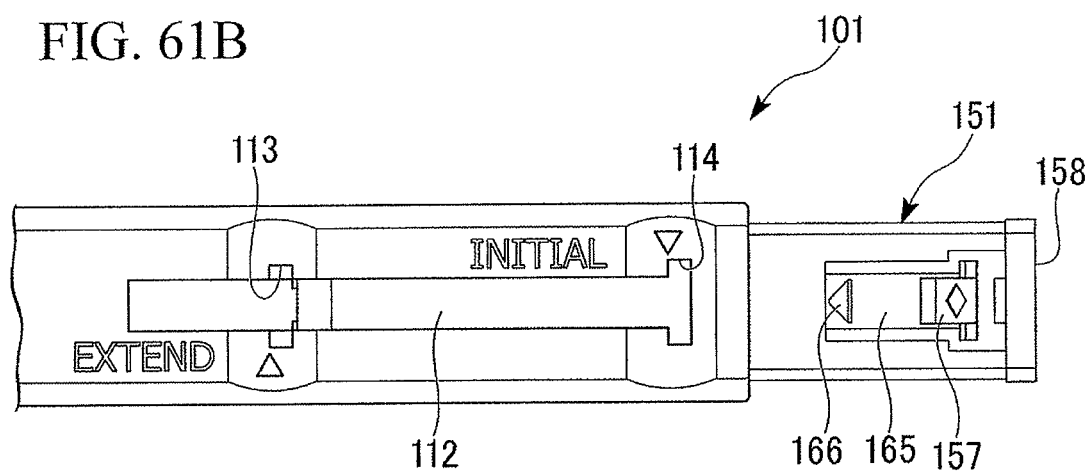
FIG. 61B is a perspective view which serves to describe the operation of the optical connector cleaning tool shown in FIG. 32.

As shown in FIG. 61A and FIG. 61B, when the engagement protuberance 166 is pressed to cause downward elastic deformation of the elastic piece 165, and when the engagement protuberance 166 is removed from the positioning aperture 112, the supporting member 151 becomes capable of rearward movement, enabling its removal from the case 111.

In the cleaning tool 101, as the guide openings 125A and 125B which guide the cleaning body 102 on the pressing face 124 are formed in the pressing face 124 of the head member 123, it is possible to prevent the cleaning body 102 from falling off the pressing face 124. Accordingly, the joining end face 61a of the optical plug 60 can be reliably cleaned.

The cleaning tool 101 is provided with the rotary mechanism 105 which has the supporting member 151, and the rotary shaft 152 which is capable of axial rotation relative to the supporting member 151.

As the rotary shaft 152 is provided with the rotary tube part 182 in which is formed the cam groove 185 into which the insertion protuberance 154 that is formed in the supporting member 151 is inserted, and as it is configured so as to axially rotate by movement of the rotary tube part 182 along the cam groove 185 resulting from movement in the longitudinal direction, it is possible to have axial rotation of the head member 123 by a simple mechanism.

As the structure of the rotary mechanism 105 is simple, the size of the tool body 110 can be reduced, and the entirety can be downsized.

In the cleaning tool 101, the feeding mechanism 103 is provided with the supply reel 130, the take-up reel 131, and the gear 138 which is attached to the take-up reel 131. The gear 138 is capable of engaging with the gear receiving part 156, is rotated by the gear receiving part 156 according to the movement of the feeding mechanism 103, and causes rotation of the take-up reel 131, thereby enabling the cleaning body 102 to be reeled in. Consequently, the cleaning body 102 can be made to undergo feeding movement by a simple mechanism.

As the structure of the feeding mechanism 103 is simple, the size of the tool body 110 can be reduced, and the entirety can be downsized.

The present invention may be applied to various types of optical fiber connectors. For example, it may be applied to single-core optical connectors such as the SC type optical connector (SC: Single fiber Coupling optical fiber connector) which is regulated by JIS C 5973, the MU type optical connector (MU: Miniature-Unit coupling optical fiber connector) which is regulated by JIS C 5983, the LC type optical connector (trademarked by Lucent Co.), and the SC2 type optical connector. As to the SC2 type optical connector, it eliminates the latch attached to the outer side of the housing from the SC type optical connector.

Next, another example of the head member is described. In the following description, the same reference symbols are assigned to components that are shared with the above-described head member 123, and description thereof is omitted.

FIG. 64 to FIG. 70 show another example of the head member. The head member 123A shown here is provided with the insertion part 191 which passes through the through-hole 183 of the guide tube part 181, the flange 192 which is formed at the front end of the insertion part 191, and the approximately cylindrical distal part 128 which extends forward from the front face of the flange 192. The distal face of the distal part 128 constitutes a pressing face 124 which presses the cleaning body 102 against the joining end face 61a.

Compared to the head member 123 shown in FIG. 40 to FIG. 46, the distal part 128 of the head member 123A is narrowly formed. In the illustrated example, the external diameter of the distal part 128 is made smaller than the width of the insertion part 191. This external diameter is, for example, 1.25 mm.

Figure 65:
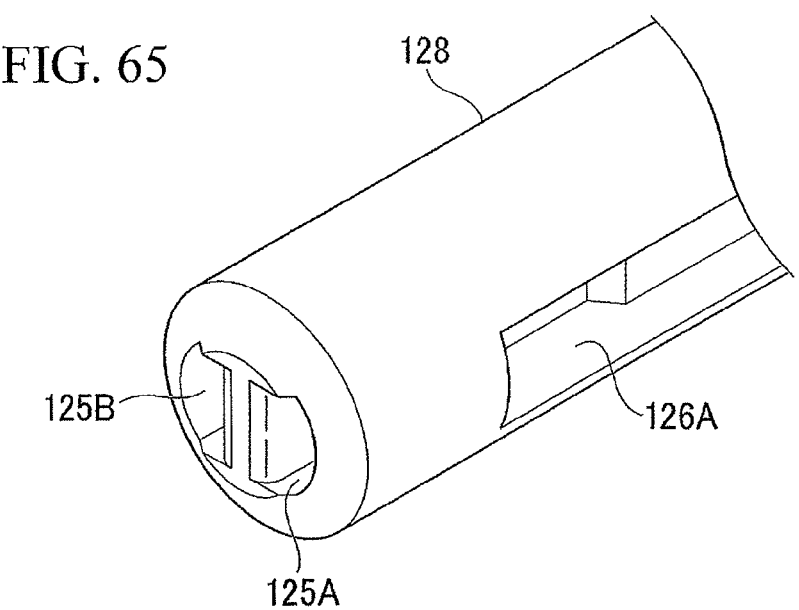
FIG. 65 is an enlarged view of the head member shown in FIG. 64.
Figure 66:
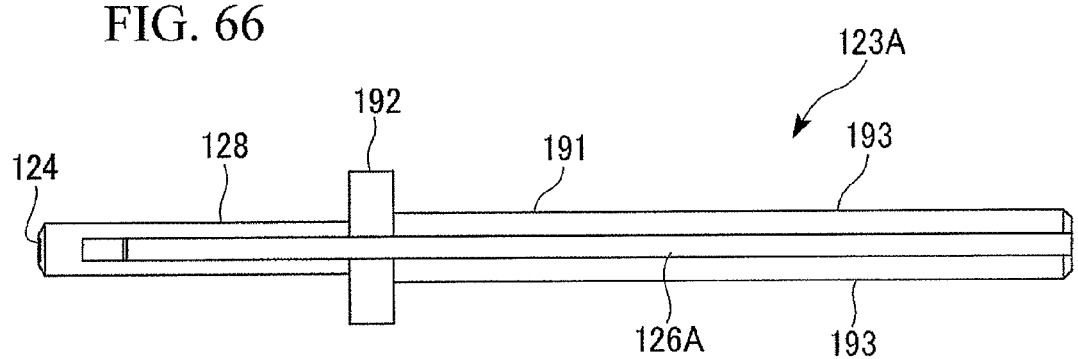
FIG. 66 is an enlarged view of the head member shown in FIG. 65.
Figure 67:
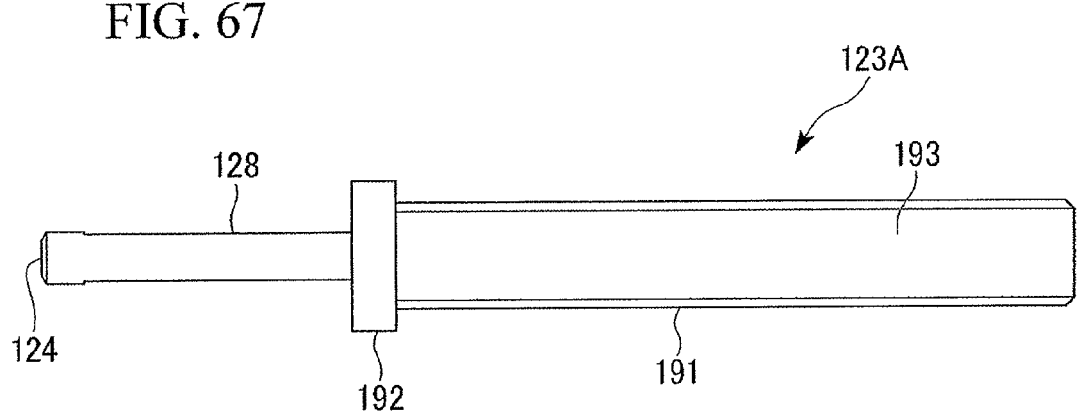
FIG. 67 is an enlarged view of the head member shown in FIG. 65.
Figure 68:
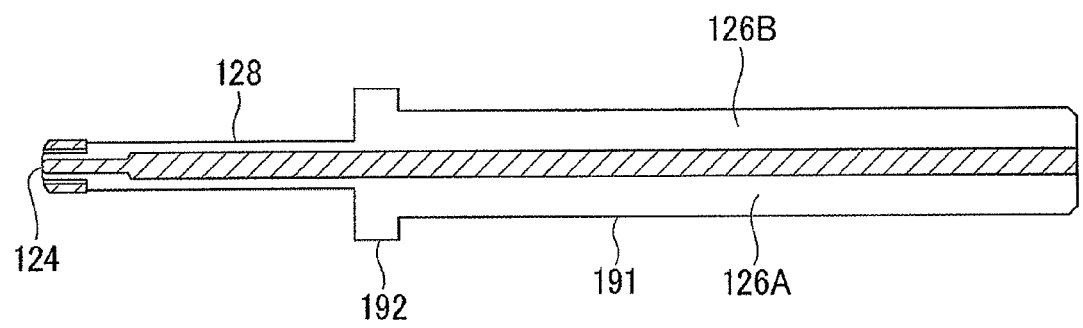
FIG. 68 is an enlarged view of the head member shown in FIG. 65.
Figure 69:
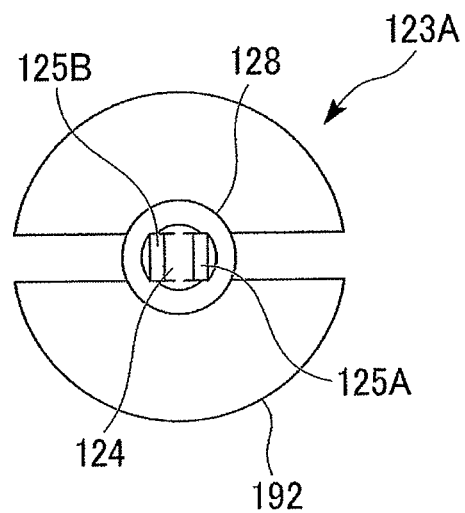
FIG. 69 is an enlarged view of the head member shown in FIG. 65.
Figure 70:
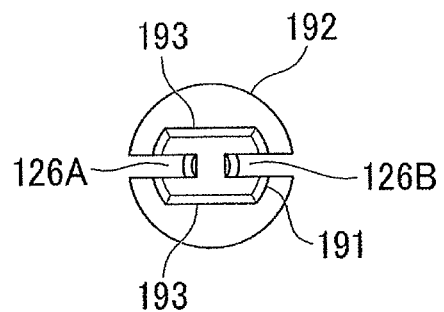
FIG. 70 is an enlarged view of the head member shown in FIG. 65.
Figure 71A:
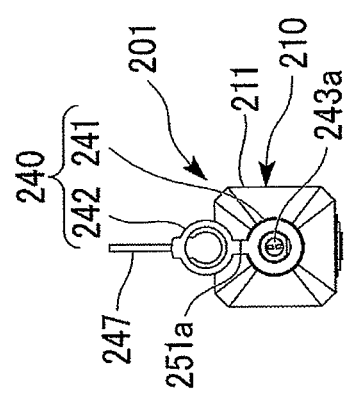
FIG. 71A is a front view of one embodiment of the cleaning tool of the present invention.
Figure 71B:
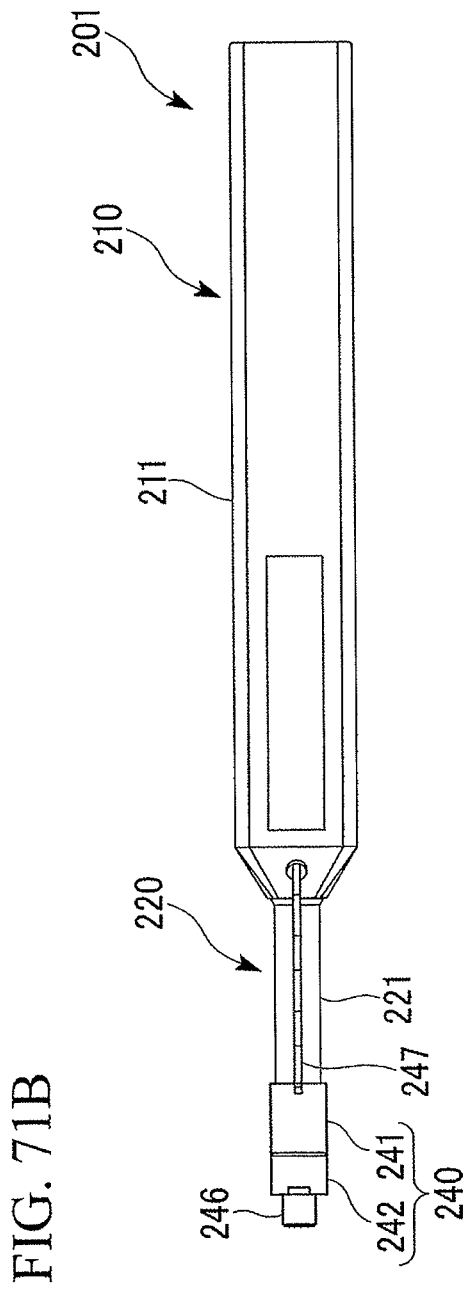
FIG. 71B is a back view of the cleaning tool shown in FIG. 71A.
Figure 71C:
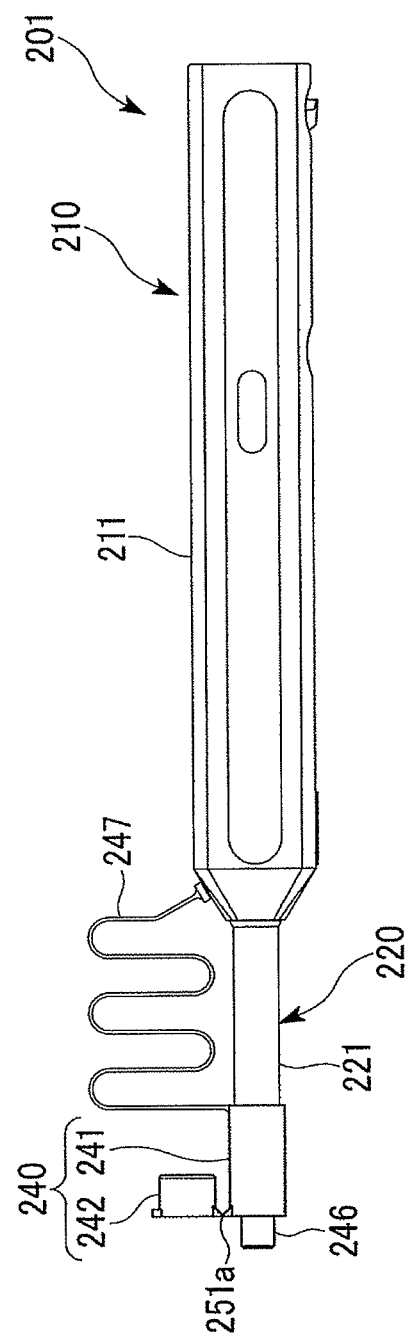
FIG. 71C is a side view of the cleaning tool shown in FIG. 71A.
Figure 71D:
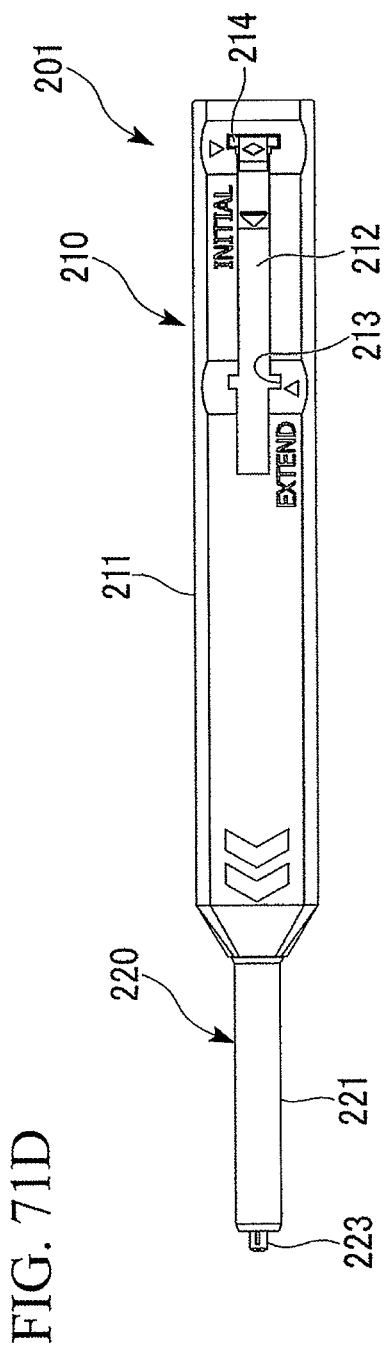
FIG. 71D is an elevation view of the cleaning tool shown in FIG. 71A+.

As shown in FIG. 65, the guide openings 125A and 125B which are apertures through which the cleaning body 102 passes are formed in the pressing face 124.

The cleaning body 102 transits the guide groove 126A and the guide opening 125A from the supply reel 130 to reach the pressing face 124, and is taken up by the take-up reel 131 after transiting the guide opening 125B and the guide groove 126B.

As stated above, a filamentous cleaning body 102 may be used in the present invention. As filamentous cleaning body 102 has a narrower width than tape-like material, it facilitates formation of the guide openings 125A and 125B from a design standpoint even when the external diameter of the distal part 128 is small.

Consequently, it is possible to reliably prevent the cleaning body 102 from falling off, and narrowly form the distal part 128.

The illustrated example concerns the optical plug 60 and optical adapter 70, but the object of the cleaning tool of the present invention is not limited thereto, and a configuration may also be adopted wherein an optical connector receptacle (specifically, a receptacle housing) is made to function as a positioning housing for connectors.

In this case, the ferrule which is incorporated into the sleeve-shaped receptacle housing functions as the optical connector pertaining to the present invention. The joining end face of the ferrule is cleaned by inserting the insertion part of the cleaning tool into the connector housing hole which is the interior space of the receptacle housing.

The structure of a cleaning tool 201 which is a fourth embodiment of the cleaning tool of the present invention is described below.

Figure 72:
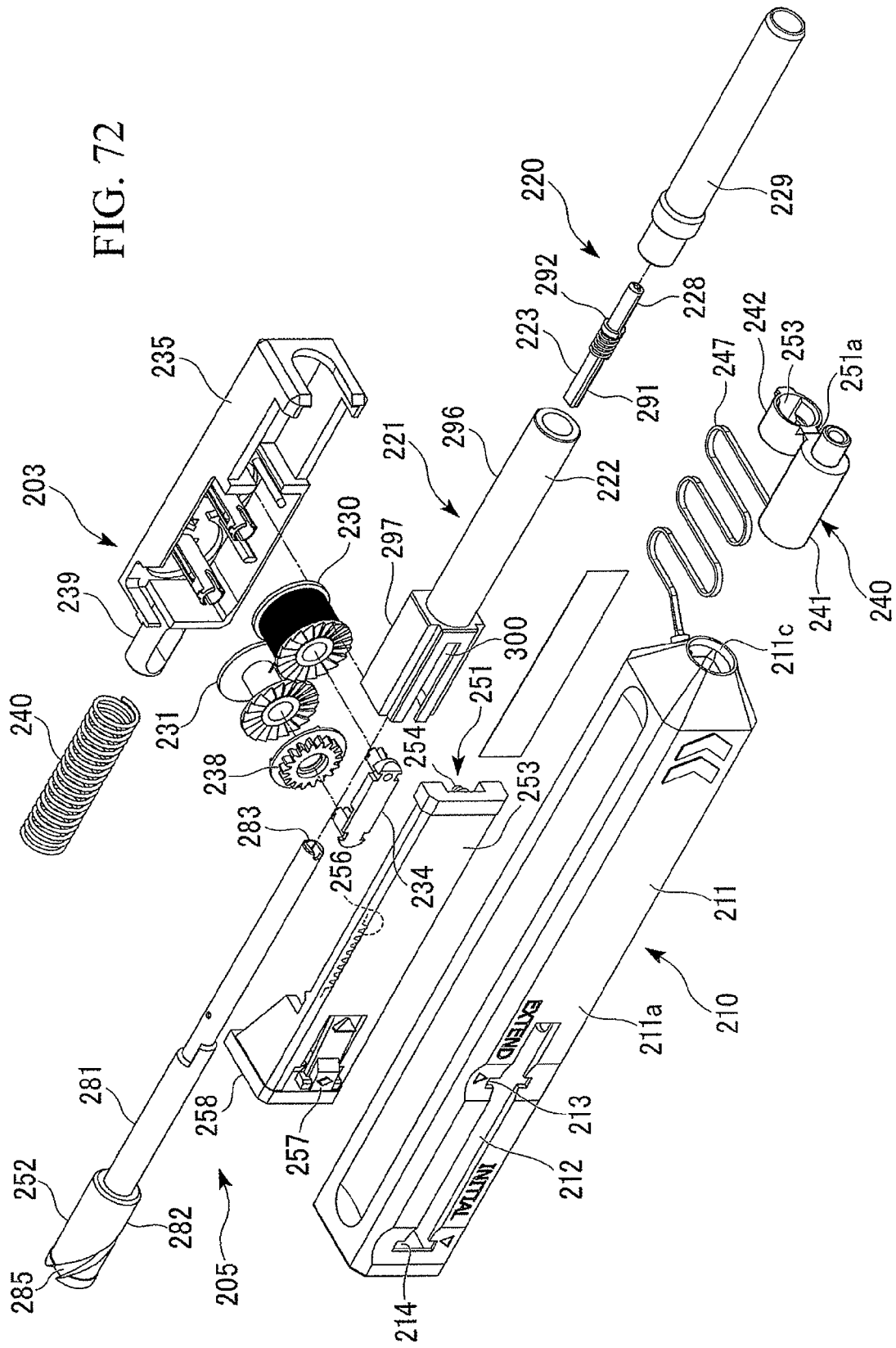
FIG. 72 is an exploded perspective view of the cleaning tool.
Figure 73:
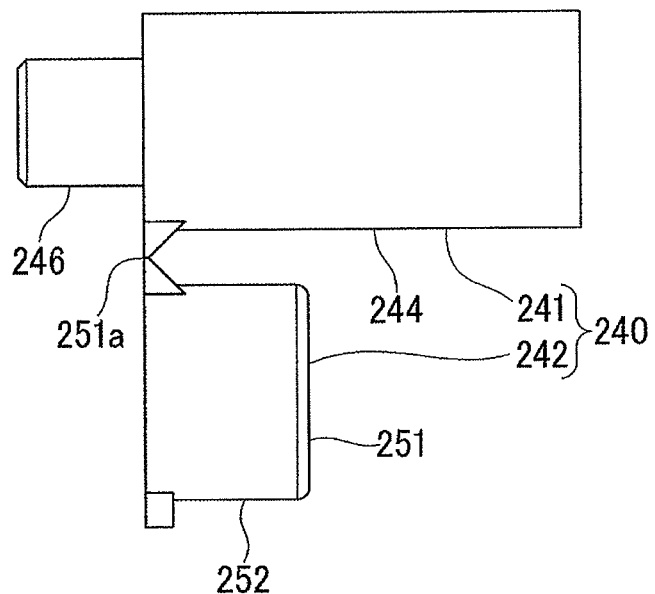
FIG. 73 is an elevation view which shows a connector cleaning attachment.
Figure 74:
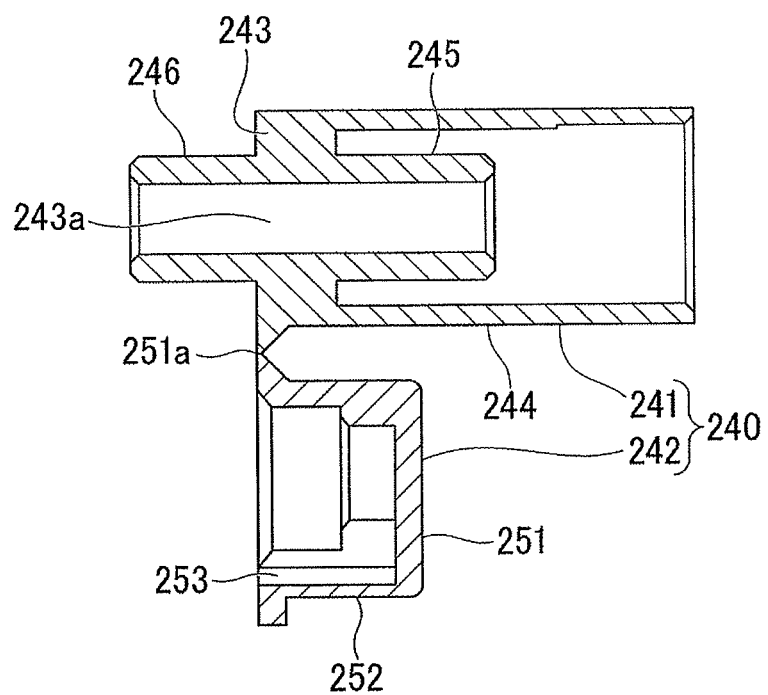
FIG. 74 is a cross-sectional view which shows the connector cleaning attachment.
Figure 75:
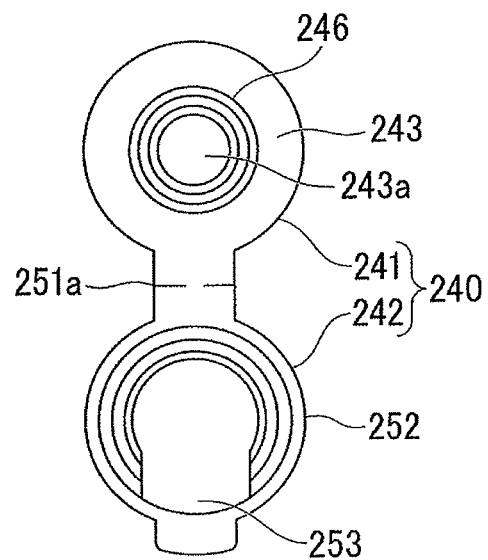
FIG. 75 is a front view of the connector cleaning attachment.
Figure 76:
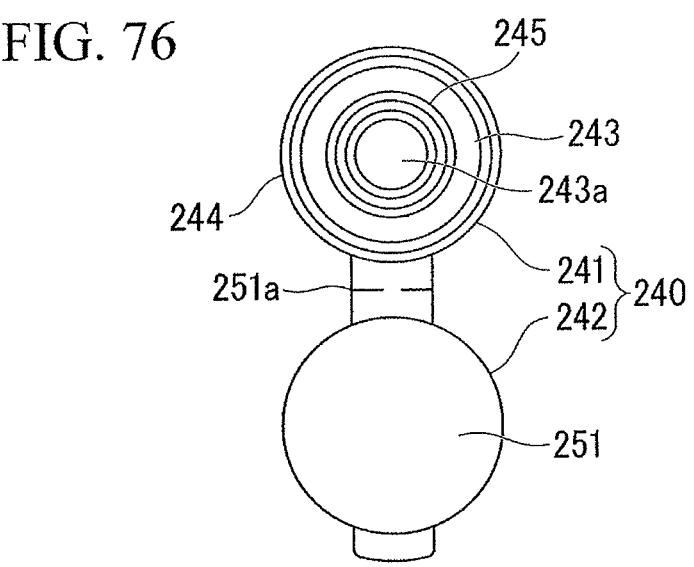
FIG. 76 is a rear view of the connector cleaning attachment.
Figure 77:
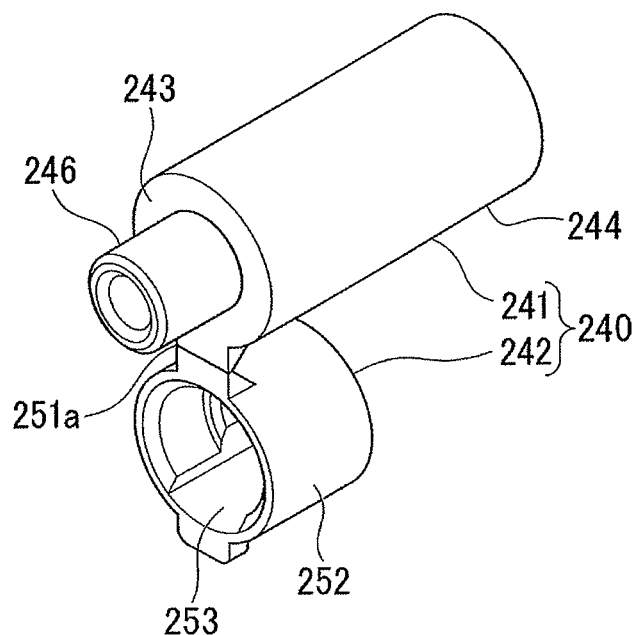
FIG. 77 is a perspective view of the connector cleaning attachment.
Figure 78:
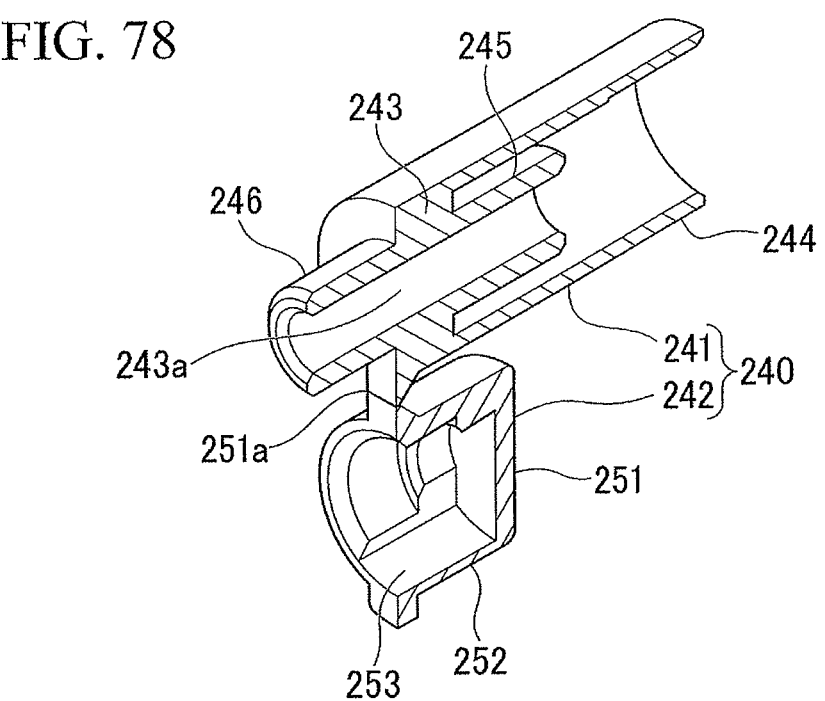
FIG. 78 is a perspective view of the connector cleaning attachment in cross-section.
Figure 79:
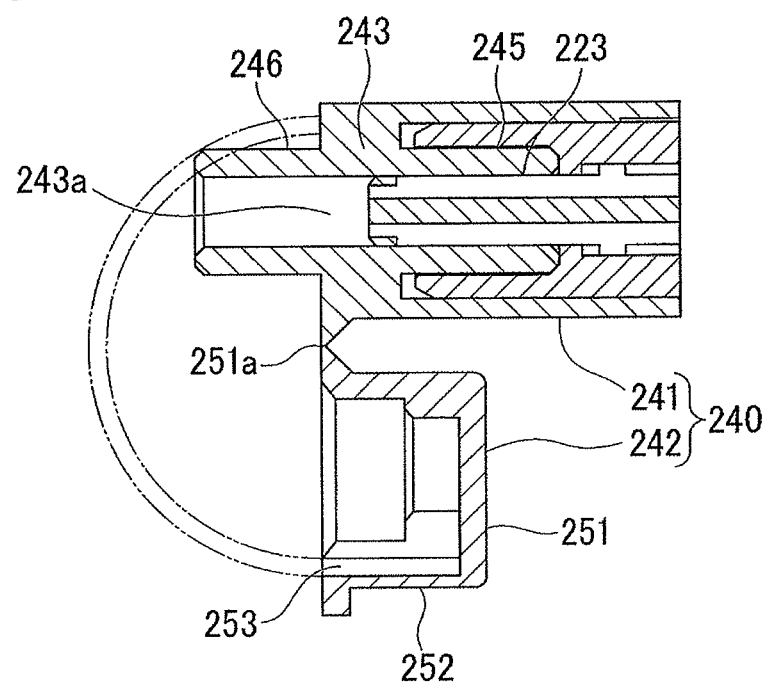
FIG. 79 is a cross-sectional view of the connector cleaning attachment, and is a drawing which shows the track of a notch during opening and closing operation of a covering part.
Figure 80:
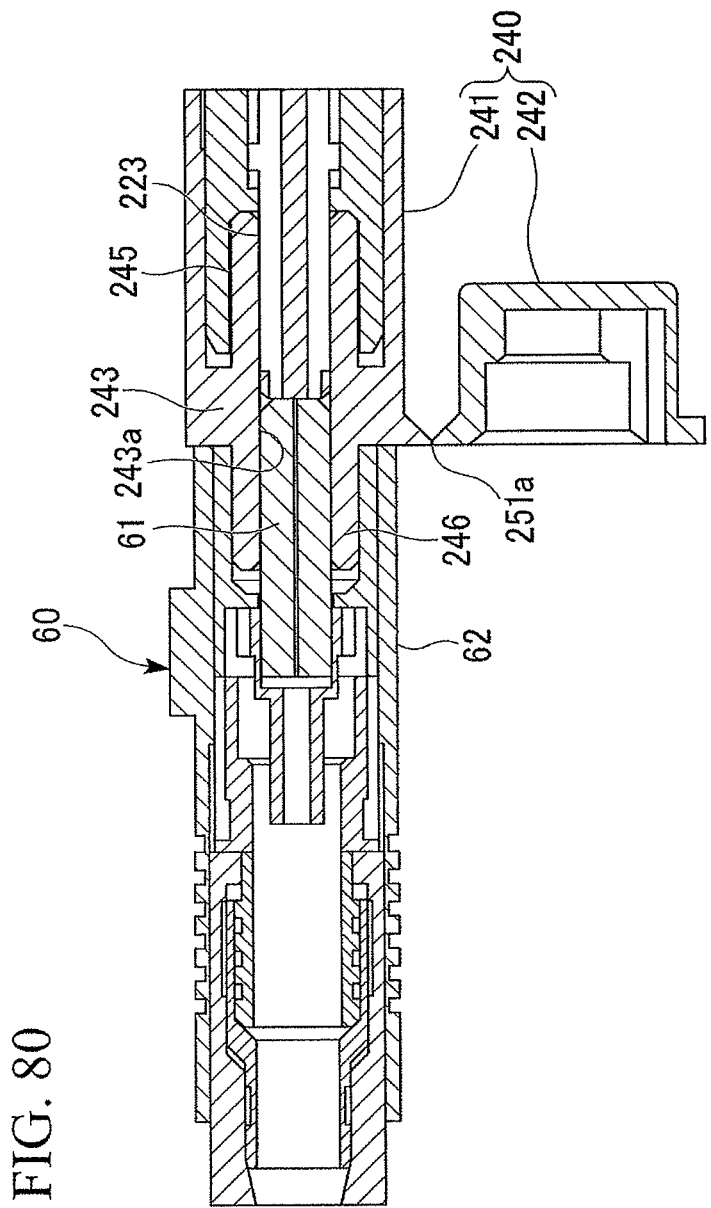
FIG. 80 is a cross-sectional view which shows the state where an optical connector is attached to the connector cleaning attachment.

FIG. 71A to FIG. 71D are respectively a front view, back view, side view, and elevation view of the cleaning tool 201. FIG. 72 is an exploded perspective view of the cleaning tool 201. FIG. 73 is an elevation view which shows a connector cleaning attachment 240. FIG. 74 is a cross-sectional view which shows the connector cleaning attachment 240. FIG. 75 is a front view of the connector cleaning attachment 240. FIG. 76 is a rear view of the connector cleaning attachment 240. FIG. 77 is a perspective view of the connector cleaning attachment 240. FIG. 78 is a perspective view of the connector cleaning attachment 240 in cross-section. FIG. 79 is a cross-sectional view of the connector cleaning attachment 240, and is a drawing which shows the track of a notch 253 during opening and closing operation of a covering part 242. FIG. 80 is a cross-sectional view which shows the state where an optical connector 60 is attached to the connector cleaning attachment 240.

As shown in FIG. 71A to FIG. 71D and FIG. 72, the cleaning tool 201 is provided with a tool body 210, an insertion part 220 which protrudes from this tool body 210, and a connector cleaning attachment 240 which is attached to the distal end of the insertion part 220. In the below description, the projection direction (insertion direction) of the insertion part 220 relative to the tool body 210 is referred to on occasion as forward, and its opposite direction as rearward.

The tool body 210 is provided with a case 211, a supporting member 251 disposed within the case 211, a feeding mechanism 203 which conducts supply and take up of a cleaning body 202, and a rotary mechanism 205 which rotates a head member 223.

The case 211 is formed in a tubular shape which is approximately rectangular in cross-section. In the rear part of one side plate 211a of the four side plates 211a, a positioning aperture 212 is formed into which a below-mentioned positioning protuberance 257 inserts.

The positioning aperture 212 is formed in a slit-like shape in the longitudinal direction. A first fitting recess 213 into which the positioning protuberance 257 fits is formed in the front part of the positioning aperture 212, and a second fitting recess 214 into which the positioning protuberance 257 fits is formed in the rear part of the positioning aperture 212.

At the front end of the case 211, a through-hole 211c is formed through which the insertion part 220 passes.

As shown in FIG. 72, the supporting member 251 is provided with a base plate 253 in the form of a long plate extending in the longitudinal direction, an insertion protuberance 254 which is formed so as to project from an inner face of the base plate 253, side plates which are formed so as to project toward the inner face side from the two side edges of the base plate 253, a serrated gear receiving part 256 which is formed on one of the side plates, a positioning protuberance 257 which is provided on an outer face of the base plate 253, and a rear end plate part 258 which is formed so as to extend toward the inner face side from the edge of the rear end of the base plate 253.

The insertion protuberance 254 is provided so as to be capable of fitting into a cam groove 285 of a rotary tube part 282.

The rotary mechanism 205 is provided with a rotary shaft 252 which is capable of axial rotation relative to the supporting member 251.

The rotary shaft 252 is provided with a guide tube part 281, and the rotary tube part 282 which is provided at the rear end of the guide tube part 281.

A through-hole 283 is formed within the rotary shaft 252 through which the cleaning body 202 passes.

The guide tube part 281 is formed in an approximately cylindrical shape, and is made such that an insertion part 291 of the head member 223 can be inserted into the through-hole 283 at its front end.

The rotary tube part 282 is formed in an approximately cylindrical shape, and the cam groove 285 into which the insertion protuberance 254 of the supporting member 251 inserts is formed on its outer surface.

The cam groove 285 is formed so as to extend in the longitudinal direction, and at least a portion thereof is inclined relative to the axial direction of the rotary tube part 282. Consequently, when the rotary shaft 252 is moved in the longitudinal direction, the rotary shaft 252 is axially rotated by the movement of the rotary tube part 282 along the cam groove 285. In the illustrated example, the cam groove 285 is formed in a helical shape.

As shown in FIG. 72 to FIG. 81, the head member 223 is provided with an insertion part 291 which passes through the through-hole 283 of the guide tube part 281, a flange 292 which is formed at the front end of the insertion part 291, and an approximately cylindrical distal part 228 which extends forward from the front face of the flange 292.

The distal face of the distal part 228 constitutes a pressing face 224 which presses the cleaning body 202 against the joining end face 61a.

Figure 81:
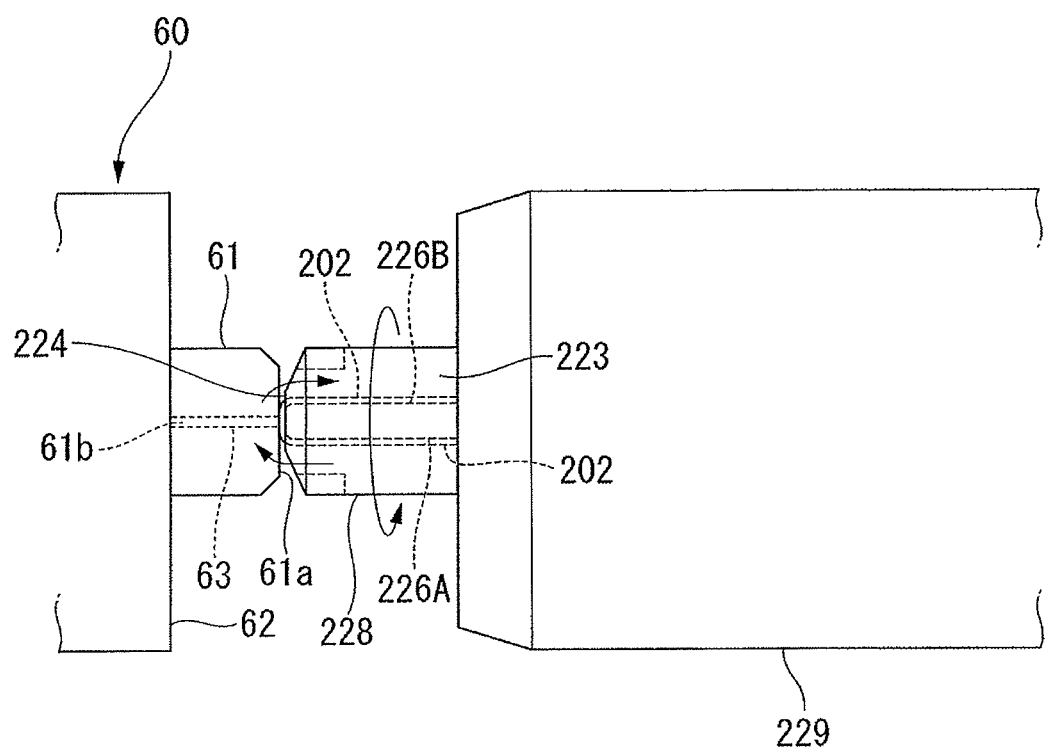
FIG. 81 is a partial cross-sectional view which serves to describe the operation of the cleaning tool.

As shown in FIG. 81, it is preferable that guide grooves 226A and 226B which guide the feeding movement of the cleaning body 202 be formed in the distal part 228. The distal part 228 is formed so that its distal end protrudes from a distal tube part 221b.

As shown in FIG. 72 and FIG. 81, the cleaning body 202 which is dispensed from the supply reel 230 of the feeding mechanism 203 winds around the head member 223.

In the illustrated example, the cleaning body 202 passes through the interior of the through-hole 283 of the rotary shaft 252 from the supply reel 230 within the tool body 210, transits the guide groove 226A of the head member 223, reaches the pressing face 224, transits the guide groove 226B, and arrives at the take-up reel 231.

There are no particular limitations on the cleaning body 202, and one may adopt commonly known and suitable cleaning cloth (non-woven cloth or woven cloth) that has been processed into filament (or string) form. For example, one may cite material composed of ultrafine fiber such as polyester and nylon. There are no particular limitations on the cross-sectional form of the cleaning body 202, and it may be made, for example, approximately circular, polygonal, and so on.

As shown in FIG. 72, the feeding mechanism 203 is provided with a supply reel 230 on which the cleaning body 202 is wound, a take-up reel 231 which takes up and recovers the cleaning body 202 after use, a supporting part 235 which is installed to enable these to rotate, a gear 238 which is attached to the take-up reel 231, a retaining tube 239 which is formed on the supporting part 235, a biasing means 240 (e.g., a coil spring) which is attached to the retaining tube 239, and a pressing part 234.

The insertion part 220 is provided with an insertion tube 221 and a head member 223 which passes through the insertion tube 221.

The insertion tube 221 is provided with a tube base part 222 and a tube extremity part 229 which is provided at the distal end of the tube base part 222.

The tube base part 222 is provided with a communicating tube 296 which enables the guide tube part 281 of the rotary shaft 252 to pass through it, and a holding frame 297 which is provided at the rear end of the communicating tube 296.

The holding frame 297 is formed in a tubular shape which is rectangular in cross-section, and is capable of housing the rotary tube part 282 of the rotary shaft 252 within it. A slit 300 into which the insertion protuberance 254 of the supporting member 251 inserts is formed in the longitudinal direction.

With respect to the insertion part 220, the insertion tube 221 passes through the through-hole 211c of the case 211, and projects forward from the case 211.

As shown in FIG. 73 to FIG. 78, the connector cleaning attachment 240 is provided with a main body 241 which is attached to the distal end of the insertion part 220, and a covering part 242 which is hinged to the body 241.

The main body 241 is provided with a base plate 243 which has a through-hole 243a, an outer tube 244 which extends rearward from the circumferential edge of the base plate 243 and into which the insertion tube 221 inserts, a tool-side guide tube part 245 which extends rearward from the base plate 243, and a connector-side guide tube part 246 which extends forward from the base plate 243.

The through-hole 243a is formed so that the ferrule 61 of the optical connector 60 and/or the head member 223 pass through it.

The tool-side guide tube part 245 is formed so that the head member 223 is positioned by insertion. In the illustrated example, the tool-side guide tube part 245 is made in a cylindrical shape whose inner diameter is approximately equal to the outer diameter of the head member 223.

The connector-side guide tube part 246 is formed so that the ferrule 61 is positioned by insertion. In the illustrated example, the connector-side guide tube part 246 is made in a cylindrical shape whose inner diameter is approximately equal to the outer diameter of the ferrule 61.

In the illustrated example, the guide tubes 245 and 246 are formed so as to be mutually concentric, have inner diameters which are approximately equal to the through-hole 243a, and mutually communicate via the through-hole 243a.

The inner diameters of the guide tubes 245 and 246 can be set in conformity with the outer diameters of the inserted members, i.e., the head member 223 and the ferrule 61. Consequently, their inner diameters may mutually differ.

The main body 241 is connected to the case 211 via a retaining cord 247.

The covering part 242 is provided with an apical plate 251, and a covering tube 252 which extends from the circumferential edge of the apical plate 251 and which is joined by a hinge 251a to the main body 241.

The covering tube 252 is formed so as to encompass the connector-side guide tube 246 in a closed state. A notch 253 is formed on the inner face of the covering tube 252.

The notch 253 is made to be approximately rectangular in cross-section, and is formed so as to extend across the entire axial length of the covering tube 252. By this means, the covering part 252 is given a thinner wall.

The notch 253 can be formed at a position which corresponds to a rotationally symmetrical position of the hinge 251a via the central axis of the covering tube 252.

As shown in FIG. 79, the notch 253 is formed so that part (the distal part) of the connector-side guide tube 246 passes through its interior during opening and closing operation of the covering part 242 on the hinge 251a.

By means of the notch 253, without giving a large external diameter to the covering part 242, it is possible to have a configuration wherein the covering part 242 does not contact the connector-side guide tube 246 during opening and closing.

Next, one example of the method of use of the cleaning tool 201 is described.

As shown in FIG. 80 and FIG. 81, when the ferrule 61 of the optical connector 60 is inserted into the connector-side guide tube 246, the ferrule 61 enters while being guided by the connector-side guide tube 246. By this means, the cleaning body 202 on the pressing face 224 contacts the appropriate position (in this instance, the optical fiber hole 61b and its periphery) of the joining end face 61a of the optical connector 60.

When the tool body 210 is pressed forward, the tool body 210 moves in this direction. At this time, the distal end of the insertion part 220 presses the optical connector 60, and the insertion part 220 moves backward in relative terms (that is, in the direction of contraction) with respect to the tool body 210.

As shown in FIG. 72, due to the movement of the tool body 210, the supporting member 251 is moved forward relative to the rotary shaft 252. As a result, the rotary tube part 282 is circumferentially moved along the cam groove 285, and the rotary shaft 252 axially rotates.

The head member 223 is axially rotated by the rotation of the rotary shaft 252, with the result that the cleaning body 202 rotates around the axis of the head member 223 while in a state of contact with the joining end face 61a, and the joining end face 61a is wiped clean.

Due to the forward movement of the supporting member 251 relative to the feeding mechanism 203, force is imparted in the rotational direction to the gear 238 by the gear receiving part 256, and the take-up reel 231 rotates, thereby taking up the cleaning body 202.

In conjunction with this, the cleaning body 202 is unwound from the supply reel 230, and undergoes feeding movement by transiting the pressing face 224 of the head member 223.

Contamination such as dirt, dust, and oil adhering to the joining end face 61a is reliably wiped off by the feeding movement of the cleaning body 202.

When the insertion part 220 is withdrawn from the optical connector 60, the insertion part 220 is moved forward in relative terms with respect to the tool body 210 (that is, in the direction of extension) by the elastic force of the biasing means 240.

In the cleaning tool 201, due to the formation of the tool-side guide tube part 245 in the main body 241 of the connector cleaning attachment 240, it is possible to position the head member 223 with a high degree of accuracy, and oppose and bring into contact the cleaning body 202 and the joining end face 61a of the optical connector 60. As a result, excellent cleaning effects can be obtained.

Moreover, due to the formation of the connector-side guide tube part 246, it is possible to position the ferrule 61 with a high degree of accuracy, and enhance the cleaning effects.

Moreover, due to the formation of the notch 253 whose interior is transited by the connector-side guide tube part 246 during opening and closing operation of the covering part 242, it is possible—without giving a large external diameter to the covering part 242—to have a configuration wherein the covering part 242 does not contact the connector-side guide tube part 246 during opening and closing. As a result, downsizing is possible.

The present invention may be applied to various types of optical fiber connectors. For example, it may be applied to single-core optical connectors such as the SC type optical connector (SC: Single fiber Coupling optical fiber connector) which is regulated by JIS C 5973, the MU type optical connector (MU: Miniature-Unit coupling optical fiber connector) which is regulated by JIS C 5983, the LC type optical connector (trademarked by Lucent Co.), and the SC2 type optical connector. As to the SC2 type optical connector, it eliminates the latch attached to the outer side of the housing from the SC type optical connector.

Figure 82:
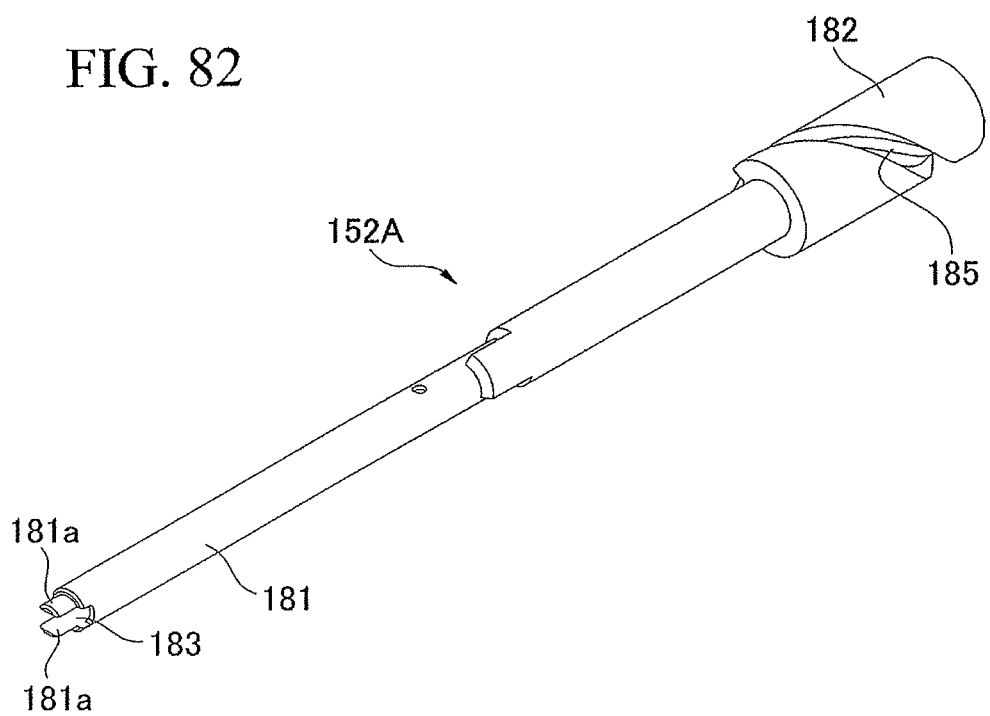
FIG. 82 is a perspective view which shows another example of the rotary shaft.

FIG. 82 is a perspective view which shows another example of the rotary shaft.

A rotary shaft 152A shown here differs from the rotary shaft 152 shown in FIG. 38 and FIG. 39 in that a pair of support pieces 181a which support the biasing means 194 from the inner face side is formed at the distal end of the guide tube part 181 so as to project in the distal direction.

Figure 83:
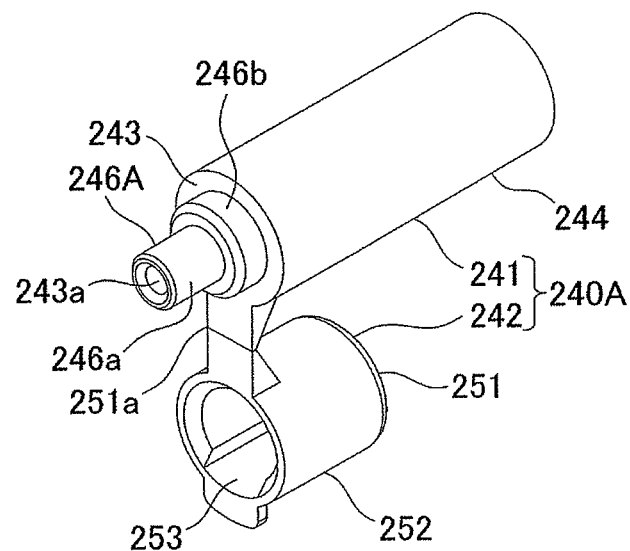
FIG. 83 is a perspective view which shows another example of the connector cleaning attachment.
Figure 84:
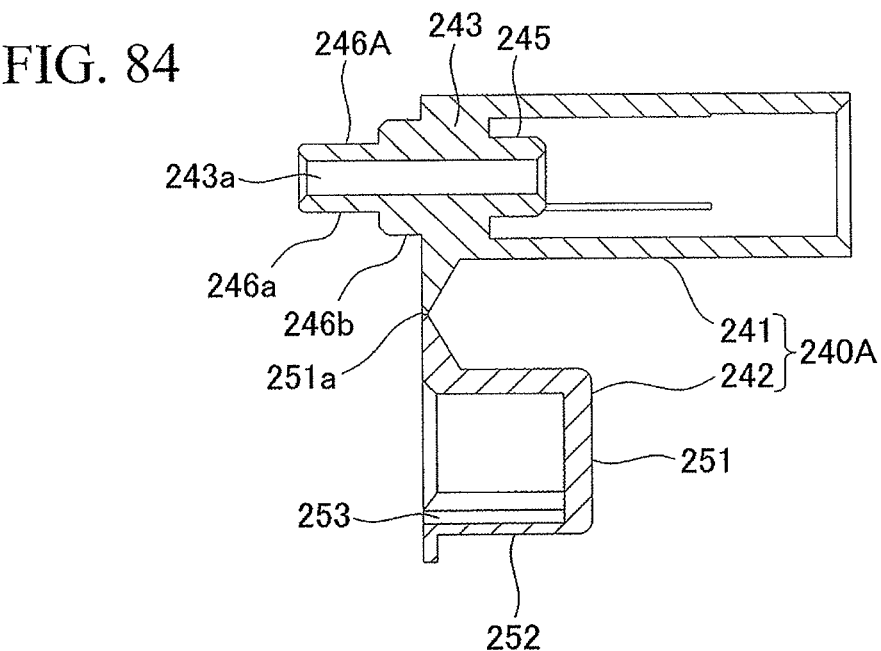
FIG. 84 is a cross-sectional view which shows the connector cleaning attachment shown in the previous drawing.

FIG. 83 is a perspective view which shows another example of the connector cleaning attachment. FIG. 84 is a cross-sectional view of this connector cleaning attachment.

A connector cleaning attachment 240A shown here differs from the connector cleaning attachment 240 shown in FIG. 73 to FIG. 79 in that a distal part 246a of a connector-side guide tube part 246A is narrower in diameter than a base part 246b.

INDUSTRIAL APPLICABILITY

The present invention can be used for cleaning, for example, a joining end face of an optical connector prior to its optical connection to another optical connector.

The invention claimed is:

1. An optical connector cleaning tool which cleans a joining end face of an optical connector by a feeding movement of a cleaning body, comprising:
   a tool body which incorporates a feeding mechanism that supplies and takes up the cleaning body and which incorporates a rotary mechanism that rotates a rotary shaft to which a head member is attached at a distal end of the rotary shaft, the head member on which is formed a pressing face that presses the cleaning body against the joining end face within a connecter housing hole of a positioning housing for connectors; and
   an insertion part which has a cylindrical insertion tube through which the head member and a part of the rotary shaft in vicinity to the head member pass, and a distal end of the insertion part being inserted into the connector housing hole of the positioning housing for connectors, wherein:
   the tool body has a case which incorporates the feeding mechanism and the rotary mechanism and which is capable of advancing and retreating in an insertion direction of the insertion part with respect to the feeding mechanism, the rotary mechanism, and the insertion part;
   the rotary mechanism has a cam mechanism that engages an insertion protuberance arranged in vicinity to the case with a spiral cam groove arranged in vicinity to the rotary shaft;
   the feeding mechanism comprises a supply reel on which the cleaning body is wound and a take-up reel which takes up the cleaning body, and is configured to cause the rotation of the take-up reel and take up the cleaning body based on the movement of the case in an insertion direction of the case; and
   the head member axially rotates and the cleaning body undergoes a feeding movement of supply and take up in the feeding mechanism, which is based on the movement of the case in the insertion direction relative to the insertion part in a state where the cleaning body is in contact with the joining end face while the state of contact is maintained based on the cam mechanism of the rotary mechanism.

2. An optical connector cleaning tool according to claim 1, wherein the feeding mechanism is provided with a gear rotating the take-up reel and a gear receiving part formed along a length direction of the case in the case and engages with the gear, and
   the gear rotates the take-up reel and takes up the cleaning body by engaging the gear receiving part and rotating according to the movement of the case in the insertion direction.

3. The optical connector cleaning tool according to claim 2, further comprising:
   guide openings which are formed in the pressing face to guide the cleaning body from the feeding mechanism to the pressing face.

4. The optical connector cleaning tool according to claim 1, further comprising:
   guide openings which are formed in the pressing face to guide the cleaning body from the feeding mechanism to the pressing face.

5. The optical connector cleaning tool according to claim 4, wherein
   the guide openings are formed in a pair, of which one guides the cleaning body from the feeding mechanism to the pressing face, and the other guides the cleaning body which has transited the pressing face to the feeding mechanism.

6. An optical connector cleaning tool according to any one of claims 1 to 5, further comprising:
   a supporting member which is provided in the case, has the insertion protuberance, and is positioned relative to the case;
   a projecting piece with is capable of elastic bending deformation is formed in the feeding mechanism so as to project toward the supporting member; and
   a contact protuberance which is capable to contacting the projecting piece is formed in the supporting member, wherein
   the projecting piece is configured to undergo bending deformation by engaging the contact protuberance in the process of moving the supporting member in conjunction with moving the case subsequently disengages from the contact protuberance, impact the supporting member by elastic force, and emit and impact sound.

7. An optical connector cleaning tool according to claim 6, wherein
   the insertion part comprises the insertion tube through which the head member passes and this insertion tube is capable of being inserted into the connector housing hole in a positioned state.

8. The optical connector cleaning tool according to claim 7, wherein
   the insertion tube comprises a tube base part, and a tube extremity part which is removable from this tube base part.

9. The optical connector cleaning tool according to claim 8, wherein
   the tube extremity part has a fitting tube part which is capable of fitting into a through-hole at the distal end of the tube base part in a freely removable manner, and a distal tube part which extends in a distal direction from the fitting tube part and which inserts into the connector housing hole.

10. The optical connector cleaning tool according to claim 9, wherein the cleaning body is filiform.

11. The optical connector cleaning tool according to claim 6, wherein the cleaning body is filiform.

12. The optical connector cleaning tool according to claim 7, wherein the cleaning body is filiform.

13. The optical connector cleaning tool according to claim 8, wherein the cleaning body is filiform.

14. An optical connector cleaning tool according to any one of claims 1 to 5, wherein:
   the insertion part comprises the insertion tube through which the head member passes and this insertion tube is capable of being inserted into the connector housing hole in a positioned state.

15. The optical connector cleaning tool according to claim 14, wherein
   the insertion tube comprises a tube base part, and a tube extremity part which is removable from this tube base part.

16. The optical connector cleaning tool according to claim 15, wherein
   the tube extremity part has a fitting tube part which is capable of fitting into a through-hole at the distal end of the tube base part in a freely removable manner, and a distal tube part which extends in a distal direction from the fitting tube part and which inserts into the connector housing hole.

17. The optical connector cleaning tool according to claim 14, wherein the cleaning body is filiform.

18. The optical connector cleaning tool according to claim 15, wherein the cleaning body is filiform.

19. The optical connector cleaning tool according to claim 16, wherein the cleaning body is filiform.

20. The optical connector cleaning tool according to any one of claims 1 to 5, wherein:
   a positioning aperture, which has a fitting recess into which a positioning protuberance which is formed in the supporting member having the insertion protuberance removably fits, is formed in the case;
   the supporting member is capable of moving in the direction of removal from the case by disengagement of the positioning protuberance from the fitting recess; and
   an engagement protuberance, which engages with the positioning aperture at an intermediate position in the process of removal of the supporting member, is formed in the supporting member.

21. The optical connector cleaning tool according to claim 20, wherein the cleaning body is filiform.

22. The optical connector cleaning tool according to any one of claims 1 to 5, wherein the cleaning body is filiform.

23. The optical connector cleaning tool according to claim 1 or 2, wherein a guide groove which prevents skewing of the cleaning body in the widthwise direction is formed on the pressing face of the head member.

\* \* \* \* \*